United States Patent
Woodgate et al.

(10) Patent No.: US 11,977,286 B2
(45) Date of Patent: May 7, 2024

(54) OBSERVER-TRACKED PRIVACY DISPLAY

(71) Applicant: RealD Spark, LLC, Boulder, CO (US)

(72) Inventors: Graham J. Woodgate, Henley-on-Thames (GB); Michael G. Robinson, Boulder, CO (US); Jonathan Harrold, Leamington Spa (GB); Robert A Ramsey, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 18/104,900

(22) Filed: Feb. 2, 2023

(65) Prior Publication Data

US 2023/0375863 A1 Nov. 23, 2023

Related U.S. Application Data

(60) Provisional application No. 63/311,329, filed on Feb. 17, 2022, provisional application No. 63/308,231, filed on Feb. 9, 2022.

(51) Int. Cl.
*G02F 1/1333* (2006.01)
*G02B 5/30* (2006.01)
(Continued)

(52) U.S. Cl.
CPC ......... *G02F 1/1323* (2013.01); *G02B 5/3083* (2013.01); *G02F 1/13306* (2013.01);
(Continued)

(58) Field of Classification Search
CPC .................................................. G02F 1/1323
See application file for complete search history.

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

PCT/US2019/059990 International search report and written opinion of the international searching authority mailed Feb. 28, 2020.
(Continued)

*Primary Examiner* — Sang V Nguyen
(74) *Attorney, Agent, or Firm* — Penny L. Lowry

(57) ABSTRACT

A display device comprising a spatial light modulator having a display polariser arranged on one side is provided with an additional polariser arranged on the same side as the display polariser and a polar control retarder between the additional polariser and the display polariser. The polar control retarder includes a liquid crystal retarder having two surface alignment layers disposed adjacent to a layer of liquid crystal material on opposite sides. The surface alignment layers provide alignment in the adjacent liquid crystal material with a twist. The out-of-plane orientation of the twisted layer of liquid crystal material is modified across at least one region of the display device to provide a transmission function in response to the measured location of an off-axis snooper, achieving increased size of polar region for which desired uniformity of security factor, or reduced distraction across the display to the driver in an automotive application is achieved.

51 Claims, 53 Drawing Sheets

(51) Int. Cl.

| | | |
|---|---|---|
| *G02F 1/13* | (2006.01) | |
| *G02F 1/133* | (2006.01) | |
| *G02F 1/1335* | (2006.01) | |
| *G02F 1/13363* | (2006.01) | |
| *G02F 1/1337* | (2006.01) | |
| *G02F 1/1343* | (2006.01) | |
| *H04N 13/383* | (2018.01) | |

(52) U.S. Cl.
CPC .... *G02F 1/1336* (2013.01); *G02F 1/133536* (2013.01); *G02F 1/133607* (2021.01); *G02F 1/133636* (2013.01); *G02F 1/133738* (2021.01); *G02F 1/133796* (2021.01); *G02F 1/134318* (2021.01); *H04N 13/383* (2018.05)

(56) References Cited

U.S. PATENT DOCUMENTS

| | | | |
|---|---|---|---|
| 4,586,790 A | | 5/1986 | Umeda et al. |
| 4,621,898 A | | 11/1986 | Cohen |
| 4,974,941 A | | 12/1990 | Gibbons et al. |
| 5,005,108 A | | 4/1991 | Pristash et al. |
| 5,035,491 A | | 7/1991 | Kawagishi et al. |
| 5,126,882 A | | 6/1992 | Oe et al. |
| 5,579,139 A | | 11/1996 | Abileah et al. |
| 5,608,550 A | | 3/1997 | Epstein et al. |
| 5,658,490 A | | 8/1997 | Sharp et al. |
| 5,671,994 A | | 9/1997 | Tai et al. |
| 5,715,028 A | | 2/1998 | Abileah et al. |
| 5,726,729 A | * | 3/1998 | Takei ............... G02F 1/13725 349/128 |
| 5,779,337 A | | 7/1998 | Saito et al. |
| 5,791,757 A | | 8/1998 | O'Neil et al. |
| 5,808,784 A | | 9/1998 | Ando et al. |
| 5,835,166 A | | 11/1998 | Hall et al. |
| 5,852,509 A | | 12/1998 | Coleman |
| 5,854,872 A | | 12/1998 | Tai |
| 5,894,361 A | | 4/1999 | Yamazaki et al. |
| 5,914,760 A | | 6/1999 | Daiku |
| 5,997,148 A | | 12/1999 | Ohkawa |
| 6,055,103 A | | 4/2000 | Woodgate et al. |
| 6,099,758 A | | 8/2000 | Verrall et al. |
| 6,144,433 A | | 11/2000 | Tillin et al. |
| 6,169,589 B1 | | 1/2001 | Kaneko |
| 6,204,904 B1 | | 3/2001 | Tillin et al. |
| 6,222,672 B1 | | 4/2001 | Towler et al. |
| 6,280,043 B1 | | 8/2001 | Ohkawa |
| 6,364,497 B1 | | 4/2002 | Park et al. |
| 6,379,016 B1 | | 4/2002 | Boyd et al. |
| 6,392,727 B1 | | 5/2002 | Larson et al. |
| 6,437,915 B2 | | 8/2002 | Moseley et al. |
| 6,731,355 B2 | | 5/2004 | Miyashita |
| 6,752,505 B2 | | 6/2004 | Parker et al. |
| 6,987,550 B2 | | 1/2006 | Takato et al. |
| 7,067,985 B2 | | 6/2006 | Adachi |
| 7,072,096 B2 | | 7/2006 | Holman et al. |
| 7,163,319 B2 | | 1/2007 | Kuo et al. |
| 7,227,602 B2 | | 6/2007 | Jeon et al. |
| 7,366,392 B2 | | 4/2008 | Honma et al. |
| 7,524,542 B2 | | 4/2009 | Kim et al. |
| 7,528,893 B2 | | 5/2009 | Schultz et al. |
| 7,528,913 B2 | | 5/2009 | Kobayashi |
| 7,633,586 B2 | | 12/2009 | Winlow et al. |
| 7,660,047 B1 | | 2/2010 | Travis et al. |
| 7,766,534 B2 | | 8/2010 | Iwasaki |
| 7,834,834 B2 | | 11/2010 | Takatani et al. |
| 7,970,246 B2 | | 6/2011 | Travis et al. |
| 7,991,257 B1 | | 8/2011 | Coleman |
| 8,070,346 B2 | | 12/2011 | Maeda et al. |
| 8,098,350 B2 | | 1/2012 | Sakai et al. |
| 8,154,686 B2 | | 4/2012 | Mather et al. |
| 8,228,476 B2 | | 7/2012 | Shibazaki |
| 8,237,876 B2 | | 8/2012 | Tan et al. |
| 8,249,408 B2 | | 8/2012 | Coleman |
| 8,262,271 B2 | | 9/2012 | Tillin et al. |
| 8,469,575 B2 | | 6/2013 | Weber et al. |
| 8,646,931 B2 | | 2/2014 | Choi et al. |
| 8,801,260 B2 | | 8/2014 | Urano et al. |
| 8,848,132 B2 | | 9/2014 | O'Neill et al. |
| 8,939,595 B2 | | 1/2015 | Choi et al. |
| 8,973,149 B2 | | 3/2015 | Buck |
| 9,195,087 B2 | | 11/2015 | Terashima |
| 9,274,260 B2 | | 3/2016 | Urano et al. |
| 9,304,241 B2 | | 4/2016 | Wang et al. |
| 9,324,234 B2 | | 4/2016 | Ricci et al. |
| 9,448,355 B2 | | 9/2016 | Urano et al. |
| 9,501,036 B2 | | 11/2016 | Kang et al. |
| 9,519,153 B2 | | 12/2016 | Robinson et al. |
| 9,541,698 B2 | | 1/2017 | Wheatley et al. |
| 9,798,169 B2 | | 10/2017 | Su et al. |
| 9,939,675 B2 | | 4/2018 | Peng et al. |
| 10,054,732 B2 | | 8/2018 | Robinson et al. |
| 10,067,726 B2 | | 9/2018 | Wakamoto et al. |
| 10,126,575 B1 | | 11/2018 | Robinson et al. |
| 10,146,093 B2 | | 12/2018 | Sakai et al. |
| 10,216,018 B2 | | 2/2019 | Fang et al. |
| 10,288,914 B2 | | 5/2019 | Chung et al. |
| 10,303,030 B2 | | 5/2019 | Robinson et al. |
| 10,401,638 B2 | | 9/2019 | Robinson et al. |
| 10,424,232 B2 | | 9/2019 | Schubert et al. |
| 10,488,705 B2 | | 11/2019 | Xu et al. |
| 10,527,775 B2 | | 1/2020 | Yang et al. |
| 10,627,670 B2 | | 4/2020 | Robinson et al. |
| 10,649,248 B1 | | 5/2020 | Jiang et al. |
| 10,649,259 B2 | | 5/2020 | Lee et al. |
| 10,712,608 B2 | | 7/2020 | Robinson et al. |
| 10,802,356 B2 | | 10/2020 | Harrold et al. |
| 10,935,714 B2 | | 3/2021 | Woodgate et al. |
| 10,948,648 B2 | | 3/2021 | Ihas et al. |
| 10,976,578 B2 | | 4/2021 | Robinson et al. |
| 11,016,341 B2 | | 5/2021 | Robinson et al. |
| 11,070,791 B2 | | 7/2021 | Woodgate et al. |
| 11,079,645 B2 | | 8/2021 | Harrold et al. |
| 11,079,646 B2 | | 8/2021 | Robinson et al. |
| 11,092,851 B2 | | 8/2021 | Robinson et al. |
| 11,099,433 B2 | | 8/2021 | Robinson et al. |
| 11,099,448 B2 | | 8/2021 | Woodgate et al. |
| 11,237,417 B2 | | 2/2022 | Woodgate et al. |
| 11,327,358 B2 | | 5/2022 | Robinson et al. |
| 11,366,358 B2 | | 6/2022 | Wu et al. |
| 11,442,316 B2 | | 9/2022 | Woodgate et al. |
| 2001/0024561 A1 | | 9/2001 | Cornelissen et al. |
| 2002/0015300 A1 | | 2/2002 | Katsu et al. |
| 2002/0024529 A1 | | 2/2002 | Miller et al. |
| 2002/0171793 A1 | | 11/2002 | Sharp et al. |
| 2003/0030764 A1 | | 2/2003 | Lee |
| 2003/0058381 A1 | | 3/2003 | Shinohara et al. |
| 2003/0089956 A1 | | 5/2003 | Allen et al. |
| 2003/0107686 A1 | | 6/2003 | Sato et al. |
| 2003/0117792 A1 | | 6/2003 | Kunimochi et al. |
| 2003/0169499 A1 | | 9/2003 | Bourdelais et al. |
| 2003/0214615 A1 | | 11/2003 | Colgan et al. |
| 2003/0222857 A1 | | 12/2003 | Abileah |
| 2004/0015729 A1 | | 1/2004 | Elms et al. |
| 2004/0100598 A1 | | 5/2004 | Adachi et al. |
| 2004/0125430 A1 | | 7/2004 | Kasajima et al. |
| 2004/0141107 A1 | | 7/2004 | Jones |
| 2004/0145703 A1 | | 7/2004 | O'Connor et al. |
| 2004/0223094 A1 | | 11/2004 | Hamada et al. |
| 2004/0240777 A1 | | 12/2004 | Woodgate et al. |
| 2004/0264910 A1 | | 12/2004 | Suzuki et al. |
| 2005/0002174 A1 | | 1/2005 | Min et al. |
| 2005/0014913 A1 | | 1/2005 | Kim et al. |
| 2005/0111100 A1 | | 5/2005 | Mather et al. |
| 2005/0117186 A1 | | 6/2005 | Li et al. |
| 2005/0135116 A1 | | 6/2005 | Epstein et al. |
| 2005/0157225 A1 | | 7/2005 | Toyooka et al. |
| 2005/0190326 A1 | | 9/2005 | Jeon et al. |
| 2005/0190329 A1 | | 9/2005 | Okumura |
| 2005/0206814 A1 | * | 9/2005 | Histake ............... G02F 1/1323 349/112 |
| 2005/0213348 A1 | | 9/2005 | Parikka et al. |
| 2005/0219693 A1 | | 10/2005 | Hartkop et al. |
| 2005/0243265 A1 | | 11/2005 | Winlow et al. |

(56) References Cited

U.S. PATENT DOCUMENTS

| | | |
|---|---|---|
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1* | 8/2009 | Sagardoyburu .... G02B 27/0093 345/690 |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1* | 3/2010 | Smith ................ G02F 1/1393 349/128 |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0088284 A1* | 3/2015 | Hendricks .............. A61B 5/486 700/83 |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |

(56) References Cited

U.S. PATENT DOCUMENTS

| | | |
|---|---|---|
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1* | 7/2019 | Woodgate ............. G02F 1/1337 |
| 2019/0227366 A1* | 7/2019 | Harrold ................. G06F 3/0446 |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1* | 1/2020 | Robinson ............. G02F 1/1337 |
| 2020/0041839 A1 | 2/2020 | Robinson et al. |
| 2020/0110301 A1 | 4/2020 | Harrold et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1* | 5/2021 | Robinson ............. G02B 6/0016 |
| 2021/0149234 A1* | 5/2021 | Woodgate ........ G02F 1/133528 |
| 2021/0271121 A1 | 9/2021 | Woodgate et al. |
| 2021/0341769 A1* | 11/2021 | Woodgate ............ G02B 6/0053 |
| 2021/0373382 A1 | 12/2021 | Sakai et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 107102460 A | 8/2017 |
| CN | 209171779 U | 7/2019 |
| EP | 1956423 A1 | 8/2008 |
| EP | 2037318 A1 | 3/2009 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011103241 A | 5/2011 |
| JP | 2014032953 A | 2/2014 |
| JP | 2014099363 A | 5/2014 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |

(56) References Cited

FOREIGN PATENT DOCUMENTS

| | | |
|---|---|---|
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.
PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
PCT/US2022/045030 International search report and written opinion of the international searching authority mailed Jan. 3, 2023.
PCT/US2023/012240 International search report and written opinion of the international searching authority mailed Apr. 27, 2023.
PCT/US2023/012243 International search report and written opinion of the international searching authority mailed May 10, 2023.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
TW107132221 First Office Action dated Apr. 28, 2022.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN-201880042320.X Notification of the Third Office Action from the Chinese Patent Office dated Dec. 30, 2022.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
CN-201980082757.0 Notification of the 1st Office Action of the Chinese Patent Office mailed Dec. 5, 2022.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP19771688.9 Notification of the First Office Action dated Mar. 6, 2023.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
EP-20835231.0 Extended European Search Report of European Patent Office dated May 15, 2023.
Gass, et al. "Privacy LCD Technology for Cellular Phones", Sharp Laboratories of Europe Ltd, Mobile LCD Group, Feb. 2007, pp. 45-49.
JP2019-561773 Non-Final Notice of Reasons for Rejection dated Mar. 22, 2022.
JP2020-509511 Non-Final Notice of Reasons for Rejection dated Jul. 19, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.

(56) References Cited

OTHER PUBLICATIONS

JP2020-550747 Non-Final Notice of Reasons for Rejection dated Mar. 29, 2023.
Kalantar, et al. "Backlight Unit With Double Surface Light Emission," J. Soc. Inf. Display, vol. 12, Issue 4, pp. 379-387 (Dec. 2004).
KR10-2020-7010753 Notice of Preliminary Rejection mailed Feb. 17, 2023.
Nelkon et al., "Advanced Level Physics", Third edition with SI units, Heinemann Educational Books Ltd, London, 1970.
PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.
CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.
EP-20851155.0 Extended European Search Report of European Patent Office dated Aug. 2, 2023.
PCT/US2023/017639 International search report and written opinion of the international searching authority mailed Jul. 6, 2023.
EP-20887756.3 Extended European Search Report of European Patent Office dated Jan. 2, 2024.
EP-20898295.9 Extended European Search Report of European Patent Office dated Jan. 22, 2024.
IN202017035853 Hearing Notice dated Jan. 3, 2024.
KR10-2020-7024293 Notice of Preliminary Rejection mailed Dec. 7, 2023.
TW108140291 First Office Action dated Nov. 9, 2023.

* cited by examiner

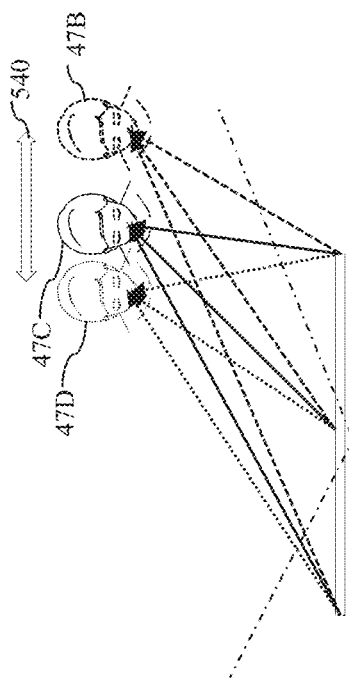
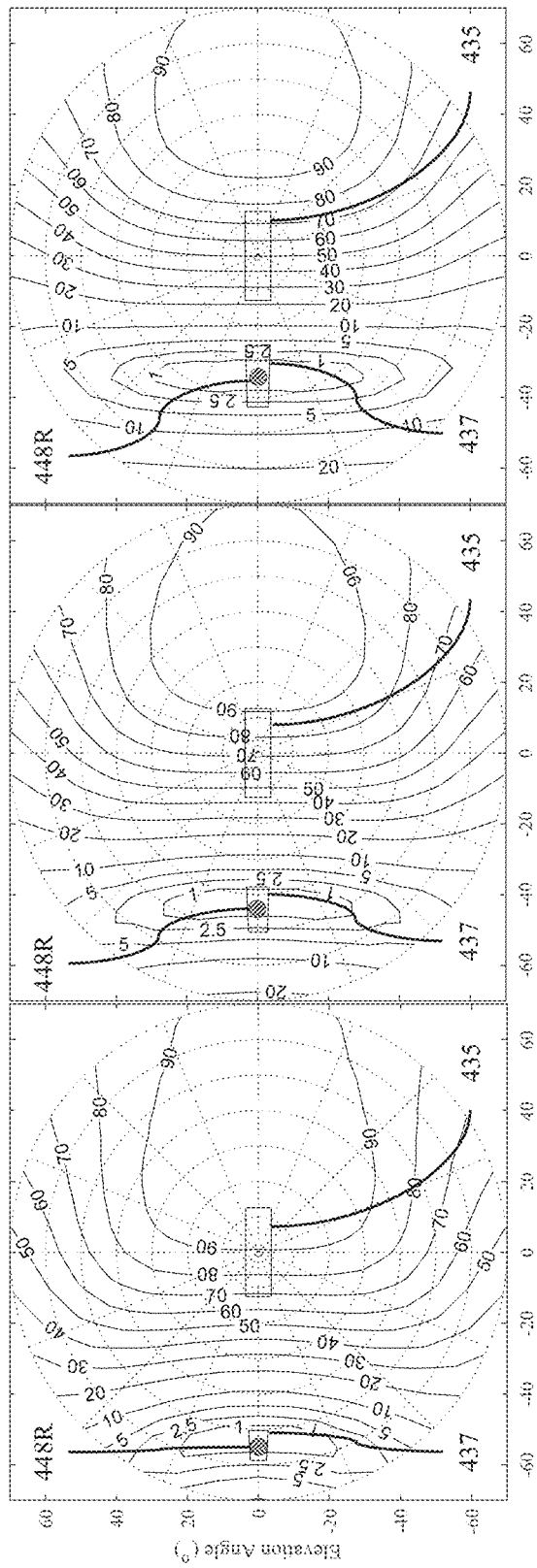
*FIG. 7A*
*FIG. 7B*
*FIG. 7C*
*FIG. 7D*

OBSERVER-TRACKED PRIVACY DISPLAY

TECHNICAL FIELD

This disclosure generally relates to luminance uniformity in display devices, including for application to privacy display.

BACKGROUND

Display devices may be configured to reduce luminance in directions offset from a viewing axis, typically normal to the display device. Such off-axis luminance reduction may have various purposes. In one example, off-axis luminance reduction may be applied in a privacy display to provide visibility of a displayed image to a primary user in an on-axis position and reduce visibility of the displayed image to a snooper in an off-axis position. In another example off-axis luminance reduction may be applied to reduce stray light that may otherwise cause unwanted reflections in an environment around the display device, for example within an automobile.

A privacy function may be provided by micro-louvre optical films that transmit a high luminance from a display device in an on-axis direction with low luminance in off-axis positions. However, such films are not switchable, and thus the display is limited to privacy-only function.

Switchable privacy displays may be provided by implementing control of the off-axis optical output. Control of off-axis privacy may be provided by means of contrast reduction, for example by adjusting the liquid crystal bias tilt in an In-Plane-Switching LCD.

Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator.

Control may be further provided by means of off-axis reflectivity increase. Reflectivity increase may be achieved by means of switchable liquid crystal retarders, compensation retarders that are arranged to control the polarisation of ambient light that falls onto a reflective polariser.

However, in operation such off-axis luminance reduction may provide non-uniformity of luminance across the area of the display device for display viewers. For many applications, it would be desirable to increase the perceived uniformity.

BRIEF SUMMARY

According to the present disclosure, there is provided a display apparatus comprising: a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder arranged between the display polariser and the additional polariser, wherein the at least one polar control retarder comprises a switchable liquid crystal retarder comprising a layer of liquid crystal material; two surface alignment layers disposed adjacent to the layer of liquid crystal material and on opposite sides thereof, the surface alignment layers each being arranged to provide homogenous alignment in the adjacent liquid crystal material, the liquid crystal material being provided with a twist; and first and second electrode arrangements disposed on opposite sides of the layer of liquid crystal material and arranged to provide an electric field perpendicular to the layer of liquid crystal material, wherein the display apparatus further comprises a control system arranged to control the spatial light modulator and to supply voltages to the first and second electrode arrangements for providing the electric field perpendicular to the layer of liquid crystal material, the control system being arranged to vary the voltages to the first and second electrode arrangements for controlling a direction of minimum light transmission of the view angle control arrangement.

The display apparatus may advantageously provide controllable luminance for desirable observer locations. In a privacy mode of operation of the display apparatus, the size of polar region for which high image security is achieved may advantageously be increased. The display apparatus may be switched to a share mode of operation for high image visibility for multiple display users.

The display apparatus may further comprise a viewer tracking system arranged to track the location of a viewer, wherein the control system may be arranged to vary the voltages to the first and second electrode arrangements in response to the tracked location of the viewer. The illumination provided to a moving observer may be optimised for uniformity of luminance or for uniformity of security factor. Advantageously image visibility to a driver in an automotive vehicle may be minimised.

The control system may be arranged to accept user input indicating a direction of minimum light transmission of the view angle control arrangement, and the control system may be arranged to vary the voltages to the first and second electrode arrangements in response to the user input. Advantageously the cost of the control system may be reduced.

Components of the optical axis of the liquid crystal material in the plane of the layer of liquid crystal material may have an average direction that may be along the predetermined direction. Advantageously luminance may be controlled towards an off-axis observer of the display device.

The magnitude of the electric field perpendicular to the layer of liquid crystal material may change monotonically along a predetermined axis across at least part of the display device. Advantageously, a display apparatus may be provided which reduces changes in luminance across at least part of the display device as perceived by a viewer in a predetermined position, in at least one state of the liquid crystal material. For example, for an off-axis viewer, e.g. a snooper, the display apparatus may provide a more uniform luminance across at least part of the display, e.g. across the width of the display. In such cases, the luminance may be a uniform reduced luminance such that the off-axis viewer cannot observe any image output by the display device at any point along the display device. Further the uniformity of the security level may be increased for a snooper. In a similar manner, for an on-axis viewer, e.g. the primary user of the display device, the display apparatus may also provide a more uniform luminance across at least part of the display for the on-axis viewer. Such uniform luminance across at least part of the display apparatus may be a non-reduced, or observable, luminance such that the on-axis viewer can observe the image output by the display. This may therefore reduce the "roll-off" which occurs on prior art displays whereby the luminance reduces towards the edges of the display for an on-axis viewer. Advantageously display device users may have increased luminance and image uniformity. Transmission at desirable viewing angles from the display is increased.

The magnitude of the electric field may change monotonically along a predetermined axis across at least part of the display device so that directions of minimum light transmission of the view angle control arrangement from points of said at least part of the display device may be directed towards a common off-axis point in front of the display device. Advantageously an observer near to the common off-axis point may see low intensity across the width of at least part of the display. The viewing angle of the display changes monotonically along the predetermined direction, and the electric field change advantageously achieves a matched reduction in transmission corresponding to the monotonic change in viewing angle. Uniformity of security factor is increased and image visibility reduced. In an automotive vehicle, driver distraction may be minimised.

The first electrode arrangement may comprise a continuous electrode extending over the entirety of the layer of liquid crystal material, the continuous electrode having at least one contact disposed at each of opposite ends of the continuous electrode along the predetermined axis and arranged to supply respective voltages that create a voltage profile on the continuous electrode along the predetermined axis for providing the electric field perpendicular to the layer of liquid crystal material. Advantageously the cost and complexity of the electrode may be reduced and desirable transmission of polar control retarder with polar angle may be achieved.

At least one of the contacts may comprise a conductive bar extending perpendicular to the predetermined axis. Advantageously uniformity of transmission reduction in the predetermined direction may be increased.

The first electrode arrangement may comprise plural electrodes separated along the predetermined axis, the plural electrodes being arranged to supply different voltages that may change monotonically along the predetermined axis. The location of the common point may be modified.

The second electrode arrangement may be arranged to supply a common voltage. The second electrode arrangement may comprise a continuous electrode extending over the entirety of the layer of liquid crystal material. Advantageously cost and complexity may be reduced.

The magnitude of the electric field may be uniform across the entirety of the display device. Each of the first electrode arrangement and the second electrode arrangement may comprise a continuous electrode extending over the entirety of the layer of liquid crystal material. The size of the polar region for high image security and high luminance may be increased. Advantageously the cost and complexity of the electrodes and control system may be reduced.

The surface alignment layers may each be arranged to provide homogenous alignment in the adjacent liquid crystal material, wherein the surface alignment layers may have an in-plane component in the plane of the layer of liquid crystal material having an angle that changes monotonically along a predetermined axis across at least part of the display device. Further improvement of uniformity across the display device may be achieved. Cost and complexity of electrodes and the control system may be achieved.

The switchable liquid crystal retarder may have a retardance for light of a wavelength of 550 nm in a range from 300 nm to 1500 nm, preferably in a range from 400 nm to 1200 nm. The twist may be in a range from 60° to 120°, preferably in a range from 70° to 90°. Advantageously in a privacy mode of operation off-axis transmission reduction may be provided directed towards typical off-axis user locations.

The electric vector transmission direction of the additional polariser may be oriented at a non-zero angle with respect to the electric vector transmission direction of the display polariser. The non-zero angle may be the same as the twist. Advantageously transmission of light towards an off-axis user may be minimised.

The surface alignment layer closest to the display polariser may have a pretilt having a pretilt direction with a component in the plane of the layer of liquid crystal material that may be parallel or perpendicular to an electric vector transmission direction of the display polarisers, and the surface alignment layer closest to the additional polariser may have a pretilt having a pretilt direction with a component in the plane of the layer of liquid crystal material that may be parallel or perpendicular to an electric vector transmission direction of the additional polariser. Advantageously transmission may be minimised over an increased size of polar viewing region.

The at least one polar control retarder may further comprise at least one passive retarder. The at least one passive retarder may be an A-plate with a retardance for light of a wavelength of 550 nm in a range of 250 nm to 300 nm. Advantageously a spatial light modulator with display polarisers not aligned to the desirable alignment layer directions may be provided.

The liquid crystal material may have a positive dielectric anisotropy. Advantageously a share mode operation may be provided at zero volts for low power consumption.

The display apparatus may be curved with a concave curvature as viewed from the output side. Advantageously increased luminance uniformity and increased uniformity of security factor may be achieved. The display apparatus may be conveniently provided with curved mounting surfaces, including surfaces of an automotive cabin.

Said display polariser may be an output display polariser arranged on the output side of the spatial light modulator. Advantageously the thickness and complexity of the backlight may be reduced. The polar control retarder may be retrofitted to an assembled display module.

There may be no reflective polariser arranged between the output display polariser and the at least one polar control retarder. Advantageously cost and complexity may be reduced.

The display apparatus may further comprise a reflective polariser arranged between the output polariser and the at least one polar control retarder, the reflective polariser being a linear polariser arranged to pass the same linearly polarised polarisation component as the output polariser. Advantageously the security factor of the display may be increased and driver distraction reduced.

The spatial light modulator may comprise an emissive spatial light modulator arranged to emit the spatially modulated light. Advantageously image contrast may be increased and display thickness reduced.

The spatial light modulator may comprise a transmissive spatial light modulator and the display apparatus may further comprise a backlight arranged to illuminate the spatial light modulator.

The spatial light modulator may comprise a transmissive spatial light modulator, the display apparatus may further comprise a backlight arranged to illuminate the spatial light modulator, and said display polariser may be an input display polariser arranged on the input side of the spatial light modulator. Advantageously a backlight with desirable luminance profile for use in privacy applications may be provided. Front reflections to a display user may be reduced and image contrast improved.

The display apparatus may further comprise: an output display polariser arranged on the output side of the spatial light modulator; a further additional polariser arranged on the output side of the spatial light modulator, the further additional polariser being a linear polariser; and at least one further polar control retarder arranged between the further additional polariser and the output display polariser.

The luminance of light for an off-axis viewer may advantageously be further reduced thereby further improving the privacy function of the display device. Each of the polar control retarders, together with their associated polarisers, may independently reduce the luminance in an off-axis direction. Together the two polar control retarders and their associated polarisers may have a multiplicative effect in reducing the off-axis luminance. This may therefore significantly reduce the luminance for an off-axis viewer.

It may be possible to advantageously reduce changes in luminance across at least part of the display device in two directions perpendicular to one another. This may, for example, make it possible to create uniform luminance for an off-axis viewer in two different directions relative to the display device, e.g. for an off-axis viewer to the side of the display device and for an off-axis viewer at an angle above or below the display device. When used to provide uniform reduced luminance, this may therefore improve the privacy achieved by the display device.

It may be possible to have an off-axis privacy effect that is controlled between two different predetermined lateral directions. The predetermined directions may be opposite to each other to provide switchable luminance reduction on either side of the display by means of control of which polar control retarder is operated.

The at least one further polar control retarder may comprise a switchable liquid crystal retarder comprising a layer of liquid crystal material, and the display apparatus may further comprise first and second electrode arrangements disposed on opposite sides of the layer of liquid crystal material, wherein first and second electrode arrangements may be arranged to provide an electric field perpendicular to the layer of liquid crystal material, wherein the magnitude of the electric field may change monotonically along a predetermined axis across at least part of the display device. The electric fields may have different profiles and may increase the size of the polar region for which high image security and low driver distraction is achieved.

The display apparatus may further comprise: a further additional polariser arranged on the same side of the spatial light modulator as the additional polariser outside the additional polariser, the further additional polariser being a linear polariser; and at least one further polar control retarder arranged between the additional polariser and the further additional polariser. The polar control retarders and additional polarisers may be provided as a single component, advantageously reducing complexity of assembly. The polar control retarders may be provided between the backlight and the spatial light modulator, advantageously reducing the visibility of front reflections to the user and increasing perceived image contrast.

The at least one further polar control retarder may comprise a switchable liquid crystal retarder comprising a layer of liquid crystal material, and the display apparatus may further comprise first and second electrode arrangements disposed on opposite sides of the layer of liquid crystal material, wherein first and second electrode arrangements may be arranged to provide an electric field perpendicular to the layer of liquid crystal material, wherein the magnitude of the electric field may change monotonically along a predetermined axis across at least part of the display device. Advantageously the uniformity of luminance reduction from the further polar control retarder is increased. Uniformity of security factor may be increased.

The backlight may comprise: at least one first light source arranged to provide input light; at least one second light source arranged to provide input light in an opposite direction from the at least one first light source; a waveguide arrangement comprising at least one waveguide, the waveguide arrangement being arranged to receive the input light from the at least one first light source and the at least one second light source and to cause light from the at least one first light source and the at least one second light source to exit from the waveguide arrangement by breaking total internal reflection; and an optical turning film component comprising: an input surface arranged to receive the light exiting from a waveguide through a light guiding surface of the waveguide by breaking total internal reflection, the input surface extending across the plane; and an output surface facing the input surface, wherein the input surface may comprise an array of prismatic elements. Luminance profiles may be provided with first and second maxima with different polar directions. The luminance directed to said first and second maxima may be controlled by means of control of the light sources. Advantageously the image security provided to a user such as a driver may be increased by control of at least one of the light sources. High brightness and efficiency may be provided for the primary display user.

The waveguide arrangement may comprise: a waveguide extending across a plane and comprising: first and second opposed light guiding surfaces arranged to guide light along the optical waveguide, the second light guiding surface being arranged to guide light by total internal reflection, and first and second input ends arranged between the first and second light guiding surfaces and extending in a lateral direction between the first and second light guiding surfaces; wherein the at least one first light source may be arranged to input light into the waveguide through the first input end and the at least one second light source may be arranged to input light into the waveguide through the second input end, and the waveguide may be arranged to cause light from the at least one first light source and the at least one second light source to exit from the waveguide through one of the first and second light guiding surfaces by breaking total internal reflection. Advantageously the thickness and complexity of the waveguide is reduced.

The waveguide arrangement may comprise: a first waveguide extending across a plane and comprising first and second opposed light guiding surfaces arranged to guide light along the optical waveguide, the second light guiding surface being arranged to guide light by total internal reflection; and a first input end arranged between the first and second light guiding surfaces and extending in a lateral direction between the first and second light guiding surfaces; wherein the at least one first light source may be arranged to input light into the first waveguide through the first input end, and the first waveguide may be arranged to cause light from the at least one first light source to exit from the first waveguide through one of the first and second light guiding surfaces by breaking total internal reflection; a second waveguide extending across the plane arranged in series with the first waveguide and comprising first and second opposed light guiding surfaces arranged to guide light along the optical waveguide, the second light guiding surface being arranged to guide light by total internal reflection, and a second input end arranged between the first and second light guiding surfaces and extending in a lateral direction between the first and second light guiding surfaces; wherein the at least one second light source may be arranged to input light into the second waveguide through the second input end, and the second waveguide may be arranged to cause light from the at least one second light source to exit from the second waveguide through one of the first and second light guiding surfaces by breaking total internal reflection, and wherein the first and second waveguides may be oriented so that at least one first light source and at least one second light source input light into the first and second waveguides in opposite directions. Advantageously the uniformity of light output from each waveguide can be increased for each of the display users.

The display apparatus may comprise plural, tiled display devices. Advantageously increased display area may be provided at increased display yield and lower display cost. Replacement of regions across the display device arising from failure or damage to small areas may be conveniently provided with lower cost. Illumination characteristics of different regions of the display device may be provided by different display device structures.

The magnitude of the electric field across at least part of the display device may be different in different display devices. Some or all of the illumination structures from respective display devices may be modified in response to user location. Advantageously increased size of polar region for high uniformity of luminance and/or security factor may be achieved.

The profile of the change in the magnitude of the electric field monotonically along a predetermined axis across at least part of the display device may be different in different display devices. The directions of minimum light transmission of the view angle control arrangement from points of said at least part of each of the display devices may be directed towards a common off-axis point in front of the display device. Advantageously luminance uniformity of each of the display devices to respective users may be increased. Uniformity of security factor may be increased over a wider polar region and wider total display width.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 7A is a schematic top view of operation of a privacy display for a moving driver and a head tracking system arranged to minimise luminance to the driver;

FIG. 7B, FIG. 7C, and FIG. 7D are graphs illustrating the variation of transmission with polar direction for the polar control retarder of FIG. 2A using the twisted nematic polar control retarder of FIG. 3 operating with different voltage profiles across the polar control retarder;

DETAILED DESCRIPTION

Figure 1A:
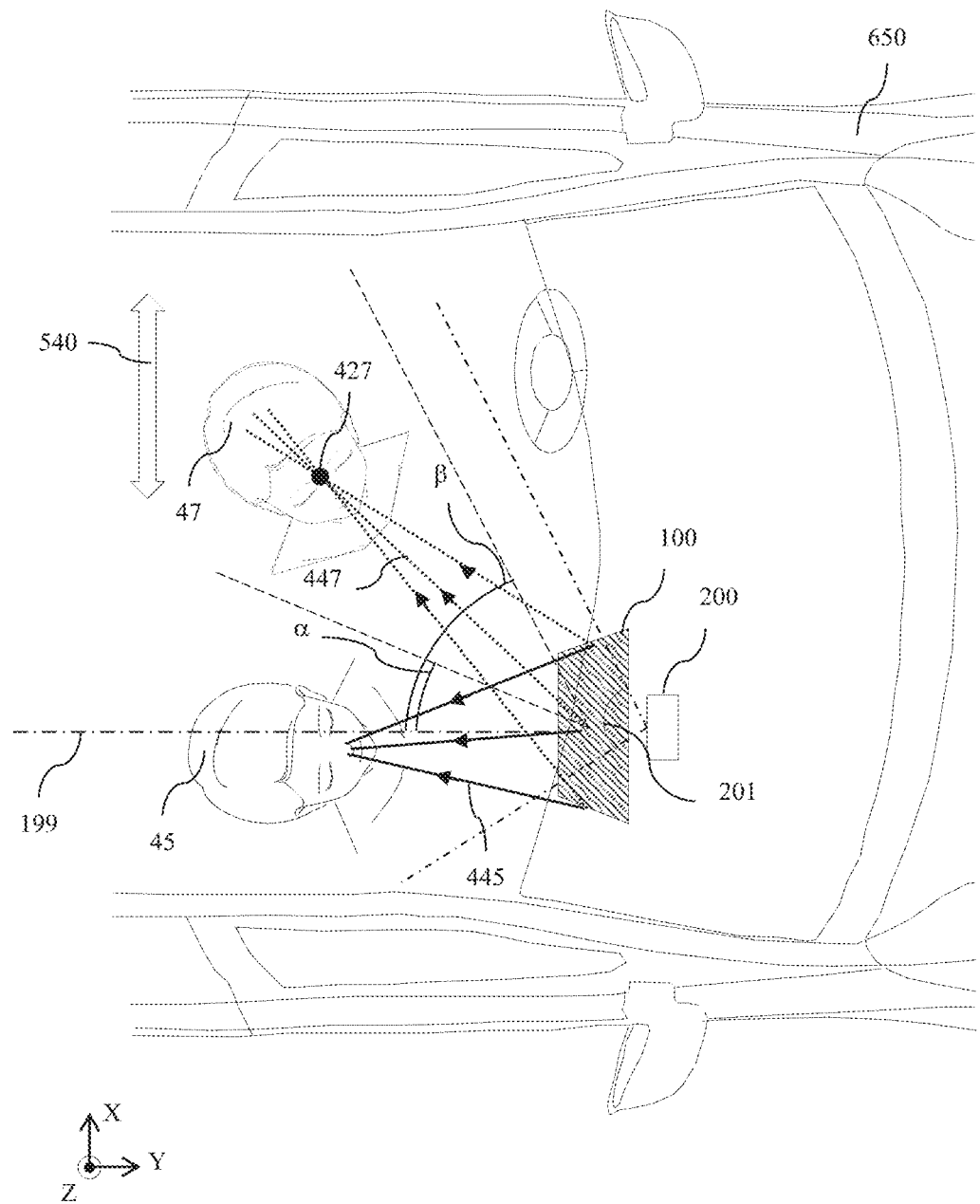
FIG. 1A is a schematic diagram illustrating a schematic top view of a privacy display for use by a passenger in an automotive vehicle.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, Γ, that it imparts on the two polarization components; which is related to the birefringence Δn and the thickness d of the retarder by $$\Gamma = 2 \cdot \pi \cdot \Delta n \cdot d / \lambda_0 \qquad \text{eqn. 1}$$

In eqn. 1, Δn is defined as the difference between the extraordinary and the ordinary index of refraction, i.e.

$$\Delta n = n_e - n_o \qquad \text{eqn. 2}$$

For a half-wave retarder, the relationship between d, Δn and $\lambda_0$ is chosen so that the phase shift between polarization components is Γ=π. For a quarter-wave retarder, the relationship between d, Δn, and $\lambda_0$ is chosen so that the phase shift between polarization components is Γ=π/2.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive Δn. A 'negative C-plate' refers to negatively birefringent C-plates, i.e. C-plates with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with a retardance Δn·d that varies with wavelength λ as $$\Delta n \cdot d / \lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A super-twisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V=(Y+R)/(Y-K) \qquad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

so the visual security level may be further given as:

$$V=(P \cdot Y_{max}+I \cdot \rho/\pi)/(P \cdot (Y_{max}-Y_{max}/C)) \qquad \text{eqn. 6}$$

where: $Y_{max}$ is the maximum luminance of the display; P is the off-axis relative luminance typically defined as the ratio of luminance at the snooper angle to the maximum luminance $Y_{max}$; C is the image contrast ratio; p is the surface reflectivity; and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0°. By way of example, the maximum luminance $Y_{max}$ may occur at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser, illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$V=1+I \cdot \rho/(\pi \cdot P \cdot Y_{max}) \qquad \text{eqn. 7}$$

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that $$S=\log_{10}(V) \qquad \text{eqn. 8}$$

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer position at a polar angle of greater than 0° to the normal to the display device. The variation $I(\theta)$ of illuminance of a substantially Lambertian emitting lightbox with polar viewing angle was determined by and measuring the variation of recorded reflective luminance with polar viewing angle taking into account the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 m, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(\theta=0)$, for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In practical display devices, this means that it is desirable to provide a value of S for an off-axis viewer who is a snooper that meets the relationship $S \geq S_{min}$, where: $S_{min}$ has a value of 1.0 or more to achieve the effect that the off-axis viewer cannot perceive the displayed image; $S_{min}$ has a value of 1.5 or more to achieve the effect that the displayed image is invisible, i.e. the viewer cannot perceive even that an image is being displayed, for most images and most observers; or $S_{min}$ has a value of 1.8 or more to achieve the effect that the displayed image is invisible independent of image content for all observers.

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2 \cdot R) \qquad \text{eqn. 10}$$

Thus the visual security level (VSL), V is equivalent (but not identical to) 1/M. In the present discussion, for a given off-axis relative luminance, P the wide angle image visibility, W is approximated as $$W=1/V=1/(1+I \cdot \rho/(\pi \cdot P \cdot Y_{max})) \qquad \text{eqn. 11}$$

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.1 may provide acceptable visibility of the displayed image. In practical display devices, this means that it is desirable to provide a value of S for an on-axis viewer who is the intended user of the display device that meets the relationship $S \leq S_{max}$, where $S_{max}$ has a value of 0.1.

In the present discussion the colour variation $\Delta \varepsilon$ of an output colour $(u_w'+\Delta u', v_w'+\Delta v')$ from a desirable white point $(u_w', v_w')$ may be determined by the CIELUV colour difference metric, assuming a typical display spectral illuminant and is given by:

$$\Delta \varepsilon = (\Delta u'^2 + \Delta v'^2)^{1/2} \qquad \text{eqn. 12}$$

Switchable directional display apparatuses for use in privacy display for example and comprising plural retarders arranged between a display polariser and an additional polariser are described in U.S. Pat. Nos. 11,092,851, 10,948,648, and WIPO Publ. No. 2019-055755 (U.S. Pat. No. 11,099,433), all of which are herein incorporated by reference in their entireties. Directional display apparatuses further comprising reflective polarisers arranged between the display polariser and retarders are described in U.S. Pat. No. 10,976,578 and in U.S. Pat. No. 10,802,356, both of which are herein incorporated by reference in their entireties. Directional display polarisers comprising passive retarders arranged between a display polariser and an additional polariser are described U.S. Pat. No. 11,327,358, which is herein incorporated by reference in its entirety.

Curvature is a property of a line that is curved and for the present disclosure is the inverse radius of curvature. A planar surface has a curvature of zero.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

A switchable privacy display such as for a vehicle will now be described.

FIG. 1A is a schematic diagram illustrating a schematic top view of a privacy display device 100 for use by a passenger in a vehicle. Vehicles may include the automotive vehicle 650 of FIG. 1A or trains, boats, and airplanes for example.

Display device 100 is arranged in a passenger information display (PID) location, (on the right-hand side of the vehicle for Left-Hand Drive), with light rays 445, 447 output to the user 45 and user 47 respectively. In right-hand drive vehicles, the directions of light deflection referred to hereinbelow are typically reflected about a vertical axis, that is the lateral direction is reversed.

In a first mode of operation that is the privacy mode the display device 100 is arranged for viewing by the front passenger 45 near to an on-axis 199 location, and to inhibit viewing by the driver 47. In operation in privacy mode, the light rays 447 may be directed towards a common off-axis point 427 in front of the display device 100. In privacy mode, the light rays 447 may represent the direction for minimum luminance from each point on the display device 100.

In the present disclosure, pupillation refers to the optical output of the display providing at least one common point such as off-axis point 427 from which rays from each at least part of the display device 100 are directed with substantially similar transmission, or luminance. An observer at a pupil such as point 427 may see a substantially uniform luminance or transmission from across the at least part of the display device 100. As will be described hereinbelow, pupillation of various components in the display 100 may advantageously achieve increased luminance uniformity and increased uniformity of security factor.

It is desirable that the passenger 45 may view information such as entertainment without the image causing distraction to the driver 47, that is the privacy mode refers to a low driver distraction mode. This mode is in comparison with a mode in which the passenger display turns off when the vehicle is in motion to prevent driver distraction. More specifically to minimise the visibility to the driver 47 of distracting images at both the nominal driver position and when the driver leans across towards the display while driving, it is desirable to maximise the security factor S at angles α from the optical axis 199 of greater than 30° and preferably greater than 25° in the direction from the optical axis 199 towards the driver 47. Further it is desirable to achieve a high security factor, S for polar angles at least at angles 13 from the optical axis 199.

Optional observer position location viewer tracking system 200 may comprise a camera with collection cone angle 201 and is provided to detect the location of at least the driver 47 during driver 47 movement 540. The observer tracking system may optionally comprise more than one camera, for example one to detect the driver 47 and one to detect the passenger 45. Viewer tracking system 200 may further comprise for example an image processing means to determine the location of an observer in a collected image. The image processing means may optionally detect the gaze direction of the driver 47 or passenger 45 as well as the head location. An additional function where the display brightness is reduced or turned off when the gaze is directed towards the display may be provided.

Further in a low stray light function of the privacy mode, it may be desirable to provide an image to the passenger 45 with desirable luminance while reducing the luminance to reflecting and scattering surfaces within the vehicle. Advantageously the brightness of internal surfaces of the vehicle 650 may be reduced during night-time operation, reducing driver distraction. Further, increased area displays may be provided while maintaining desirably low levels of stray illumination within the vehicle 650 cabin.

In a second mode that is the share mode, the display device 100 is arranged for viewing by driver 47 in an off-axis location. Such use may be for occasions when viewing the display content is safe such as when the vehicle is stationary, or the content is appropriate such as map or instrument data.

Further it would be desirable to achieve high image uniformity to the passenger 45 and high uniformity of security factor, S to the driver 47.

Figure 1B:
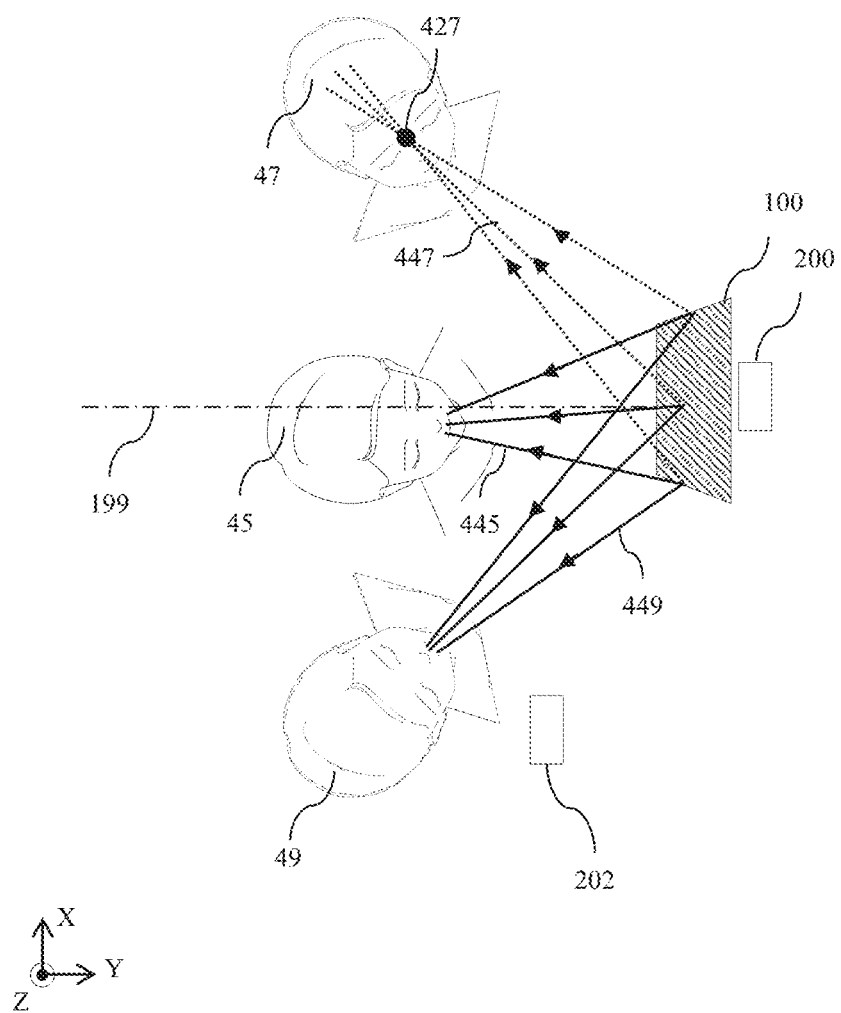
FIG. 1B is a schematic diagram illustrating a schematic top view of a privacy display for use in off-axis use applications.

FIG. 1B is a schematic diagram illustrating a schematic top view of a privacy display device 100 for use in off-axis use applications. Features of the embodiment of FIG. 1B not discussed in further detail may be assumed to correspond to the features with equivalent reference numerals as discussed above, including any potential variations in the features.

The present disclosure refers commonly to passenger 45 or driver 47 for an automotive vehicle 650 of FIG. 1A. The present embodiments hereinbelow are suited to applications with a preferred side on which privacy may be provided. The display devices 100 herein may be used in other applications, in which case user 47 or snooper 47 and user 45 may be equally substituted.

The display device 100 may be provided for applications including but not limited to point-of-sale, or medical monitors. Considering the alternative embodiment of FIG. 1B, such a display device 100 may be viewed on the right side by a user 49 who is a customer or medical practitioner, centrally by a user 45 who is a customer or patient and shielded from potential viewers 47 who may be other members of the public on the opposite side of the optical axis 199 to the user 49.

In a share mode of operation the display 100 may be used to provide advertising information over a wide polar region, or to provide medical information to multiple display users for example. As described hereinbelow, the embodiments of FIGS. 23A-C for example may be used to provide switching of the side of the display on which the user 47 is located.

The embodiment of FIG. 1B may be provided with location viewer tracking system 200 and optionally or alternatively may comprise manual actuator 202 to provide user input indicating a direction of minimum light transmission of a view angle control arrangement 310 as will be described further hereinbelow.

An illustrative structure that can achieve the desirable characteristics of the display device 100 of FIG. 1A will now be described.

Figure 2A:
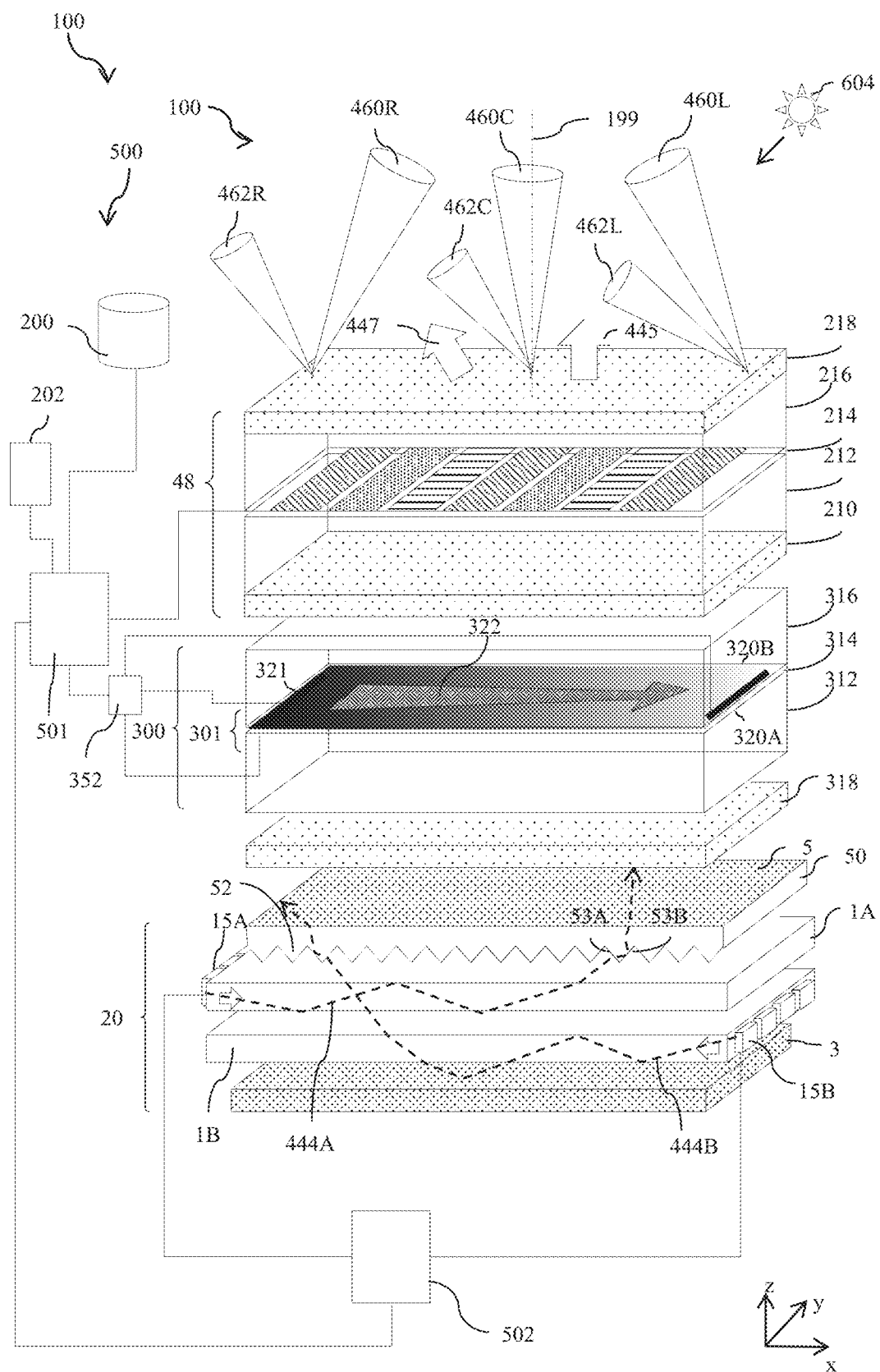
FIG. 2A is a schematic side perspective view of a display device providing uniformity for a display user.
Figure 2B:
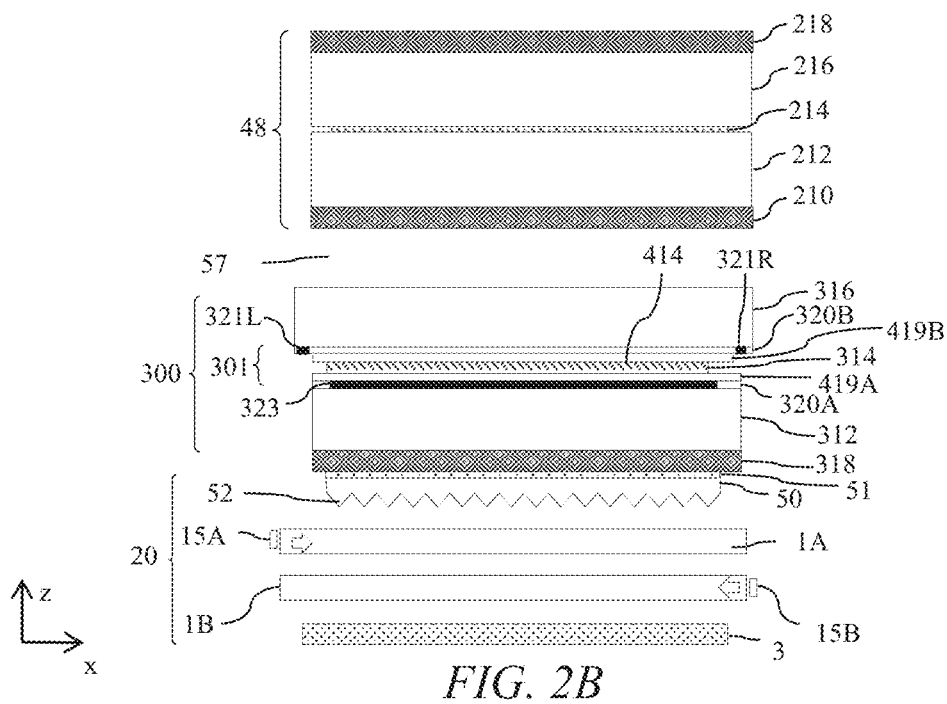
FIG. 2B is a schematic side view of an optical stacking for the display device of FIG. 2A.

FIG. 2A is a schematic side perspective view of a display device 100 providing uniformity in reduction of luminance in directions; and FIG. 2B is a schematic side view of an optical stacking for the display device of FIG. 2A. Features of the arrangement of FIG. 2A not discussed in further detail may be assumed to correspond to the features with equivalent reference numerals, including any potential variations in the features FIG. 2A illustrates the display device 100, for use in ambient illumination 604, which comprises a spatial light modulator (SLM) 48 arranged to output light 400. The SLM 48 comprises an input polariser 210 arranged on the input side of the SLM 48 and an output polariser 218, arranged on the output side of the SLM 48, the input polariser 210 and the output polariser 218 being the two display polarisers of the SLM 48. The input polariser 210 and the output polariser 218 are each linear polarisers.

The display device 100 also comprises an additional polariser 318 arranged on the input side of the input polariser 210, that is the same side as the input polariser 210. The additional polariser 318 is a linear polariser. Typical polarisers 210, 218, 318 may be polarisers such as dichroic polarisers.

In the present disclosure, the SLM 48 may comprise a liquid crystal display comprising substrates 212, 216, liquid crystal layer 214 and red, green and blue pixels 220, 222, 224. The output polariser 218 may be arranged to provide high extinction ratio for light from the pixels 220, 222, 224 of the SLM 48.

The display device 100 also comprises at least one polar control retarder 300 which comprises a switchable liquid crystal retarder 301 comprising a layer 314 of liquid crystal material, and substrates 312, 316 arranged between the input polariser 210 and the additional polariser 318. The substrates 312, 316 of the switchable liquid crystal retarder 301 respectively comprise electrodes 320A, 320B arranged to provide a voltage across the layer 314 of liquid crystal material 414 for controlling the layer 314. A control system 352 is arranged to control the voltage applied, by a voltage driver 350, across the electrodes 320A, 320B of the switchable liquid crystal retarder 301.

Electrodes 320A, 320B are connected to control system 500 by means of at least one electrical bus bar contact 321 and voltage driver system 352. Electrodes 320A, 320B are arranged to provide switching voltage across the layer 314 of liquid crystal material 414. Voltage is applied with voltage profile 322 that varies across the lateral direction of the liquid crystal layer 314 as will be described further hereinbelow.

In typical use, for switching between a share mode and a privacy mode, the layer 314 of liquid crystal material 414 is switchable between two states. The first state being a share mode so that the display device 100 may be used by multiple users, the second state being a privacy mode for use by a primary user with minimal visibility by snoopers. The switching may be by means of a voltage being applied across the electrodes 320A, 320B.

In the embodiment of FIG. 2A, the display device 100 further comprises a backlight 20 arranged to illuminate the SLM 48. The SLM 48 comprises a transmissive SLM 48 arranged to receive and spatially modulate the output light from the backlight 20, the display device 100 further comprises a backlight 20 arranged to illuminate the SLM 48, and said display polariser 210 is an input display polariser 210 arranged on the input side of the SLM 48.

Backlight 20 may be arranged to illuminate the SLM 48, thereby providing a transmissive SLM 48 and may comprise input light sources 15A, 15B, waveguides 1A, 1B, rear reflector 3 and optical stack 5 comprising diffusers, light turning films and other known optical backlight structures. Plural light sources 15A, 15B are shown by way of non-limitative example, but in general there may any number of one or more light sources 15A, 15B.

In operation for illumination of passenger 45, most generally light is directed along ray bundle 445 output from the display device 100. Light rays 444A from the first light sources 15A are directed into light cones 460L, 460C, 460R after transmission at facets 53A and reflection at facets 53B of light turning film component 50 and after transmission through the polar control retarder 300 that may be arranged in a privacy or share mode of operation.

In operation for illumination of driver 47, most generally light is directed along ray bundle 447 output from the display device 100. Light rays 444B from the second light sources 15B are directed into light cones 462L, 462C, 462R after transmission at facets 53B and reflection at facets 53A of light turning film component 50 and after transmission through the polar control retarder 300 that is typically arranged in a share mode of operation.

Asymmetric diffusers, that may comprise asymmetric surface relief features for example, may be provided in the optical stack 5 with increased diffusion in the elevation direction in comparison to the lateral direction. Advantageously image uniformity may be increased.

In the alternative embodiment of FIG. 2B, an optical stacking for the arrangement of FIG. 2A is illustrated. Air gap 57 is provided between spatial light modulator 48 and substrate 316 of the polar control retarder 300. Advantageously yield may be improved in manufacture. In an alternative embodiment the substrate 316 may be bonded to the polariser 210 so that reflection losses are advantageously reduced.

Light turning film 50 may be bonded to the additional polariser 318 by means of adhesive layer 51. In operation, reflections from the top surface of the light turning film 50 are reduced in comparison to arrangements where the adhesive layer 51 is replaced by an air gap. Such an arrangement achieves reduced stray light directed into regions between the driver 47 and passenger 45 in the illustrative arrangement of FIG. 1A for example. Advantageously distraction to driver 47 may be reduced.

Polar control retarder 300 may comprise liquid crystal material 414 arranged between alignment layer 317A, 317B arranged on transparent electrodes 320A, 320B and arranged to provide alignment of liquid crystal material 414. Bus bar 323 may be provided on at least one edge of the electrode 320B to achieve substantially uniform electrical connectivity to the transparent electrode 320B. The electrodes 320A and 320B may have different sheet resistance (ohms per square) conductors (such as ITO or silver nanowire). The higher sheet resistance and edge bus bars 321L, 321R may be used to provide a larger range profile 322. The opposing electrode 320B for example may have a lower sheet resistance in order to provide a sufficiently uniform voltage across it without using full bus bars 323. In the present embodiments, the electrodes 321, 323 may be provided on different ones of either of the rearmost and forwardmost electrode 320A, 320B.

Figure 2C:
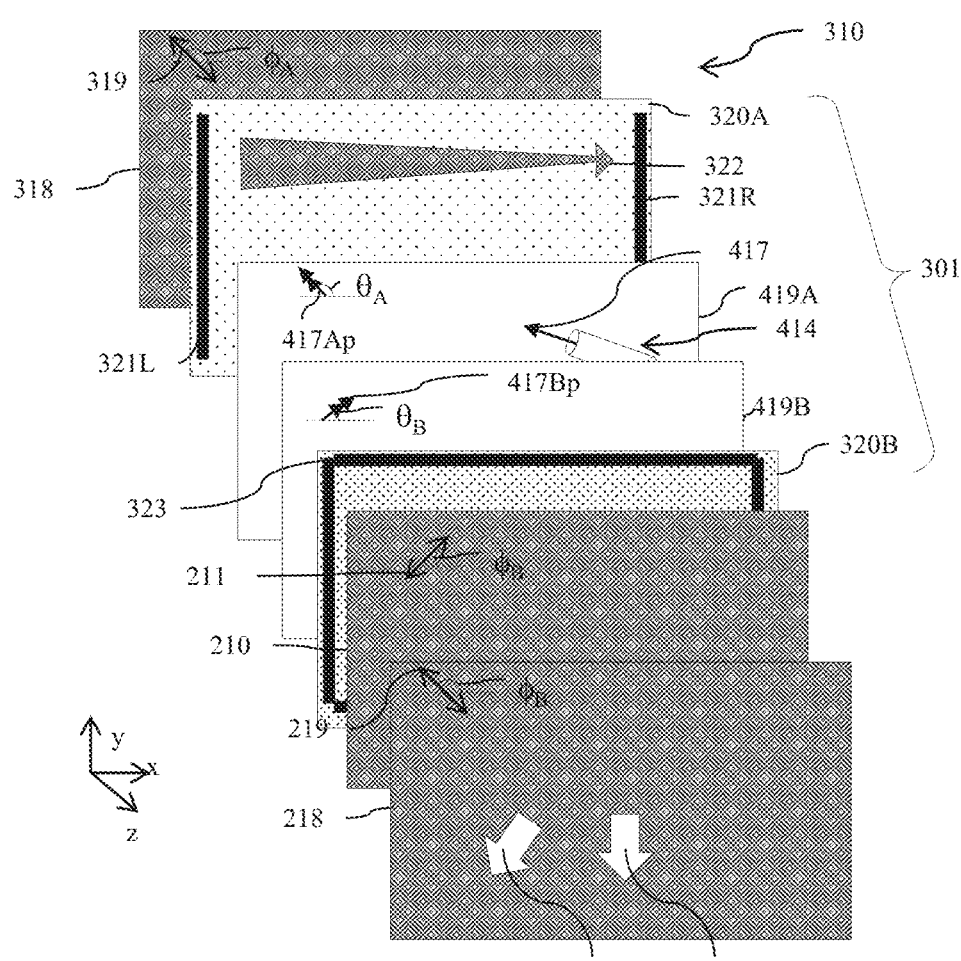
FIG. 2C is a front view of the stack of layers of the display device of FIG. 2A.

FIG. 2C is a front view of the stack of some of the layers of the display device 100 of FIG. 2A. Features of the arrangement of FIG. 2C not discussed in further detail may be assumed to correspond to the features with equivalent reference numerals, including any potential variations in the features. In FIG. 2C and other schematic diagrams below, some layers of the optical stack are omitted for clarity. For example, the switchable liquid crystal retarder 301 is shown omitting the substrates 312, 316.

The surface alignment layer 419B closest to the display polariser 210 has a pretilt having a pretilt direction 417Bp with a component in the plane of the layer 314 of liquid crystal material 414 that is parallel or perpendicular to an electric vector transmission direction 211 of the display polarisers 210, 218, and the surface alignment layer 419A closest to the additional polariser 318 has a pretilt having a pretilt direction 417Ap with a component in the plane of the layer 314 of liquid crystal material 414 that is parallel or perpendicular to an electric vector transmission direction 319 of the additional polariser 318. In the illustrative embodiment of FIG. 2C, the pretilt direction 417Ap is parallel to the electric vector transmission direction 319, and the pretilt direction 417Bp is parallel to the electric vector transmission direction 211.

The electrodes 320A, 320B, which are optically transmissive comprising a material such as ITO, are arranged across the layer 314 to control the liquid crystal material 414 and thereby control the liquid crystal retarder 301. The layer 314 of liquid crystal material 414 is switchable by means of adjusting the voltage being applied to the electrodes 320A, 320B. The electrodes 320A, 320B are on opposite sides of the layer 314 of liquid crystal material 414 and may for example be indium-tin-oxide (ITO) electrodes.

The alignment layers 419A, 419B may be formed between electrodes 320A, 320B and the liquid crystal material 414 of the layer 314.

The polar control retarder 301 further comprises two surface alignment layers 419A, 419B disposed adjacent to the layer 314 of liquid crystal material 414 and on opposite sides thereof. Each of the surface alignment layers 419A, 419B is arranged to provide alignment in the adjacent liquid crystal material 414 with an in-plane component 417Ap, 417Bp respectively that is in the plane of the layer 314 of liquid crystal material 414.

A polar control retarder 300 wherein the SLM 48 is a twisted nematic (TN) SLM 48 may be arranged with the properties of TABLE 1 for example. When viewed from the front of the display device 100, the optical axis direction 412 of the liquid crystal material 414 at the first alignment layer 419A of the polar control retarder 300 has an in-plane component 417Ap with an anti-clockwise rotation angle $\theta_A$ from easterly direction of 135°. Similarly, the optical axis direction 417 of the liquid crystal material 414 at the second alignment layer 419B has an in-plane component 417Bp with an anti-clockwise rotation angle $\theta_B$ from easterly direction of 45°.

retarder 301 and voltage profile 322 in the lateral direction (x-axis) across at least one region of the polar control retarder 300 in a privacy mode of operation. Features of the arrangement of FIG. 3A not discussed in further detail may be assumed to correspond to the features with equivalent reference numerals, including any potential variations in the features.

View angle control arrangement 310 comprises: additional polariser 318 arranged on the same side of the SLM 48 as the display polariser 210, the additional polariser 318 being a linear polariser; and at least one polar control retarder 300 arranged between the display polariser 210 and the additional polariser 318.

The at least one polar control retarder 300 comprises a switchable liquid crystal retarder 301 comprising a layer 314 of liquid crystal material 414; two surface alignment layers 419A, 419B disposed adjacent to the layer 314 of liquid crystal material 414 and on opposite sides thereof. The surface alignment layers 419A, 419B are each arranged to provide homogenous alignment in the adjacent liquid crystal material 414, the liquid crystal material 414 being provided with a twist.

In other words, the switchable liquid crystal retarder 301 comprises two surface alignment layers 419A, 419B disposed adjacent to the layer 314 of liquid crystal material 414 and on opposite sides thereof and each arranged to provide homogeneous alignment in the adjacent liquid crystal material 414.

TABLE 1

| Item | In-plane rotation angle | In-plane rotation angle | Active LC retarder 301 | | | |
|---|---|---|---|---|---|---|
| | | | Twist | Alignment layers | Pretilt | $\Delta n.d$ | $V_C$ |
| 318 | 319, $\phi_A$ | 135° | | | | | |
| 314 | 417Ap, $\theta_A$ | 135° | 90° | Homogeneous | 2° | 500 nm | 1.45 V |
| | 417Bp, $\theta_B$ | 45° | | Homogeneous | 2° | | |
| 210 | 211, $\phi_B$ | 45° | | | | | |
| 218 | 219, $\phi_B'$ | 135° | | | | | |

The liquid crystal material 414 has a positive dielectric anisotropy such that the optical axis of molecules of the liquid crystal material 414 lie at the pretilt angle to the plane of the layer 314 across the layer when no voltage is applied; and the molecules that are not near the alignment layers 419A, 419B are tilted towards the normal of the layer 314 when a voltage is applied. A wide polar angle of high transmission may be achieved advantageously with low power consumption for share mode operation.

The additional polariser 318 and display polariser 210 are illustrated as having respective electric vector transmission directions 319, 211 that are crossed, that is they are at 90° to each other. In other embodiments including those described hereinbelow, the polarisers may be parallel or may be inclined to angles that are not parallel or crossed. Polar profiles of transmission may advantageously be modified to achieve desirable viewing characteristics for driver 47 or passenger 45.

It would be desirable to provide high luminance uniformity to passenger 45 and high uniformity of security factor to driver 47 across at least the lateral direction of the display device 100. At locations that are between the alignment layers 419A, 419B, and may vary across the lateral direction (x-axis) of the display, the optical axis direction 412 of the liquid crystal material 414 varies as will now be described.

Figure 3A:
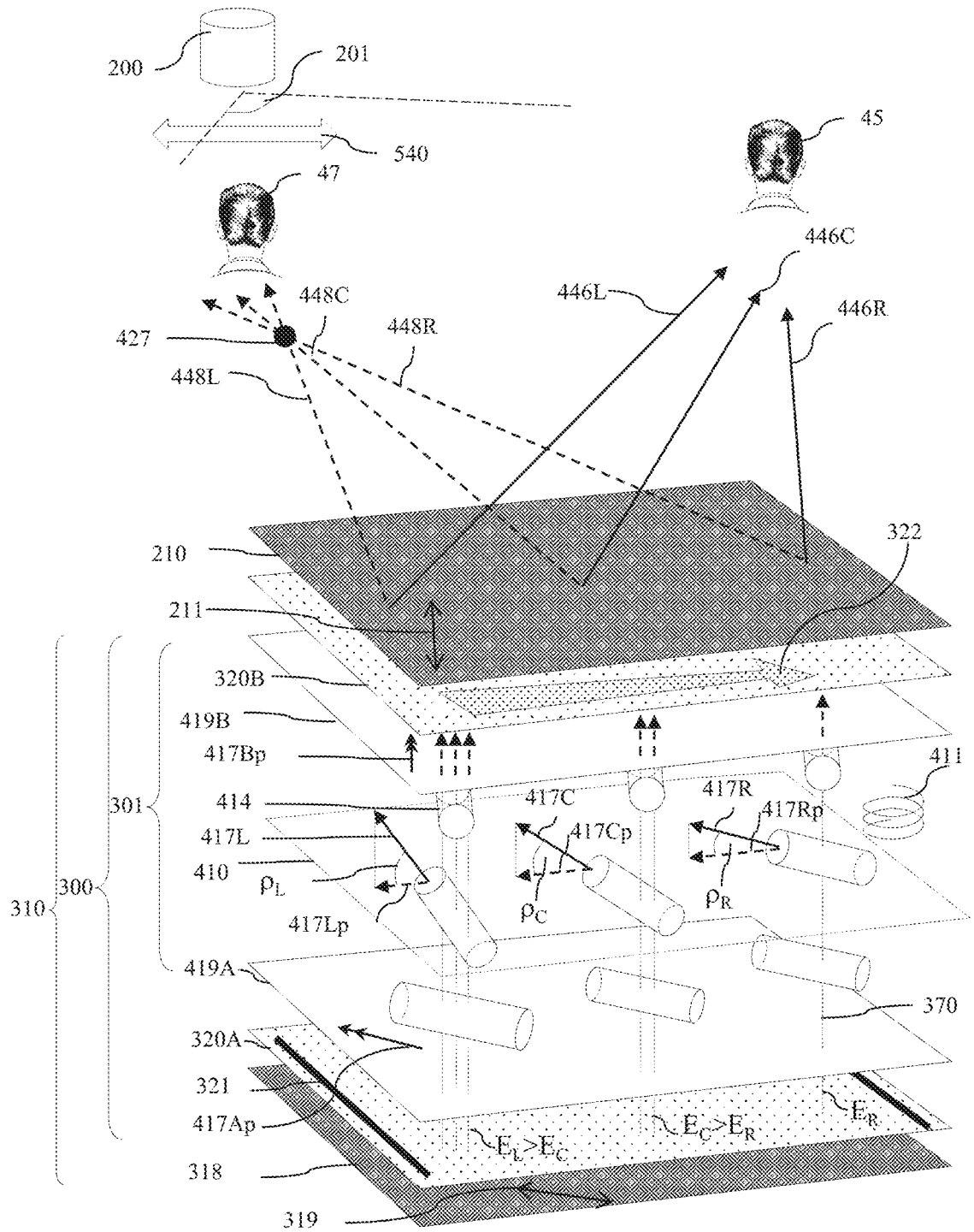
FIG. 3A is a perspective view of a polar control retarder that may be applied in FIG. 2A, comprising a twisted nematic switchable liquid crystal (LC) retarder and profile of voltage in the lateral direction across at least one region of the polar control retarder in a privacy mode of operation.

FIG. 3A is a perspective view of the polar control retarder 300 of FIG. 2C, comprising a twisted nematic switchable LC FIG. 3A illustrates that a cholesteric dopant 411 is provided in the layer of liquid crystal material 414 to minimise degeneracy in twist direction of the liquid crystal material 414 across the liquid crystal layer 314. Twist may further be achieved by the different alignment directions 417Ap, 417Bp. Rotation angles different to 90 degrees, for example 80 degrees may achieve non-degenerate modes without the use of dopant 411. Advantageously complexity and cost is reduced.

In the embodiment of FIG. 3A, the electric vector transmission direction 319 of the additional polariser 318 is oriented at a non-zero angle with respect to the electric vector transmission direction 211 of the display polariser 210 and the non-zero angle is the same as the twist. Further arrangements of polarisers, electric vector transmission directions 319, 211 and alignment layer orientations 417Ap, 417Bp will be described hereinbelow with respect to for example TABLE 5 wherein the non-zero angle may be different to the twist.

First and second electrode arrangements 320A, 320B are disposed on opposite sides of the layer 314 of liquid crystal material 414, wherein first and second electrode arrangements 320A, 320B are arranged to provide an electric field 370 perpendicular to the layer 314 of liquid crystal material 414. For explanatory purposes, the magnitude of the electric field 370 is illustrated with field strength indicated by field lines with differing densities across a predetermined axis.

In the embodiment of FIG. 2A and FIG. 3A, the predetermined axis is illustrated as the x-axis, that is the axis that runs from left to right across the display. The predetermined axis may be the nominal axis along which the driver 47 and passenger 45 are located, and may be horizontal along the X-axis of FIG. 1A for example.

The coordinate system of x-y-z for the display device 100 may be offset from the coordinate system X-Y-Z for the vehicle 650. The predetermined axis may differ from the illustrative example. In an alternative embodiment, the predetermined axis may be along a direction tilted with respect to the sides of the display device 100 active area, for example if the driver 47 of FIG. 1A has a nominal height offset along the Z-axis compared to the passenger 45.

Returning to the description of FIG. 3A, the magnitude of the electric field 370 changes monotonically along a predetermined axis across at least part of the display device 100. The change may be with monotonic profile 322 of electric field 370 as will be described further hereinbelow. On the left side of the display device 100 voltage $V_L$ is provided across the liquid crystal layer 314 to provide corresponding electric field 370 of $E_L$ which is higher than the magnitude of the electric field 370 of $E_C$ achieved by voltage $V_C$ that is applied at the centre of the display device 100. On the right side of the display device 100, electric field 370 of $E_R$ is provided by voltage $V_R$ across the liquid crystal layer 314 which is lower than the magnitude of the electric field 370 of $E_C$ provided by voltage VC that is applied at the centre of the display device 100.

Applied voltage results in an out-of-plane rotation of liquid crystal material 414 in locations through the liquid crystal layer 314 that are separated from the alignment layers 419A, 419B.

In the present embodiment, the in-plane components 417Ap, 417Bp of liquid crystal alignment at the alignment layers 419A, 419B are constant across the area of the display device 100, that is the alignment layers 419A, 419B are uniformly processed during manufacture, for example by uniform rubbing or uniform photoalignment methods.

A full description of operation of the layer of liquid crystal layer at each point on the display surface is determined by evaluating the propagation of phase fronts through twisted and tilted liquid crystal layers. However, for purposes of illustration, the operation of the layer 314 may be determined by considering the optical alignment of liquid crystal material 414 in a plane 410 that is halfway between the alignment layers 419A, 419B. Such an alignment may represent an average alignment of the liquid crystal material 414 in the direction perpendicular to the layer 314. Thus considering the liquid crystal material 414 alignment within the layer 314, components 417p of the optical axis 417 of the liquid crystal material 414 in the plane of the layer 314 of liquid crystal material 414 have an average direction that is along the predetermined direction. Thus components 417Rp, 417Cp and 417Lp are illustrated as having an average direction that is along the x-axis.

On the left-hand side of the polar control retarder 300, the optical axis 417L has an in-plane component 417Lp that is pointed towards the left-hand direction and is inclined at an angle $\rho_L$ to the plane 410; in the centre of the polar control retarder 300, the optical axis 417C has an in-plane component 417Cp that is pointed towards the left-hand direction and is inclined at an angle $\rho_C$ to the plane 410; and on the right side of the polar control retarder 300, the optical axis 417R has an in-plane component 417Rp that is pointed towards the left-hand direction and is inclined at an angle $\rho_R$ to the plane 410. The angles $\rho_L$, $\rho_C$, $\rho_R$ are different due to the different applied voltages $V_L$, $V_C$, $V_R$ that provide electric fields $E_L$, $E_C$, $E_R$ respectively wherein $E_L > E_C > E_R$, in this illustrative embodiment.

In other words, the magnitude of the electric field 370 changes monotonically along a predetermined axis across at least part of the display device 100 so that directions 448 of minimum light transmission of the view angle control arrangement 310 from points of said at least part of the display device 100 are directed towards a common off-axis point 427 in front of the display device 100.

The transmission of various rays transmitted through the switchable liquid crystal retarder 301 to the passenger 45 varies as 446R, 446C, 446L and the transmission of the switchable liquid crystal retarder to the driver 47 varies as 448R, 448C, 448L.

The luminance profile for rays 445, 447 directed towards passenger 45 and driver 47 will now be described further by illustrating schematically the propagation of polarised light from the output polariser 218 for on-axis and off-axis directions.

Figure 3B:
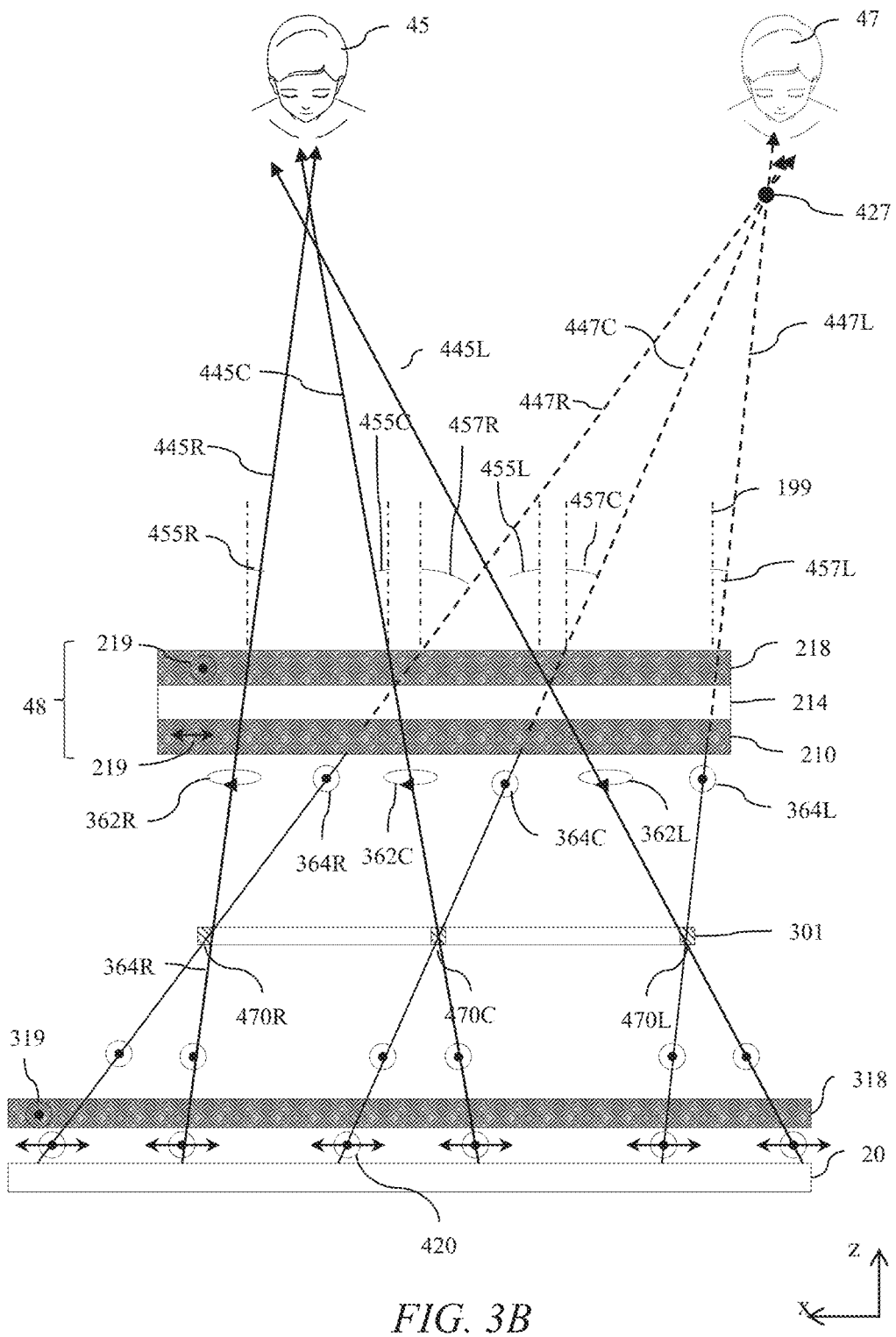
FIG. 3B is a side view of propagation of output light from a SLM through the optical stack of FIG. 3A.

FIG. 3B is a side view of propagation of output light from the SLM 48 through the optical stack of FIG. 2A in a privacy mode. Features of the arrangement of FIG. 3B not discussed in further detail may be assumed to correspond to the features with equivalent reference numerals, including any potential variations in the features.

For illustrative purposes only, in comparison to the arrangement of FIG. 3A and TABLE 1, the polarisation orientations are illustrated as being in the plane of the paper or out of the plane of the paper. However, in practice the 45° and 135° orientations are used in the present embodiment.

Light rays from backlight 20 are output unpolarised or partially polarised. Additional polariser 318 transmits polarisation state with electric vector transmission direction 319.

Considering light rays to the driver 47, light ray 447C that passes from point 470C to the driver 47 undergoes substantially no phase shift so that the output polarisation state 364C remains substantially the same as the polarisation state 319. Such light is absorbed at the input display polariser 210, and thus the driver sees low luminance in the direction 447C. Light rays 447R, 447L that pass from points 470R, 470L respectively to the driver 47 also undergo substantially no phase shift so that the output polarisation state 364R, 364L remain substantially the same as the polarisation state 319. Such light is absorbed at the input display polariser 210, and thus the driver sees low luminance in the direction 447R, 447L. Note that the angles 457R, 457C, 457L from the normal 199 to the plane of the display device 100 of output of the rays 447R, 447C, 447L vary across the width of the polar control retarder 301, in correspondence with the field of the view of the display device 100 as seen by the driver 47. As will be described hereinbelow, the uniformity of reduced luminance to the driver 47 in privacy mode is advantageously increased, achieving increased uniformity of security factor, S.

Considering light rays to the passenger 45, light ray 445C that passes from point 470C to the passenger 45 undergoes a phase shift so that most generally an elliptical output polarisation state 362C is incident on the display input polariser, at least some of which is transmitted by the display polariser 210 to the passenger 45. The passenger sees high luminance modulated with the image data of the SLM 48 in the direction 445C. Light rays 445R, 445L that pass from points 470R, 470L respectively to the passenger 45 also undergo a similar phase shift so that the output polarisation state 362R, 362L has a similar elliptical polarisation state. Such light is transmitted at the input display polariser 210, and thus the passenger sees a high luminance in the direction 445R, 445L with similar luminance to that in direction 445C. Note that the angles 455R, 455L, 455C from the normal 199 to the plane of the display device 100 of output of the rays 445R, 445L, 445C vary across the width of the polar control retarder 301, in correspondence with the field of the view of the display device 100 as seen by the passenger 45. As will be described hereinbelow, the uniformity of high luminance to the passenger 45 in privacy mode is advantageously increased, achieving increased observed image uniformity.

Figure 3C:
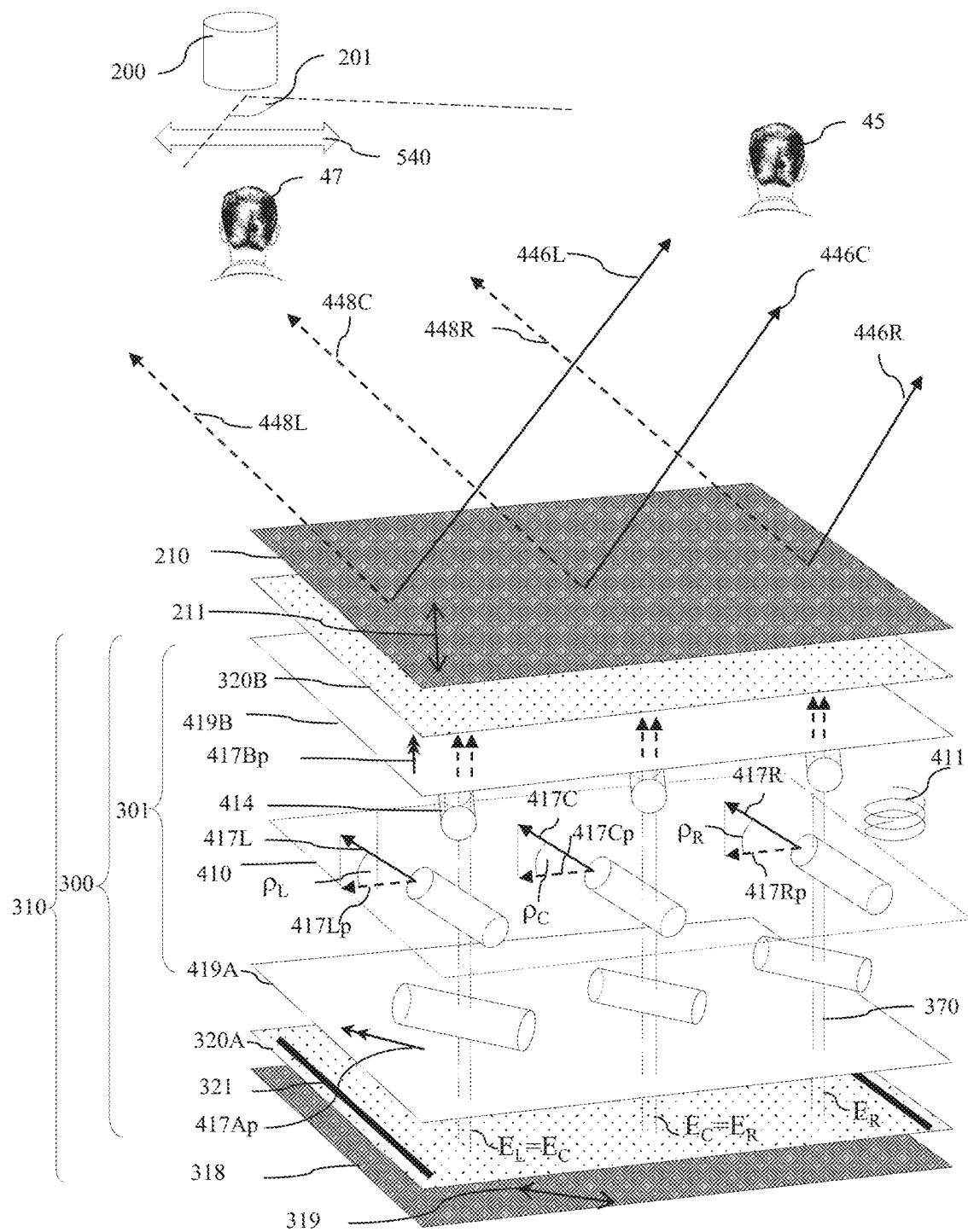
FIG. 3C is a perspective view of a polar control retarder that may be applied in FIG. 2A, comprising a twisted nematic switchable LC retarder and uniform voltage in the lateral direction across at least one region of the polar control retarder in a privacy mode of operation.

FIG. 3C is a perspective view of a polar control retarder that may be applied in FIG. 2A, comprising a twisted nematic switchable LC retarder and uniform voltage in the lateral direction across at least one region of the polar control retarder in a privacy mode of operation. Features of the arrangement of FIG. 3C not discussed in further detail may be assumed to correspond to the features with equivalent reference numerals, including any potential variations in the features.

In comparison to the arrangement of FIG. 3BA, a common electric field $E_L$, $E_C$, $E_R$ may be applied perpendicular to the layer 314 of liquid crystal molecules 414 and the magnitude of the electric field is uniform across at least part of the display device 100.

The in-plane components 417Lp, 417Cp, 417Rp are the same and directed towards the left-hand direction and is inclined at common angles $\rho_L$, $\rho_C$, $\rho_R$ to the plane 410. The angles $\rho_L$, $\rho_C$, $\rho_R$ are different due to the common applied voltages $V_L$, $V_C$, $V_R$ respectively. Light rays 448L, 448C, 448R propagating along parallel directions are directed towards the driver 47 and light rays 446L, 446C, 446R propagating along parallel directions are directed towards the passenger 45.

The embodiment of FIG. 3C may be advantageously achieve lower cost and complexity in comparison to the embodiment of FIG. 3A.

It may be desirable to provide further control of the common off-axis point 427.

Figure 3D:
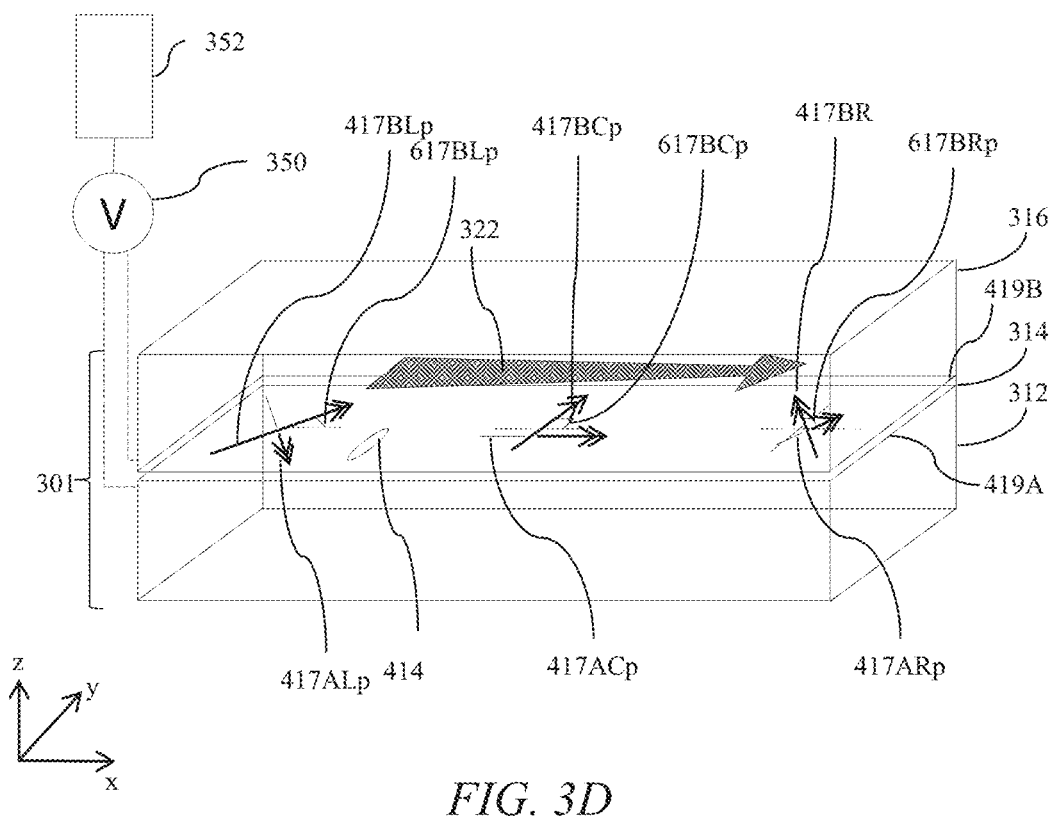
FIG. 3D is a schematic perspective side view of a switchable liquid crystal retarder that may be applied in FIG. 2A, comprising a twisted nematic switchable LC retarder with alignment layer orientations that vary across the lateral direction, and further comprising a profile of voltage in the lateral direction across at least one region of the polar control retarder in a privacy mode of operation.
Figure 3E:
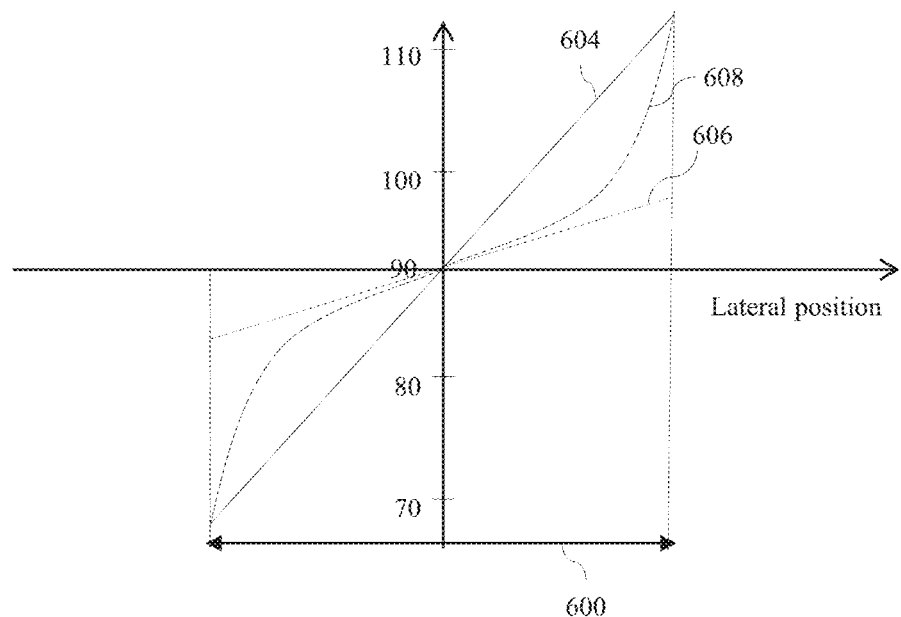
FIG. 3E is a graph of in-plane angle against position in the predetermined direction and illustrates exemplary profiles of the in-plane components provided by a surface alignment layer of FIG. 3C.

FIG. 3D is a schematic perspective side view of a switchable liquid crystal retarder 301 that may be applied in FIG. 2A, comprising a twisted nematic switchable LC retarder with alignment layer orientations 417A, 417B that vary across the lateral direction, and further comprising a profile 322 of voltage in the lateral direction across at least one region of the switchable liquid crystal retarder 301; and FIG. 3E is a graph of in-plane angle 617 against position in the predetermined (lateral) direction and illustrates exemplary profiles 604, 606, 608 of the in-plane components 417Ap, 417Bp provided by a surface alignment layers 419A, 419B of FIG. 3D. Features of the arrangements of FIGS. 3D-E not discussed in further detail may be assumed to correspond to the features with equivalent reference numerals, including any potential variations in the features.

In the alternative embodiment of FIG. 3D, the surface alignment layer 419A is arranged to provide homogenous alignment in the adjacent liquid crystal material 414 the surface alignment layer 419A having an in-plane component 417ALp, 417ACp, 417ARp in the plane of the layer 314 of liquid crystal material 414 having an angle 617ALp, 617ACp, 617ARp that changes monotonically along a predetermined axis across at least part of the display device 100; and the surface alignment layers 419B is arranged to provide homogenous alignment in the adjacent liquid crystal material 414 the surface alignment layer 419B having an in-plane component 417BLp, 417BCp, 417BRp in the plane of the layer 314 of liquid crystal material 414 having an angle 617BLp, 617BCp, 617BRp that changes monotonically along a predetermined axis (such as the x-direction in FIG. 3D) across at least part of the display device 100.

In other words, the two surface alignment layers 419A, 419B are disposed adjacent to the layer 314 of liquid crystal material 414 and on opposite sides thereof wherein the surface alignment layers 419A, 419B are arranged to provide alignment in the adjacent liquid crystal material 414 with an in-plane component 417Ap, 417Bp that is in the plane of the layer of liquid crystal material, wherein the angle of said in-plane component 417Ap, 417Bp of the alignment in the adjacent liquid crystal material 414 changes monotonically along a predetermined axis across at least part of the display device 100. Further, the components 417ALp, 417ACp, 417ARp vary monotonically across the lateral direction on the alignment layer 419A, and the components 417BLp, 417BCp, 417BRp vary monotonically across the lateral direction on the alignment layer 419B, wherein the liquid crystal material 414 twists between the alignment layers 419A, 419B.

The embodiments of FIGS. 3D-E provide for further control of common off-axis point 427. Such further control is provided by modifying the angle 617 of the respective alignment layer 419A, 419A in-plane components 417Ap, 417Bp during manufacture. In the embodiments of FIG. 3E, the profile of angle 617 may vary across the predetermined direction as shown by illustrative profiles 604, 606, 608 to provide desirable control of the common off-axis point 427.

Said further control controls the transmission by the polarisation control retarder 300 with respect to the polar viewing angle across the predetermined direction. For example, considering FIG. 4A hereinbelow, the direction of maximum transmission of the polar control retarder 300 may be different across the predetermined direction, for example the lateral direction.

In comparison to the embodiment of FIG. 2A, said further control is fixed at manufacture of the alignment layers 419A, 419B and control is also provided by modification of the voltage profile 322 provided across the electrodes 320A, 320B and across the layer 314 of liquid crystal material 414.

The alternative embodiments of FIGS. 3C-D may be provided with each of the embodiments described herein comprising voltage profile 322. By way of comparison with the embodiment of FIG. 2A, the control provided by the profile 322 may be provided by a smaller voltage gradient across the lateral direction. Advantageously the cost and complexity of the transparent electrodes 320A, 320B and the control system 352 may be reduced.

Control of the common off-axis point 427 by means of alignment layer 419A, 419B arrangement is described further in U.S. Pat. No. 11,079,646, which is herein incorporated by reference in its entirety.

Figure 4A:
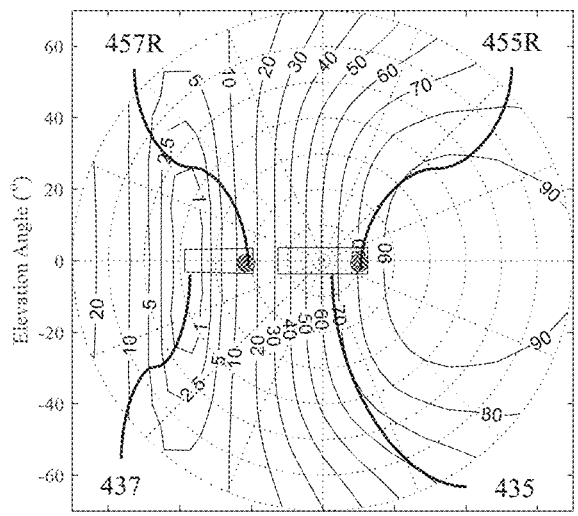
FIG. 4A, FIG. 4B, and FIG. 4C are schematic graphs illustrating the variation of transmission with polar direction for the polar control retarder of FIG. 2A using the twisted nematic polar control retarder of FIG. 3 for different points on the display device of FIG. 2A and operating at different voltages.
Figure 4B:
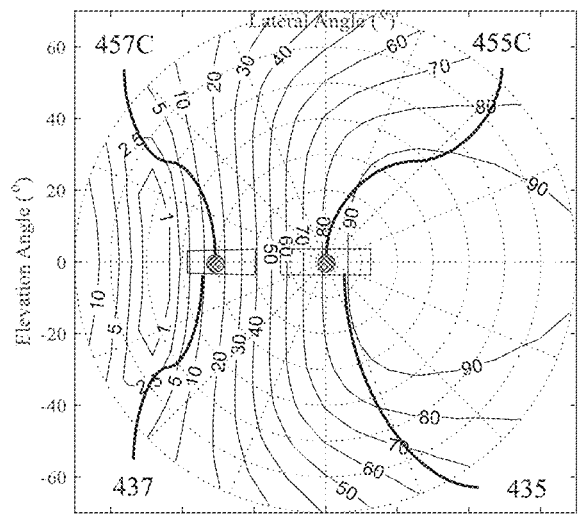
Figure 4C:
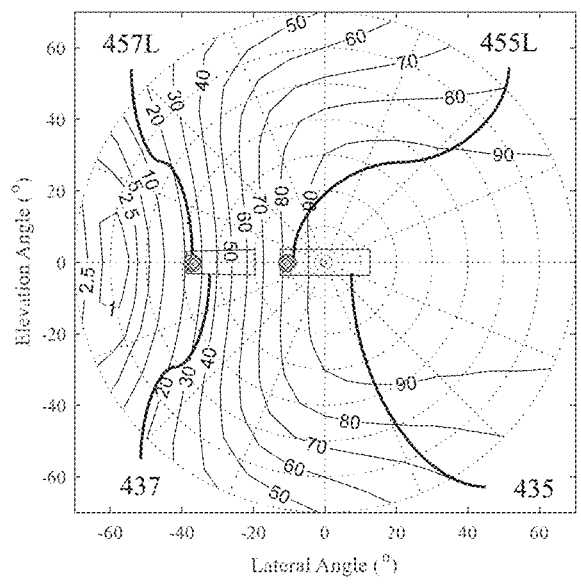

FIGS. 4A-C are graphs illustrating the variation of transmission with polar direction for the polar control retarder 300 of FIG. 2A using the twisted nematic polar control retarder 300 of FIG. 3A and TABLE 1 for different points on the display device 100.

FIGS. 4A-C represent the polar variation in relative transmission of the polar control retarder 301 of TABLE 1 for three illustrative drive voltages $V_R$, $V_C$, $V_L$ respectively. Region 435 represents the angular field of the outline of a 12.3" passenger infotainment display device 100 viewed from 750 mm and from a head-on position. Region 437 represents the angular field of the outline of the same display device 100 viewed from the same 750 mm viewing plane and from an off-axis position centred at 30 degrees off-axis in the lateral direction.

The angular locations 455R, 457R, 455C, 457C, 455L, 457L of FIG. 3B for zero elevation are marked on respective plots. It can be seen that the transmission of approximately 80%-90% is achieved for all three points 455R, 455C, 455L, and the transmission of approximately 15%-25% is achieved for each of the locations 457R, 457C, 457L. If the driver 47 were to move to higher off-axis angles, then the corresponding transmission would fall; however, the uniformity of low transmission across the display area will be substantially maintained. Advantageously security factor uniformity is increased in comparisons to polar control retarders 301 with no voltage profile 322.

In the embodiment of FIG. 3C, a single voltage may be applied, and one of the polar profiles of transmission of FIGS. 4A-C may be provided across at least part of the display device 100.

The operation of the polar control retarder in a share mode of operation will now be described.

Figure 5A:
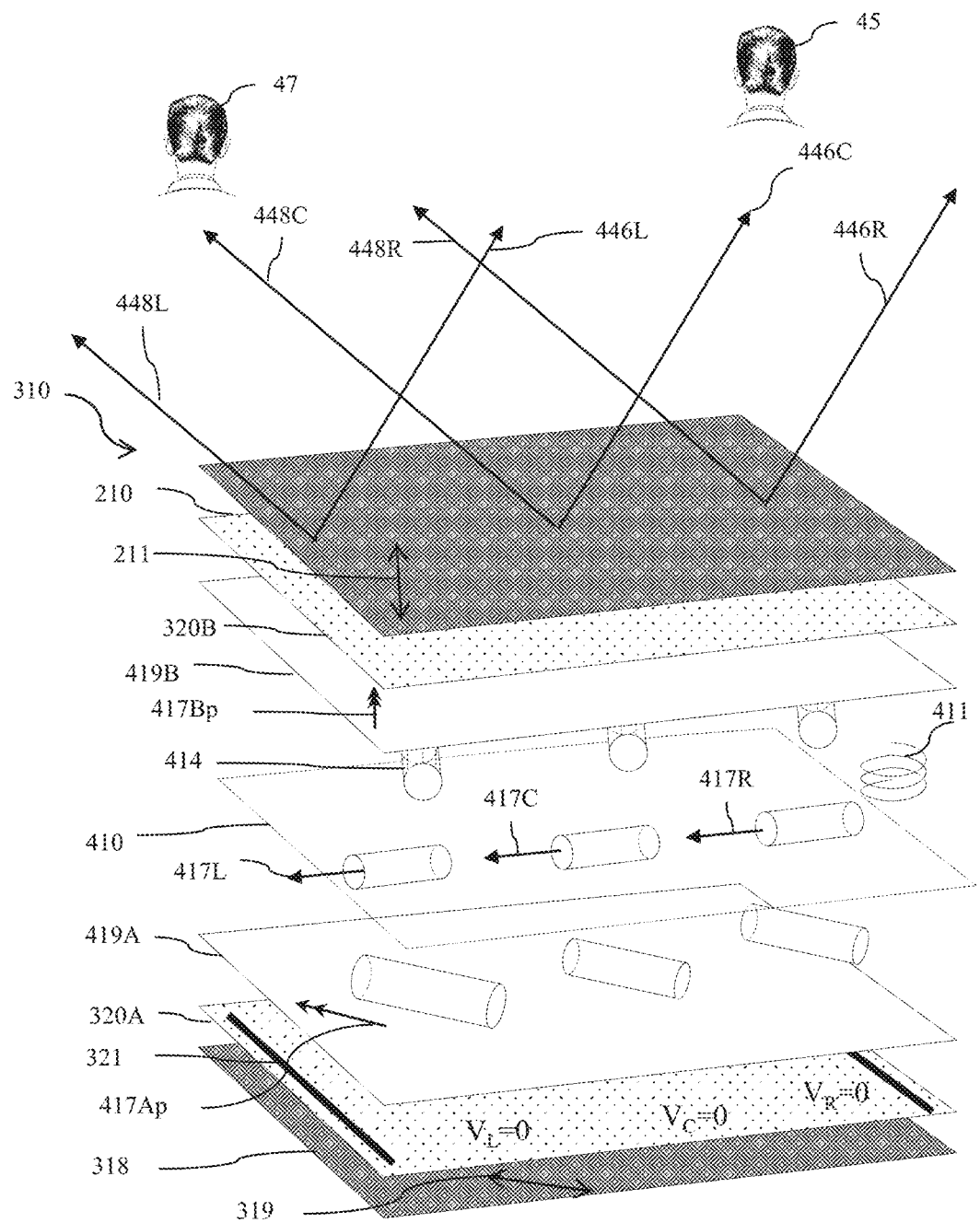
FIG. 5A is a perspective view of a polar control retarder that may be applied in FIG. 2A, comprising a twisted nematic switchable LC retarder and profile of voltage in the lateral direction across at least one region of the polar control retarder in a share mode of operation.

FIG. 5A is a perspective view of the polar control retarder 300 of FIG. 2C, comprising a twisted nematic switchable LC retarder 301 and no voltage applied across the liquid crystal layer for a share mode of operation. Features of the arrangement of FIG. 5A not discussed in further detail may be assumed to correspond to the features with equivalent reference numerals, including any potential variations in the features.

FIG. 5A is similar in structure to FIG. 3A and FIG. 3C other than no voltage is applied across any of at least one region of the liquid crystal layer 314 for at least part of the display device 100.

Thus at the intermediate plane 417L, the directors 417L, 417C, 417R of the liquid crystal molecules lie uniformly within the plane 410 and a substantially uniform transmission profile is achieved across the polar control retarder.

Figure 5B:
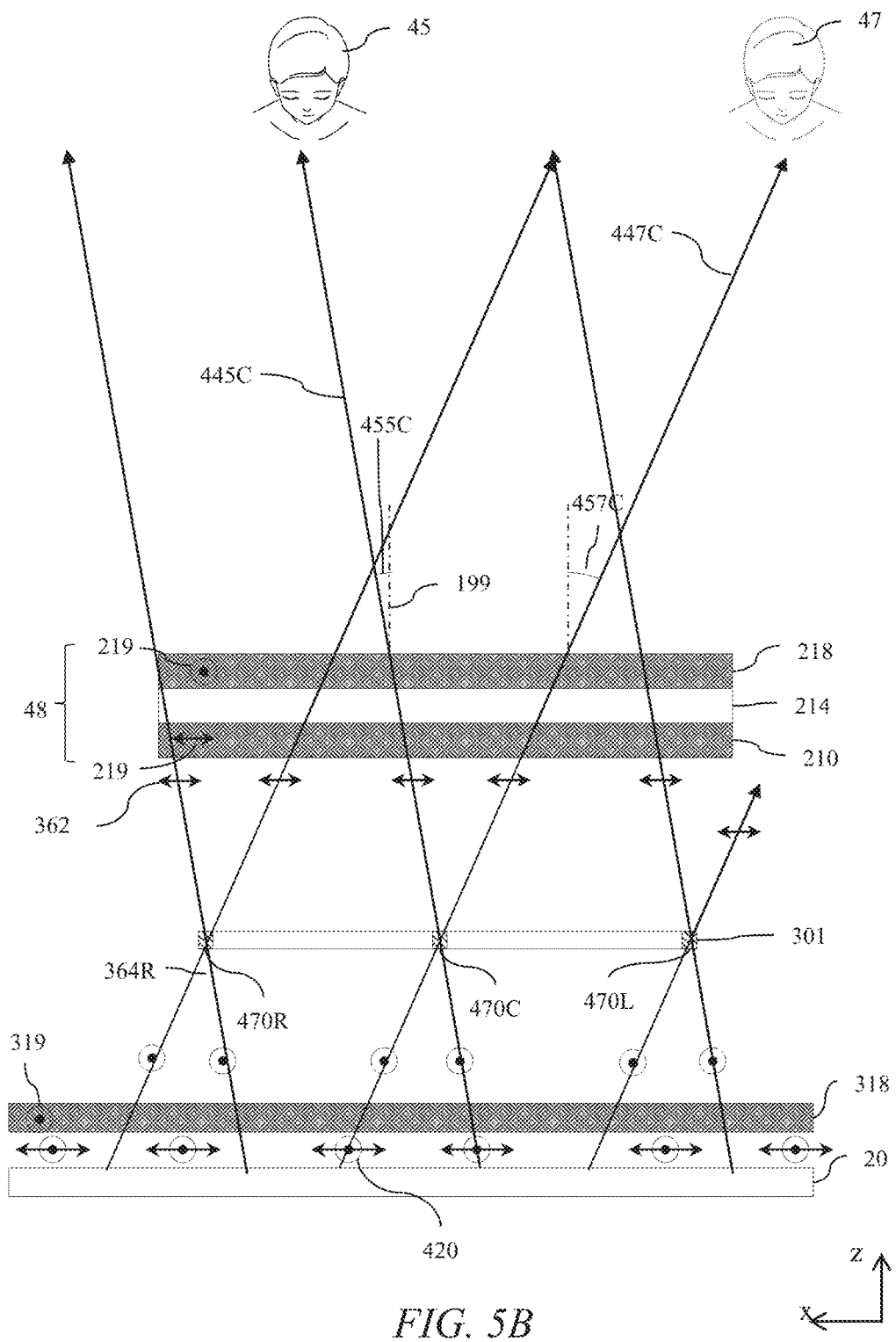
FIG. 5B is a side view of propagation of output light from a SLM through the optical stack of FIG. 5A.

FIG. 5B is a side view of propagation of output light from the SLM 48 through the optical stack of FIG. 2A in the share mode. Features of the arrangement of FIG. 5B not discussed in further detail may be assumed to correspond to the features with equivalent reference numerals, including any potential variations in the features.

As for FIG. 3B, for illustrative purposes only, in comparison to the arrangement of FIG. 5A and TABLE 1, the polarisation orientations are illustrated as being in the plane of the paper or out of the plane of the paper. However, in practice the 45° and 135° orientations are used in the present embodiment.

In comparison to the explanation of FIG. 3B, the polarisation state 319 is rotated to output polarisation state 362 across at least a region of the polar control retarder 301. The light rays 445, 447 are transmitted by the input display polariser 210 and transmitted to the passenger 45 and driver 47, modulated with the image data of the SLM 48.

Figure 5C:
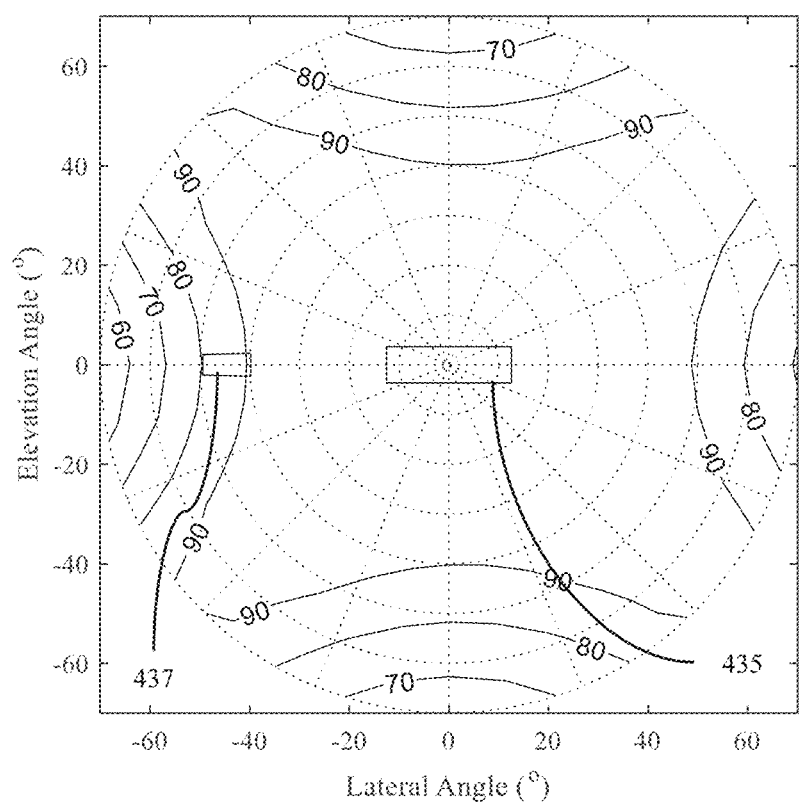
FIG. 5C is a schematic graph illustrating the variation of transmission with polar direction for the polar control retarder of FIG. 16A with no voltage profile across the polar control retarder.
Figure 16A:
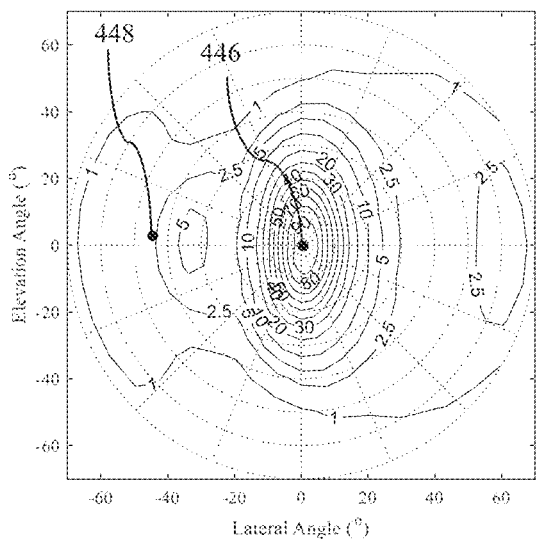
FIG. 16A is a schematic graph illustrating the polar variation of luminance output for an alternative backlight of FIG. 2 primarily operating to direct light to the passenger.

FIG. 5C is a schematic graph illustrating the variation of transmission with polar direction for the polar control retarder 300 of FIG. 16A with $n_o$ voltage V profile 322 across the polar control retarder 300.

For each of the subtended display areas, the uniformity of transmission is advantageously high, and high image uniformity of image appearance is achieved.

An alternative arrangement of additional polariser 318 and display polariser 210 will now be described.

Figure 5D:
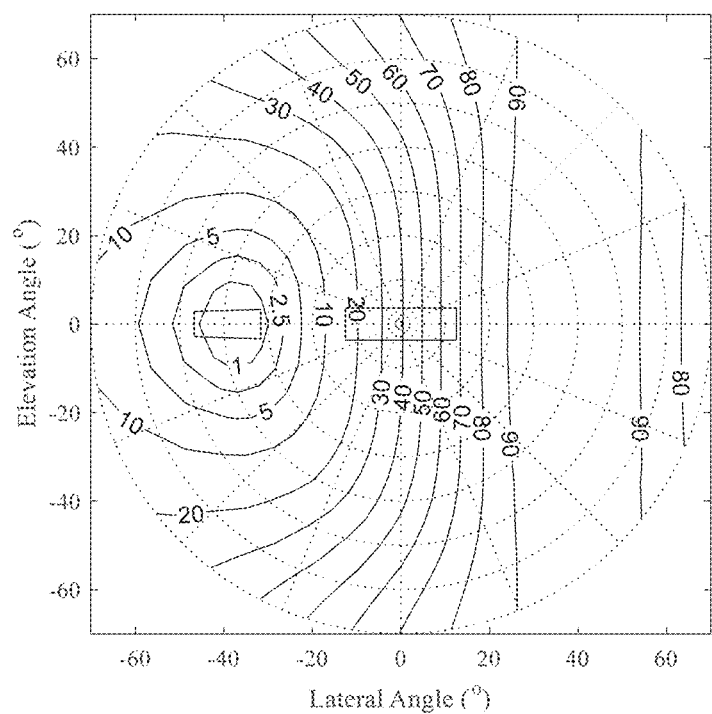
FIG. 5D is a schematic graph illustrating the variation of transmission with polar direction for a polar control retarder using the twisted nematic polar control retarder with additional polariser and display polariser that have electric vector transmission directions that are parallel operating in privacy mode.
Figure 5E:
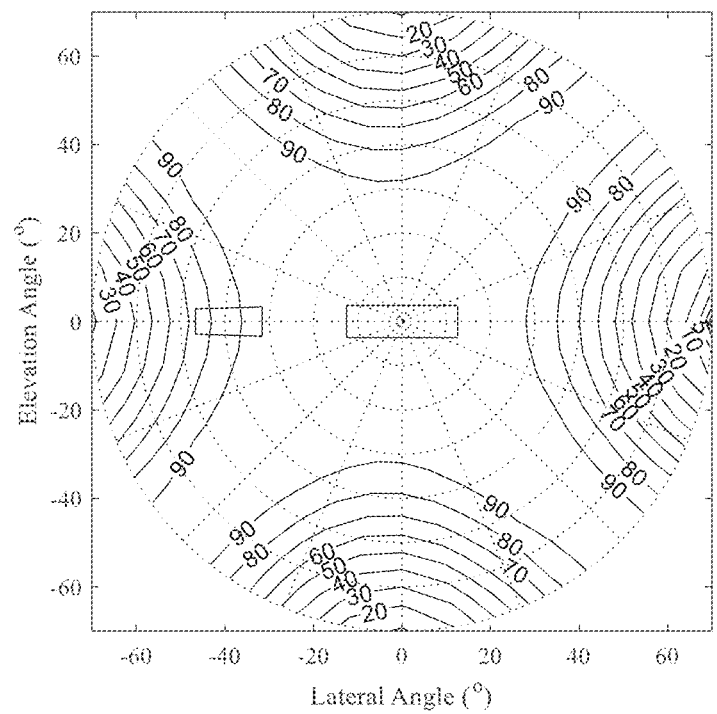
FIG. 5E is a schematic graph illustrating the variation of transmission with polar direction for a polar control retarder using the twisted nematic polar control retarder with additional polariser and display polariser that have electric vector transmission directions that are parallel operating in share mode.

FIG. 5D is a schematic graph illustrating the variation of transmission with polar direction for a polar control retarder 300 using the twisted nematic polar control retarder 301 with additional polariser 318 and display polariser 210 that have electric vector transmission directions 319, 211 that are parallel and operating in privacy mode and for the embodiment of TABLE 2; and FIG. 5E is a schematic graph illustrating the variation of transmission with polar direction for a polar control retarder 300 using the twisted nematic polar control retarder 301 with additional polariser 318 and display polariser 210 that have electric vector transmission directions 319, 211 that are parallel operating in share mode and for the embodiment of TABLE 2 but with 10V uniform drive voltage of the liquid crystal layer 314 compared to the zero volts for FIG. 5C.

TABLE 2

| Item | In-plane rotation angle | In-plane rotation angle | Active LC retarder 301 | | | |
|---|---|---|---|---|---|---|
| | | | Twist | Alignment layers | Pretilt | Δn.d | $V_C$ |
| 318 | 319, $\phi_A$ | 45° | | | | | |
| 314 | 417Ap, $\theta_A$ | 45° | 90° | Homogeneous | 2° | 500 nm | 1.55 V |
| | 417Bp, $\theta_B$ | 135° | | Homogeneous | 2° | | |
| 210 | 211, $\phi_B$ | 45° | | | | | |

In privacy mode, the luminance profile for the passenger 45 is extended, advantageously achieving increased image uniformity in the vertical direction for the passenger 45.

It would be desirable to reduce the cost of the optical stack to achieve increased viewing freedom of driver 47 for high security factor, S.

Figure 6A:
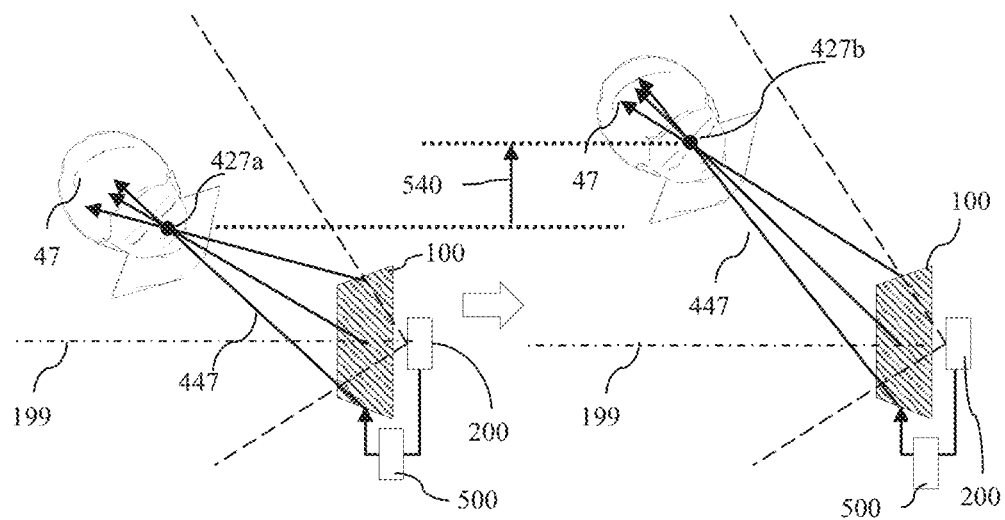
FIG. 6A is a schematic top view illustrating schematically the operation for a driver of a privacy display comprising the polar control retarder with a voltage profile across the polar control retarder and a head tracking system arranged to adjust the voltage across the polar control retarder in response to the measured location of the driver for the driver moving in the predetermined direction.
Figure 6B:
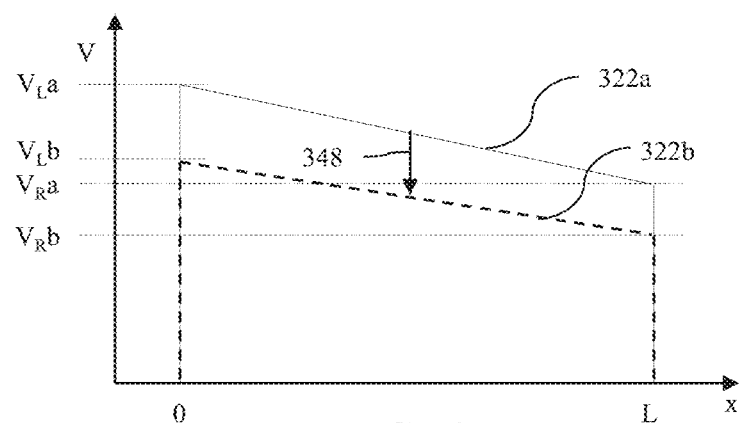
FIG. 6B is a schematic graph illustrating the variation in voltage profile applied to the polar control with respect to lateral position across the polar control retarder for two different driver lateral locations for the driver moving in the predetermined direction.

FIG. 6A is a schematic top view illustrating schematically the operation for a driver 47 of a privacy display device 100 comprising the polar control retarder 300 with a voltage profile 322a across the polar control retarder 300 and viewer tracking system 200 arranged to adjust the voltage profile 322a to voltage profile 322b in response to the measured location of the driver 47; and FIG. 6B is a schematic graph illustrating the variation in voltage V profile 322 applied to the polar control with respect to lateral position across the polar control retarder 300 for two different driver 47 lateral locations and for a display of width L in the predetermined direction (x-axis in this embodiment). Features of the arrangement of FIGS. 6A-B not discussed in further detail may be assumed to correspond to the features with equivalent reference numerals as discussed above, including any potential variations in the features.

In the embodiment of FIGS. 6A-B, the viewer tracking system 200 is arranged to track the location of a viewer 47 movement 540 in the predetermined direction (laterally), wherein the control system 500 is arranged to vary the voltages to the first and second electrode arrangements 320A, 320B in response to the location of the viewer 47.

Thus the control system 500 is arranged to control the spatial light modulator 48 and to supply voltages to the first and second electrode arrangements 320A, 320B for providing the electric field perpendicular to the layer 314 of liquid crystal material 414, the control system being arranged to vary the voltages to the first and second electrode arrangements 320A, 320B for controlling a direction of minimum light transmission of the view angle control arrangement 310.

In operation, the voltage profile 322a with left and right side voltages $V_La$, $V_Ra$ is provided to the polar control retarder 300 for a first measured viewing position, such that a uniformly low security factor is provided across the display device 100. After movement 540 of the driver 47 away from the optical axis 199, the voltage profile 322a is adjusted by voltage change 348 to maintain the location of the minimum transmission to the driver 47 with voltage profile 322b with left and right side voltages $V_Lb$, $V_Rb$.

For the first voltage profile 322a, a first point 427a is provided for points across at least part of the display device 100 which is towards the driver 47. Similarly for the second voltage profile 322b, a second displaced point 427b is provided for points across at least part of the display device 100. The transmission directed towards the driver 47 may advantageously be minimised in response to the location of the driver across at least part of the display device 100.

Figure 6C:
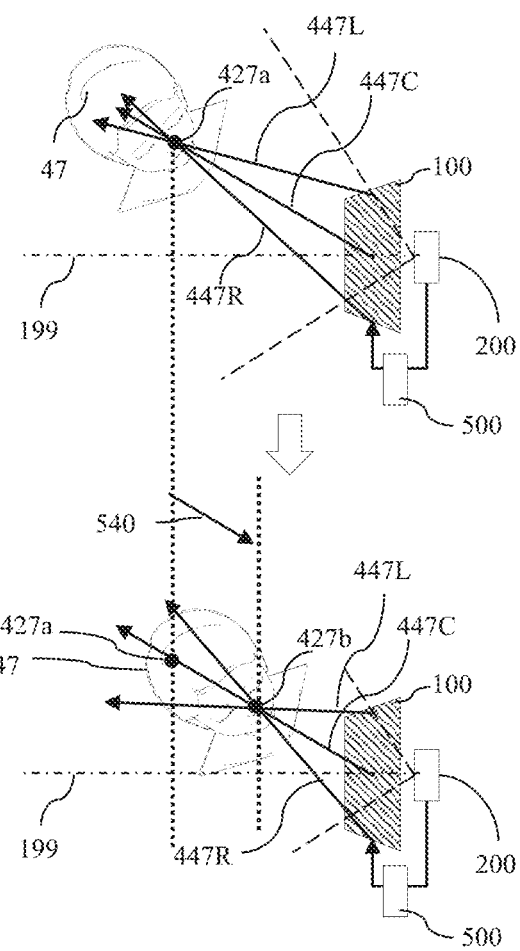
FIG. 6C is a schematic top view illustrating schematically the operation for a driver of a privacy display comprising the polar control retarder with a voltage profile across the polar control retarder and a head tracking system arranged to adjust the voltage across the polar control retarder in response to the measured location of the driver moving towards the display.
Figure 6D:
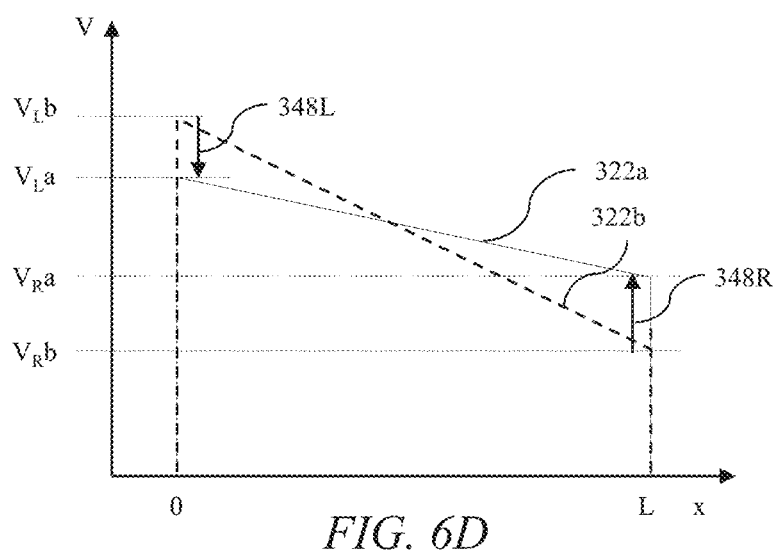
FIG. 6D is a schematic graph illustrating the variation in voltage profile applied to the polar control with respect to lateral position across the polar control retarder for two different driver lateral locations for the driver moving towards the display.

FIG. 6C is a schematic top view illustrating schematically the operation for a driver of a privacy display comprising the polar control retarder with a voltage profile across the polar control retarder and a head tracking system arranged to adjust the voltage across the polar control retarder in response to the measured location of the driver moving towards the display; and FIG. 6D is a schematic graph illustrating the variation in voltage profile applied to the polar control with respect to lateral position across the polar control retarder for two different driver lateral locations for the driver moving towards the display. Features of the arrangement of FIGS. 6C-D not discussed in further detail may be assumed to correspond to the features with equivalent reference numerals as discussed above, including any potential variations in the features.

In the embodiment of FIGS. 6C-D, the viewer tracking system 200 is arranged to track the location of a viewer 47 movement 540 in towards the centre of the display, wherein the control system 500 is arranged to vary the voltages to the first and second electrode arrangements 320A, 320B in response to the location of the viewer 47. In operation, the voltage profile 322a with left and right side voltages $V_La$, $V_Ra$ is provided to the polar control retarder 300 for a first measured viewing position with a first monotonic profile 322a, such that a uniformly low security factor is provided across the display device 100 for the driver near point 427a. After movement 540 of the driver 47 in this illustrative example towards the display device 100 centre, then light rays 447C to point 427b are in substantially in the same direction for both viewing positions. In the centre of the display device 100, the voltage is thus unmodified. However light rays 447R, 447L have different angles so that the profile 322b is modified accordingly with respect to profile 322a as illustrated in FIG. 6D.

The transmission directed towards the driver 47 by view angle control element 310 of display device 100 may advantageously be minimised in response to the location of the driver across at least part of the display device 100. Uniformity of security factor may be increased over a wider driver 47 headbox.

It may be desirable to reduce the complexity of the polar control retarder 300.

Figure 6E:
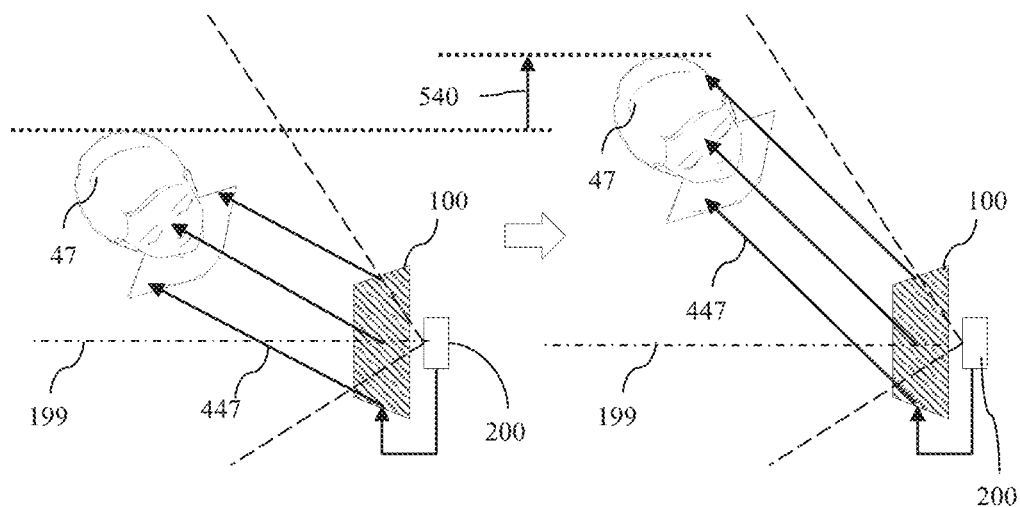
FIG. 6E is a schematic top view illustrating schematically the operation for a driver of a privacy display comprising the polar control retarder with a common voltage across the polar control retarder and a head tracking system arranged to adjust the common voltage across the polar control retarder in response to the measured location of the driver.
Figure 6F:
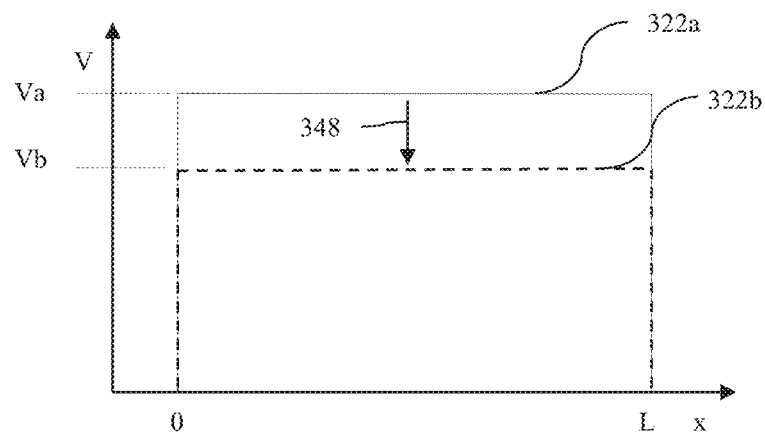
FIG. 6F is a schematic graph illustrating the variation in common voltage applied to the polar control for two different driver lateral locations.

FIG. 6E is a schematic top view illustrating schematically the operation for a driver 47 of an alternative privacy display device 100 comprising the polar control retarder 300 with a common voltage V across the polar control retarder 300 and a head tracking system arranged to adjust the common voltage V across the polar control retarder 300 in response to the measured location of the driver 47; and FIG. 6F is a schematic graph illustrating the variation in common voltage V applied to the polar control for two different driver 47 lateral locations for the arrangement of FIG. 6E.

In comparison to the arrangement of FIGS. 6A-B, the magnitude of the electric field perpendicular to the layer 314 of liquid crystal material is uniform across the entirety of the display device 100.

Luminance reduction to a moving driver 47 may be provided by tracking the driver 47 polar location 448 and adjusting the voltage across the liquid crystal layer of the polar control retarder in correspondence. High image security may be provided at the user. At a first measured polar location 448a of the driver 47, then profile 322a with constant voltage Va is applied and at a second measured polar location 448b of the driver 47 then profile 322b with constant voltage Vb is applied.

The luminance supplied to the driver may be minimised for at least one location on the display device 100. Reduced luminance is achieved over an increased polar region. Advantageously the cost and complexity of the transmissive electrodes 320A, 320B and drive circuit 352 may be reduced.

An illustrative example of tracking of the location of the driver 47 using controllable transmission profile of polar control retarder 300 will now be described.

FIG. 7A is a schematic top view of operation of a privacy display device 100 for a moving driver 47 and a head tracking system arranged to minimise luminance to the driver 47; and FIG. 7B-D are graphs illustrating the variation of transmission with polar direction for the polar control retarder 300 of FIG. 2A using the twisted nematic polar control retarder 300 of FIG. 3 operating with different voltage V profiles 322 across the polar control retarder 300 and the embodiment of TABLE 2.

As illustrated for FIGS. 7A-D, luminance reduction to a moving observer may be provided by tracking the driver 47 polar location 448 and adjusting the voltage profile of the polar control retarder in correspondence.

For the location 47B, the average voltage across electrodes 320A, 320B may be adjusted to provide transmission profile of FIG. 7B of the view angle control element; for the location 47C, the average voltage across electrodes 320A, 320B may be adjusted to provide transmission profile of FIG. 7C of the view angle control element; and for the location 47C, the average voltage across electrodes 320A, 320B may be adjusted to provide transmission profile of FIG. 7C of the view angle control element.

Advantageously high image security for multiple driver locations 47 is achieved as will now be described.

Figure 8A:
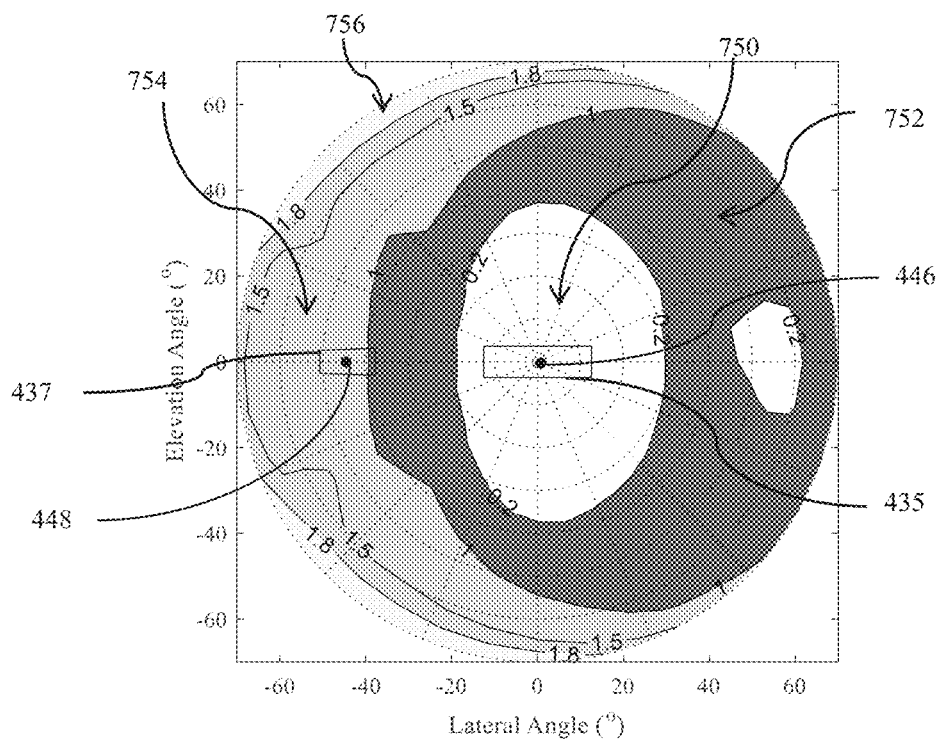
FIG. 8A is a graph illustrating a simulated polar profile of the security level, S of the arrangement of FIG. 2A for an ambient illuminance measured in lux that is equal to the head-on display luminance measured in nits and for the polar profile of backlight luminance of FIG. 16A and polar profile of polar control retarder transmission of FIG. 4B.
Figure 8B:
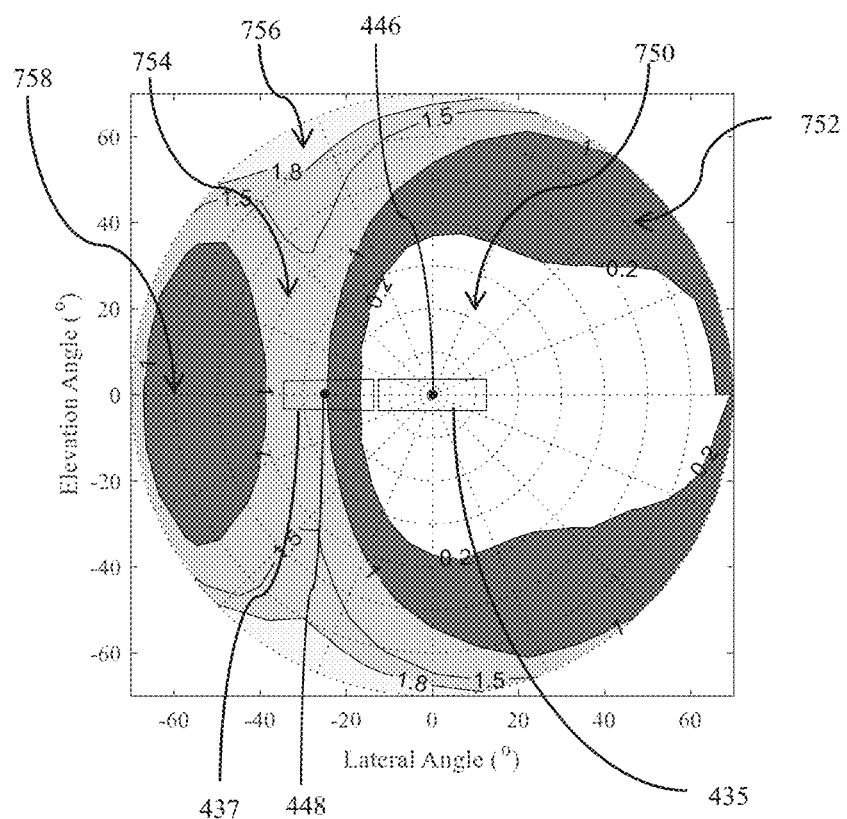
FIG. 8B is a graph illustrating a simulated polar profile of the security level, S of the arrangement of FIG. 2A for an ambient illuminance measured in lux that is equal to the head-on display luminance measured in nits and for the polar profile of backlight luminance of FIG. 16A and polar profile of polar control retarder transmission of FIG. 4A.

FIG. 8A is a schematic graph illustrating a simulated polar profile of the security level, S of the arrangement of FIG. 2A for an ambient illuminance measured in lux that is equal to the head-on display luminance measured in nits and for the polar profile of backlight luminance of FIG. 16A hereinbelow, and polar profile of polar control retarder transmission of FIG. 7C, with Fresnel front surface reflectivity of the display device 100; and FIG. 8B is a schematic graph illustrating a simulated polar profile of the security level, S of the arrangement of FIG. 2A for an ambient illuminance measured in lux that is equal to the head-on display luminance measured in nits and for the polar profile of backlight luminance of FIG. 16A and polar profile of polar control retarder transmission of FIG. 7D, with Fresnel front surface reflectivity of the display device 100.

Region 750 represents the polar region for the passenger 45 to achieve high image visibility with S<0.2. The angular locus of display outline 435 is thus provided in the region of high image visibility and the passenger can easily see the image data from the SLM 48. Region 752 comprises the polar region over which the image is neither clearly visible or clearly private with $0.2 \leq S<1$. Region 754 comprises the polar directions over which most image content appears to be private with $1 \leq S<1.8$ while observers located in region 754 see no images, independent of content.

In the present embodiments using the view angle control arrangement 310 of FIG. 3A for example, the polar control retarder 300 is pupillated so that the security factor at the centre of the display is similar to that at the edges of the display, and thus the driver 47 may see a uniformly private image (S=1) for a viewing angle of 25°.

In systems without pupillation then parts of the display region 437 will have S<1 and so parts of the display will appear to be non-private.

In regions 758 for which S<1 at higher viewing angles for the driver, the image may appear to drop below a threshold of acceptable privacy.

The variation in location of polar region 754 with acceptable security factor may be provided by control of voltage profile 322. Thus the arrangement of FIG. 8A using the transmission profile of FIG. 4B, may be adjusted by changing the voltage profile 322 by change 348 to achieve the security factor profile of FIG. 8B as the driver 47 moves closer to the axis, that is closer to the angle α in FIG. 1A.

It would be desirable to provide further improvements in image security in the polar region near to the driver 47. In embodiments hereinbelow such as illustrated in FIGS. 23A-C, FIG. 24A and FIG. 25A increased image security may be provided by using a further additional polariser and a further polar control retarder. Advantageously the embodiment illustrated by the results of FIGS. 8A-B may be achieved with fewer polar control retarders 300, achieving reduced cost, thickness, weight and complexity.

Methods to control a polar control retarder 300 will now be described.

Figure 9A:
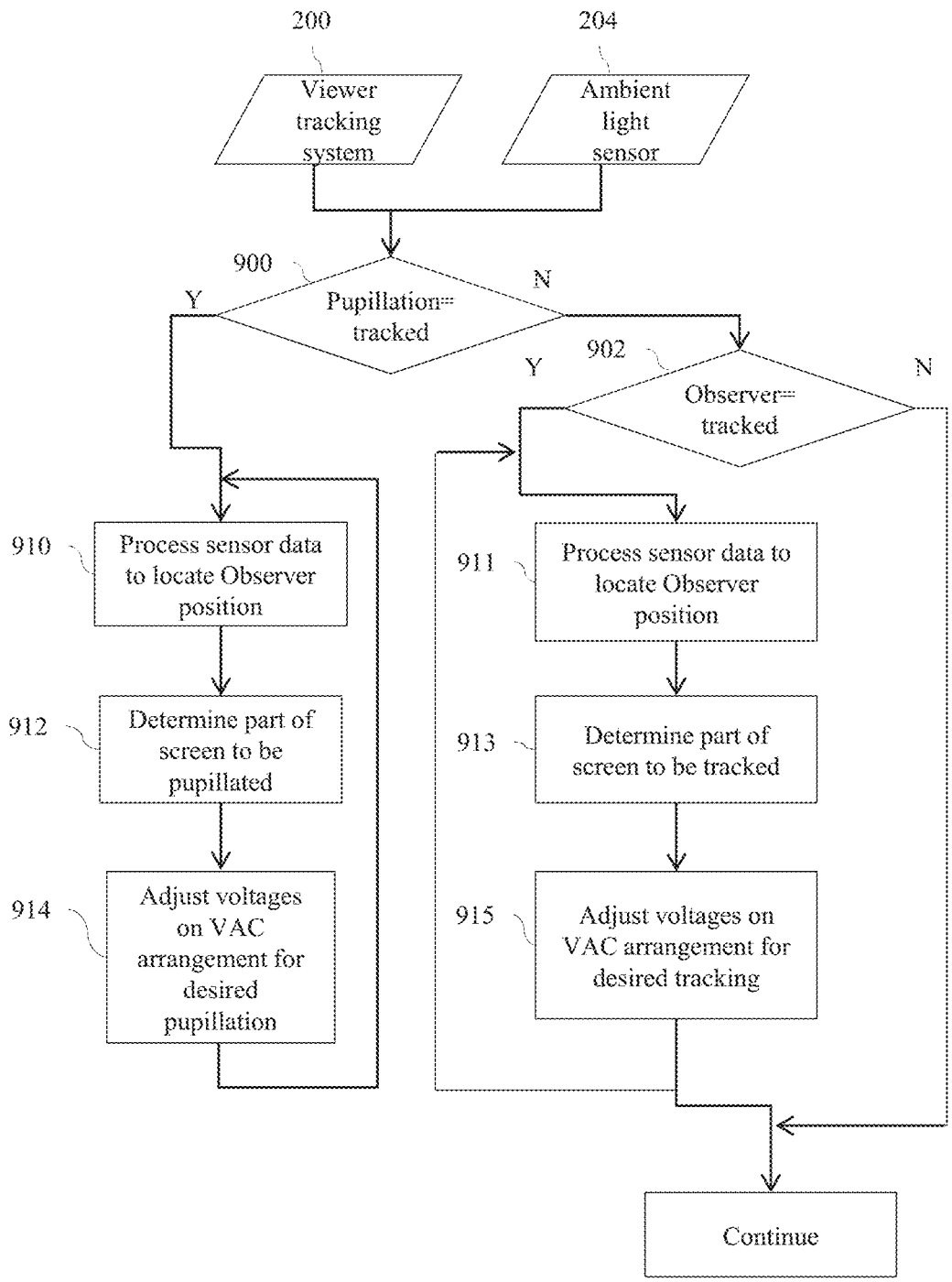
FIG. 9A is a flow chart illustrating a method to control an observer-tracked polar control retarder.

FIG. 9A is a flow chart illustrating a method to control an observer-tracked polar control retarder 300. Features of the arrangement of FIG. 9A not discussed in further detail may be assumed to correspond to the features with equivalent reference numerals as discussed above, including any potential variations in the features.

The location of the observer 47 may be determined by means of viewer tracking system 200 and associated image processing. The ambient light level may be measured by means of ambient light sensor 204. The ambient light level may be used as an input to set the display brightness so that the viewability of the display device 100 may be optimised to a minimum or a maximum as desired. The ambient light system 204 may detect levels impinging on it as a function of input angle. The control system 500 may be set to track the observer 47 by processing sensor data 910.

The control system 500 may be operated with both pupillation and tracking control of the voltage profile 322 across electrodes 320A, 320B.

Alternatively the control system 500 may be operated without pupillation needing to be adjusted in response to driver 47 location. The voltage profile may be adjusted for movement of the driver 47 in the predetermined direction by modifying the average voltage of the profile, for example by means of voltage change 348 as illustrated in FIG. 6B or FIG. 6D.

All or optionally part of the display device 100 may be set or determined 912 to be pupillated by options in the control system 500. The pupillation may be controlled by an adjustment 914 of voltages on the polar control retarder 300 of the view angle control arrangement 310 as set by system 500 control options.

In the case where the pupillation is not tracked, for example as illustrated in FIGS. 6E-F a similar method with appropriately adjusted voltages applied to the polar control retarder 300 of the view angle control arrangement 310 to optimise the display security factor for the driver 47 location is performed as illustrated on the right-hand side of FIG. 9A.

The observer 47 location signal from viewer tracking system 200 may be mathematically differentiated with respect to time in order to determine velocity and acceleration of the observer 47 so that any of this data can be used in a predictive tracking control loop tracking the observer to further improve dynamic tracking performance as the observer 47 moves.

Figure 9B:
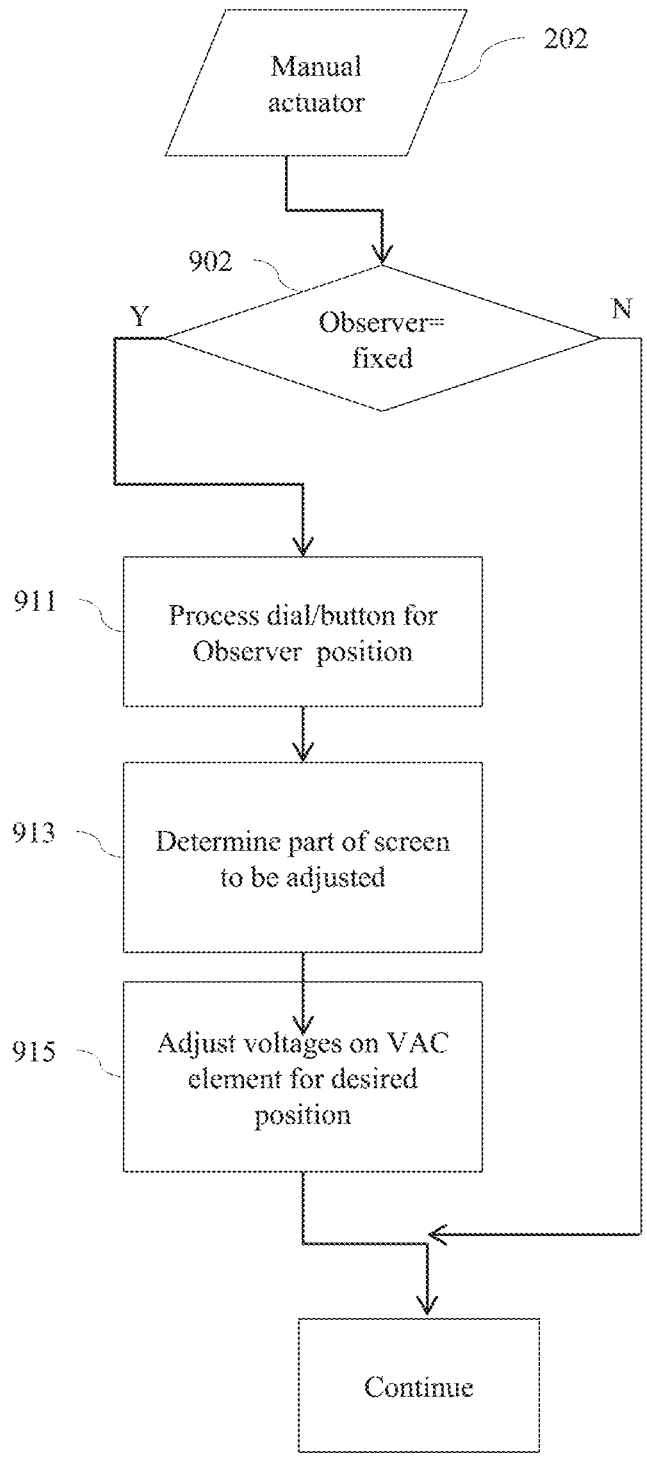
FIG. 9B is a flow chart illustrating a method for manual control of an adjustable polar control retarder.

FIG. 9B is a flow chart illustrating a method for manual control of an adjustable polar control retarder 300, for example for use with the arrangement of FIG. 1B. Features of the arrangement of FIG. 9B not discussed in further detail may be assumed to correspond to the features with equivalent reference numerals as discussed above, including any potential variations in the features.

The display device 100, is not tracked by means of a viewer tracking system 200, the display device 100 may nevertheless be adjusted and controlled by a manual actuator 202 such as dial or buttons so that these signals may be processed 911 and the viewing conditions set or adjusted by the observer 45 or user. The control of the system may be achieved by means of adjustment of the voltages in the polar control retarder 300, included in the view angle control arrangement 310. Advantageously cost and complexity may be reduced.

The operation of a pupillated display device 100 in privacy mode will now be further described.

Figure 10A:
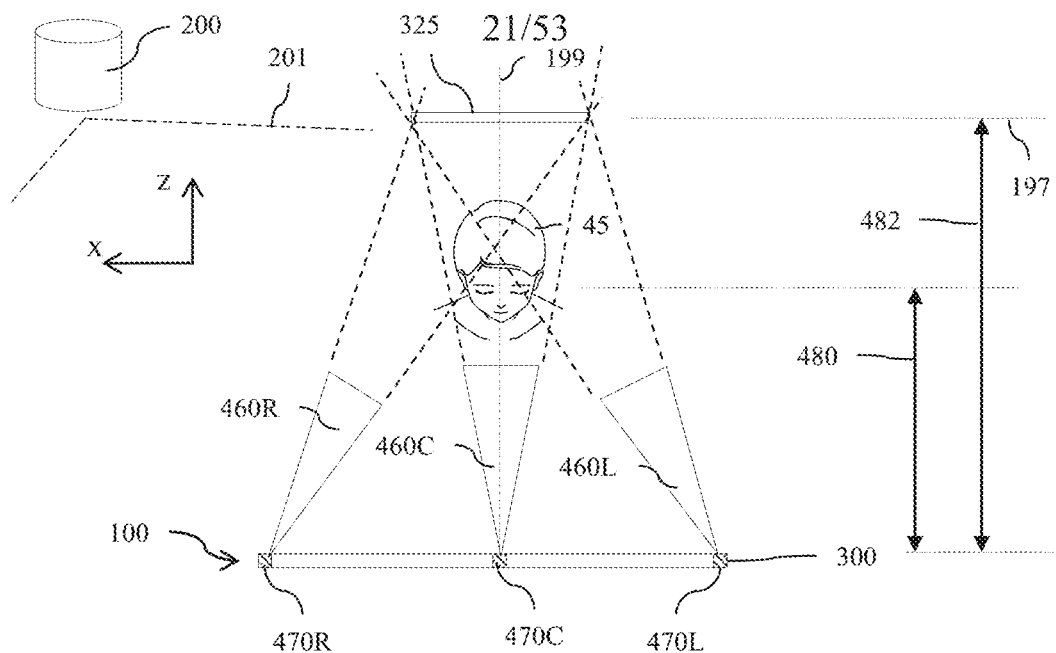
FIG. 10A is a schematic top view illustrating schematically the operation for a passenger of a privacy display comprising the polar control retarder with voltage profile of FIG. 2A.
Figure 10B:
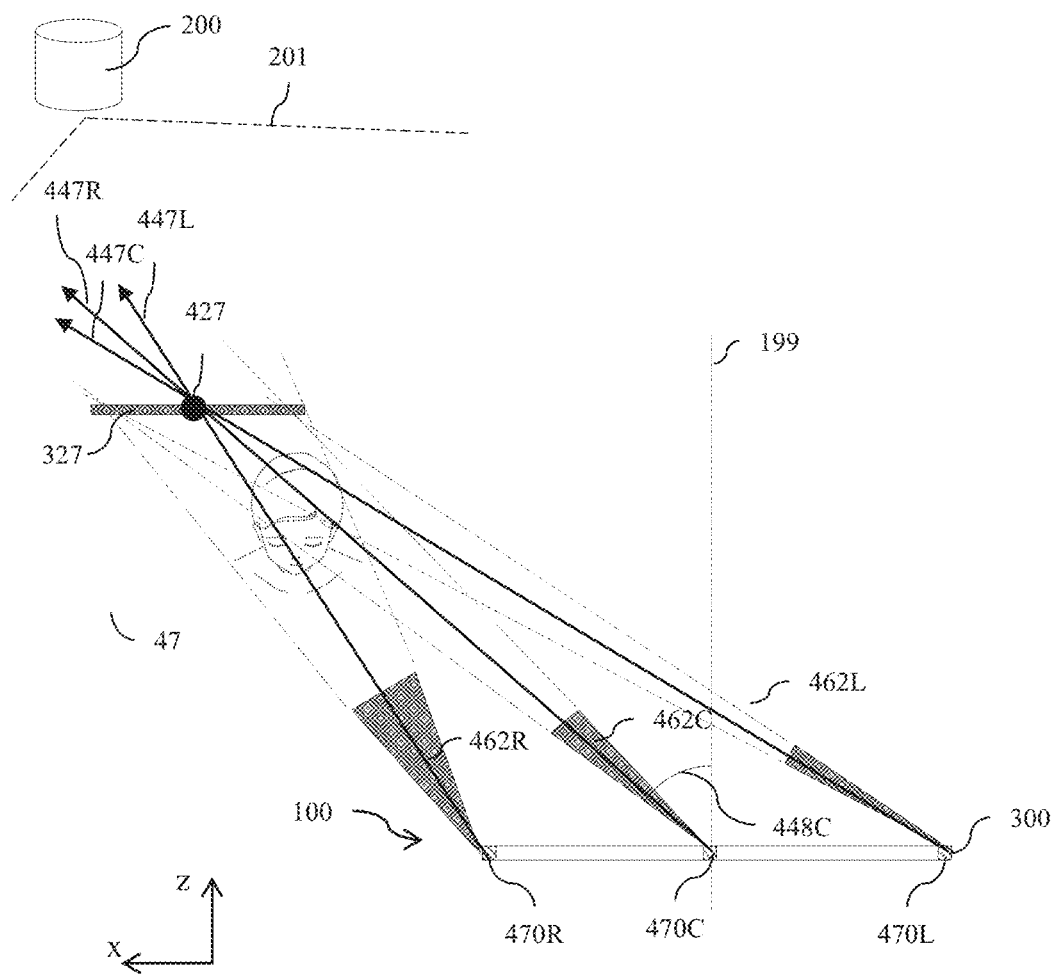
FIG. 10B is a schematic top view illustrating schematically the operation for a driver of a privacy display comprising the polar control retarder with voltage profile of FIG. 2A.

FIG. 10A is a schematic top view illustrating schematically the operation for a passenger 45 of a privacy display device 100 comprising the polar control retarder 300 with voltage V profile 322 of FIG. 2A; and FIG. 10B is a schematic top view illustrating schematically the operation for a driver 47 of a privacy display device 100 comprising the polar control retarder 300 with voltage V profile 322 of FIG. 2A. Features of the arrangement of FIGS. 10A-B not discussed in further detail may be assumed to correspond to the features with equivalent reference numerals, including any potential variations in the features.

In comparison to the description of FIG. 3B, the output from the polar control retarder 300 is illustrated as cones 460R, 460C, 460L, where the width of the respective cone 460R, 460C, 460L represents the angular width comprising a limited range of transmission values, for example the cone angles for which transmission is within 20% of a nominal value.

As illustrated in FIG. 10A, the light cones 460R, 460C, 460L towards the passenger 45 may be arranged to overlap in an illumination window 325 at a plane 197 at distance 482 from the display device 100 that may be different from the nominal viewing distance 480 of the passenger 45 from the display device 100 along the display normal 199. The distance 482 may be greater than the distance 480. Advantageously the variation in uniformity as the passenger 45 moves in a lateral direction may have a natural sensation of roll-off rather than a rapid switching behaviour.

Similarly, as illustrated in FIG. 10B the cones 462R, 462C, 462L of low light transmission towards the passenger 45 may be arranged to overlap in an illumination window 327, and at a greater distance from the display device 100 than the nominal driver 47 locations.

The illumination windows 325, 327 are sometimes referred to as pupils, and the output transmission profile from the polar control retarder provided by the voltage variation 322 may be referred to as pupillated, that is the illumination windows 325, 327 are at a finite distance from the display device 100.

By way of comparison with the embodiment of FIGS. 3A-B the output of a display without the voltage profile 322 will be described.

Figure 11A:
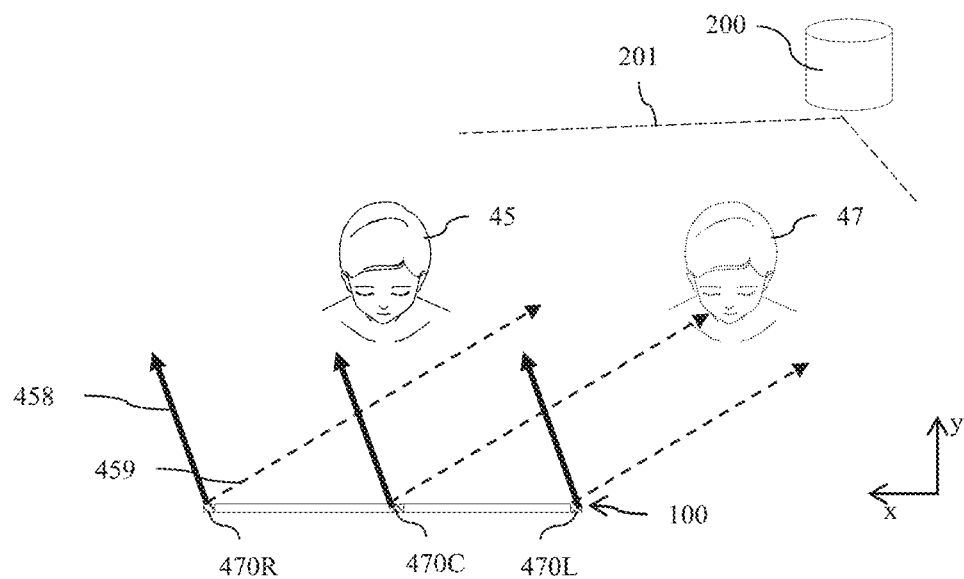
FIG. 11A is a schematic top view illustrating schematically the operation for a passenger and a driver of a privacy display comprising the polar control retarder with a common voltage in the lateral direction across at least one region of the polar control retarder.
Figure 11B:
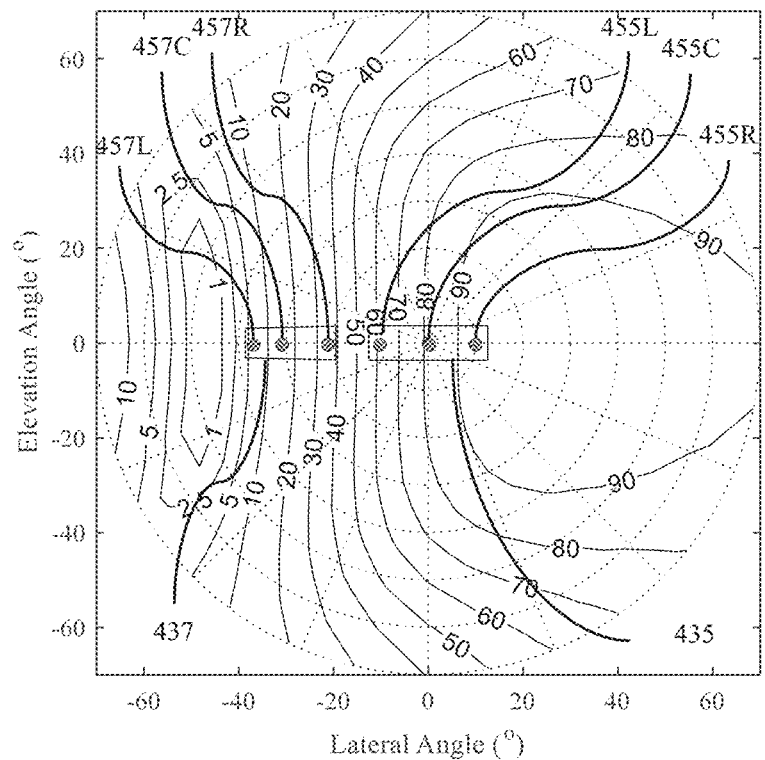
FIG. 11B is a schematic graph illustrating the variation of transmission across the display surface with polar direction for a polar control retarder with a common voltage across the polar control retarder.

FIG. 11A is a schematic top view illustrating schematically the operation for a passenger 45 and a driver 47 of a privacy display device 100 comprising the polar control retarder 300 with a common voltage V in the lateral direction across at least one region of the polar control retarder 300; and FIG. 11B is a schematic graph illustrating the variation of transmission across the display device 100 surface with polar direction for a polar control retarder 300 with a common voltage V across the polar control retarder 300 of TABLE 1. Features of the arrangement of FIGS. 11A-B not discussed in further detail may be assumed to correspond to the features with equivalent reference numerals as discussed above, including any potential variations in the features.

In comparison with the arrangement of FIG. 3B, the output is not pupillated and each point 470R, 470C, 470L on the display device 100 directs the maximum transmission in a common direction 458 and the minimum transmission in a common direction 459.

FIG. 11B illustrates that the angles 455L, 455C, 455R of FIG. 3B have different transmissions and thus the uniformity of the image is reduced for the passenger 45. Similarly, the transmission to the driver varies with the angles 457L, 457C, 457R of FIG. 3B have different transmissions and thus the uniformity of security factor is reduced for the driver 47.

To achieve the pupillation effects described above it would be desirable to achieve a one-dimensional variation in the electro-optic response of the liquid crystal material 414 of the switchable liquid crystal retarder 301. An illustrative structure that can achieve the desirable characteristics of the display device 100 of FIG. 2A will now be described.

Figure 12A:
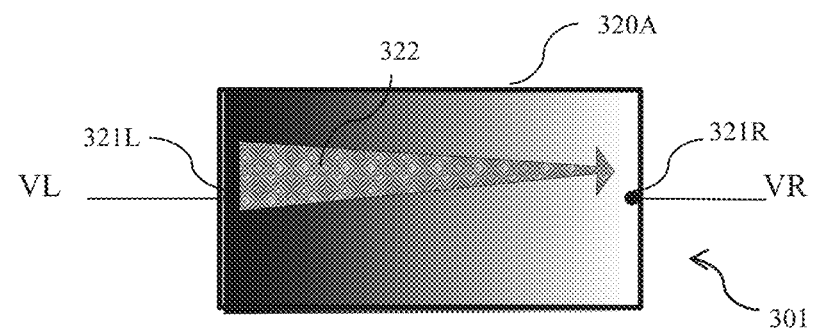
FIG. 12A is a schematic diagram illustrating in front view a voltage profile across an area electrode comprising a view angle control arrangement for a privacy display.

FIG. 12A is a schematic diagram illustrating a front perspective view a transparent electrode 320A comprising part of a switchable liquid crystal retarder 301 of a switchable display device 100 comprising a transmissive SLM 48. Features of the arrangement of FIG. 12A not discussed in further detail may be assumed to correspond to the features with equivalent reference numerals as discussed above, including any potential variations in the features.

The first electrode arrangement 320A comprises a continuous electrode extending over the entirety of the layer 314 of liquid crystal material 414, the continuous electrode having two contacts 321L, 321R disposed at opposite ends of the continuous electrode along the predetermined axis and arranged to supply respective voltages that create a voltage profile 322 on the continuous electrode 320A along the predetermined axis for providing the electric field 370 perpendicular to the layer 314 of liquid crystal material 414. In alternative embodiments, the electrode 320B rather than 320A may comprise the structure of FIG. 12A. The voltage profile 322 may be a voltage gradient that is monotonic. The voltage profile 322 provides the variation of electric field 370 across the predetermined direction, for example as illustrated in FIG. 3A.

In this embodiment, the second electrode arrangement 320B is arranged to supply a common voltage across the area of the electrode arrangement 320B. In other words, the second electrode arrangement 320B comprises a continuous uniform resistance per square electrode extending over the entirety of the layer 314 of liquid crystal material 414.

The control system 352 of FIG. 2A is arranged to supply voltages to the first and second electrode arrangements 320A, 320B for providing the electric field 370 perpendicular to the layer 314 of liquid crystal material 414.

In the illustrative example of FIG. 3A, the electric field 370 perpendicular to the layer 314 of liquid crystal is produced by means of x-axis variation in the electrode voltage in the predetermined direction which is the lateral or x-axis direction leading to a variation in the electro optic response of, for example, a liquid crystal material 414 in the layer 314.

In the embodiment of FIG. 12A different voltages VL, VR are applied at the left and right ends of the transparent electrode 320A. This differs from a conventional liquid crystal display where the voltage applied to the transparent electrode 320A is either applied at a single point or the same voltage VL is applied at multiple points. This is to establish a uniform potential on the transparent electrode 320A. Note that in the conventional case there is no current flow in the predetermined direction so the potential across the resistance of the transparent electrode 320 remains the same. By way of comparison in the present embodiments current does flow between electrodes 321L, 321R.

In FIG. 12A different voltage contacts 321 are applied at different points specifically VL and VR where VL>VR is illustrated and a voltage profile 322 across (along the x-axis direction of) the transparent electrode 320A is produced because of its sheet resistance. Typical sheet resistances for transparent conductive coatings are in the range 10 to 1000 ohms per square. The point contact of the voltage VL and VR may provide a non-uniformity of the magnitude of the electric field around the contact 321L, 321R and this can cause the voltage profile 322 to deviate from uniformity in the y-axis near to the contacts. This may be particularly undesirable for low aspect ratio (more square) displays.

It would be desirable to reduce the deviation from uniformity of the voltage profile 322 near to the contacts 321L, 321R of VL and VR.

Figure 12B:
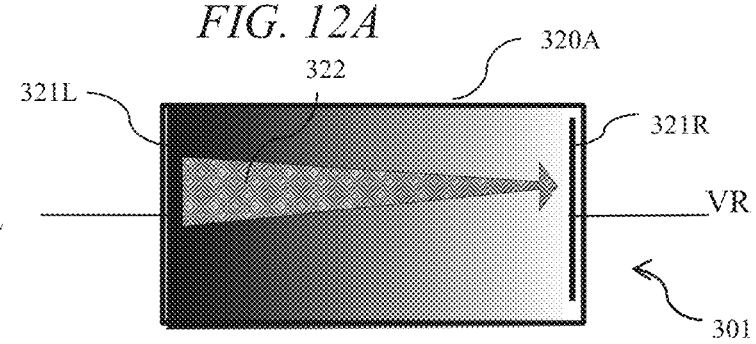
FIG. 12B is a schematic diagram illustrating in front view a voltage profile across an area electrode comprising a view angle control arrangement using bus bars.

FIG. 12B is a schematic diagram illustrating in a front perspective view a transparent electrode 320A with additional bus bars comprising the contacts 321L and 321R. Features of the arrangement of FIG. 12B not discussed in further detail may be assumed to correspond to the features with equivalent reference numerals as discussed above, including any potential variations in the features.

The two contacts 321L, 321R comprise conductive bars extending perpendicular to the predetermined axis.

The bus bars contacts 321L, 231R comprise material with higher conductivity than that of the transparent electrode 320A and may for example comprise metal or a stack of thin film metals such that the voltage VL is effectively applied with a low impedance line contact to the transparent electrode 320A rather than a point contact. The voltage profile 322 in the y-axis direction is therefore more uniform compared to that of FIG. 12A and the display device 100 can advantageously provide reduced visibility of edge effects from non-uniform electric fields 370 in the y-axis direction.

The voltage profile 322 could be reversed by making VR>VL. The voltage profile 322 could alternatively be produced in the y direction, if so desired, by altering the location of voltage contacts 321L, 321R (not illustrated).

Figure 12C:
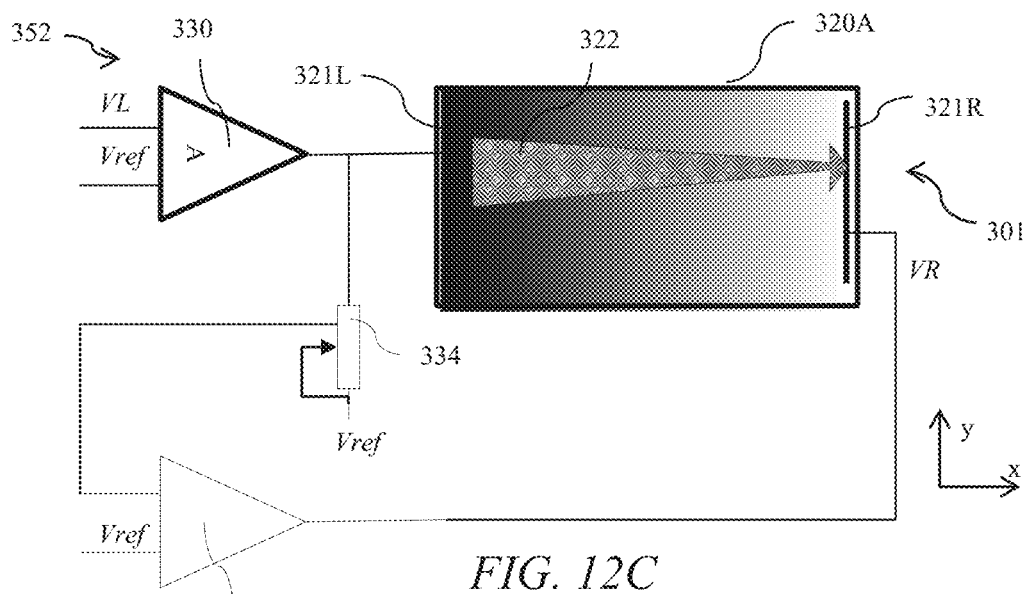
FIG. 12C is a schematic illustration of a circuit to produce a voltage profile in the x direction.

FIG. 12C is a schematic diagram illustrating in front perspective an exemplary method of implementing voltages VL and VR. VL and VR are applied to transparent electrode 320A by means of driver 330, 331 which may be an integrated circuit comprising an op-amp. Features of the arrangement of FIG. 12C not discussed in further detail may be assumed to correspond to the features with equivalent reference numerals as discussed above, including any potential variations in the features.

VL may be an alternating potential such as a square or sine wave. The output of drive circuit 330 is scaled down, illustrated schematically by variable resistor 334 and that potential is then buffered by driver 331 to create alternating voltage VR which is synchronised with VL. The voltage scaling may be achieved by other known circuits such that the scaling may be under electronic control by a control system in response to for example the location of an observer. The lateral voltage profile 322s provided by this circuit creates electric fields in the predetermined direction with magnitudes that are typically much lower than the magnitude of the electric field 370 perpendicular to the switchable liquid crystal retarder 301 i.e. in the z-axis direction.

FIG. 12A further illustrates Vref that is a reference potential, which may be the potential applied to transparent electrode 320B (not shown) for example.

Figure 12D:
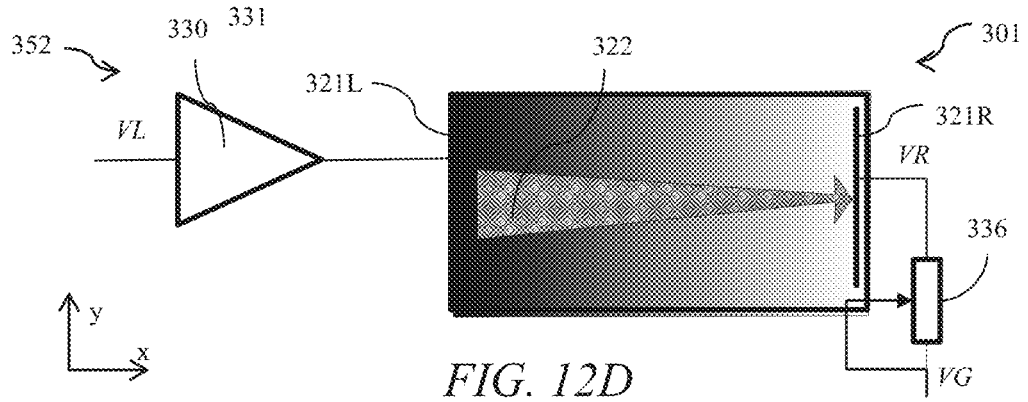
FIG. 12D is a schematic illustration of a circuit to produce a voltage profile in the x direction.

FIG. 12D is a schematic diagram illustrating in front perspective an alternative embodiment of a control system 352 for providing voltages VL and VR. Features of the arrangement of FIG. 12D not discussed in further detail may be assumed to correspond to the features with equivalent reference numerals as discussed above, including any potential variations in the features.

VL is applied to transparent electrode 320A by means of driver 330 which may be an integrated circuit such as an op-amp.

Bus bar contact 321R is illustrated schematically connected to tuneable variable resistor 336 and to voltage VG. A current path is created from VL to VG and the relative voltage drop to VR across the sheet resistance of transparent electrode 320A may be adjusted by means of tuneable resistor 336. The tuneable resistor 336 may be replaced by an electronically controlled variable voltage that enable the degree of pupillation to be controlled, for example in response to the location of the observer. Voltage VL may be an alternating e.g. square wave voltage in order to meet the DC balance conditions across the liquid crystal layer 314. Voltage VG may be a fixed potential such as ground or for example an alternating voltage to contribute to the DC balance design of the switchable liquid crystal retarder 301. VG may also be the potential applied to transparent electrode 320B.

Figure 13A:
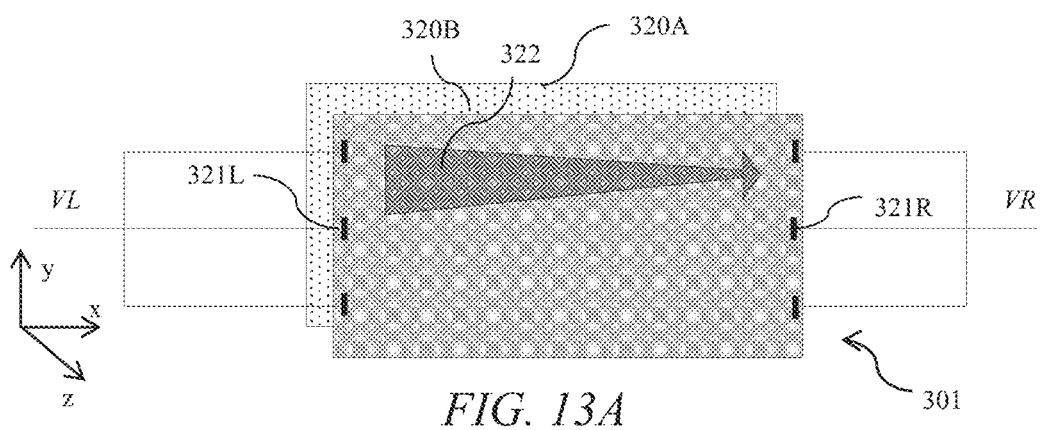
FIG. 13A is an illustration in perspective view of the opposing electrodes of a view angle control arrangement.

FIG. 13A is a schematic diagram illustrating in front perspective an exemplary assembly of switchable liquid crystal retarder 301 comprising opposing transparent electrodes 320A and 320B. Features of the arrangement of FIG. 13A not discussed in further detail may be assumed to correspond to the features with equivalent reference numerals as discussed above, including any potential variations in the features.

In comparison with FIG. 12A, voltages may be applied to multiple contacts 321L, 321R on transparent electrode 320B to create voltage profile 322 and transparent electrode 320A may have a uniform voltage.

FIG. 13A further shows that contacts 321L, 321R may be provided at more than one point on at least one side of the electrode arrangement 320A. Advantageously non-uniformities of electric field profile 370 may be reduced.

Figure 13B:
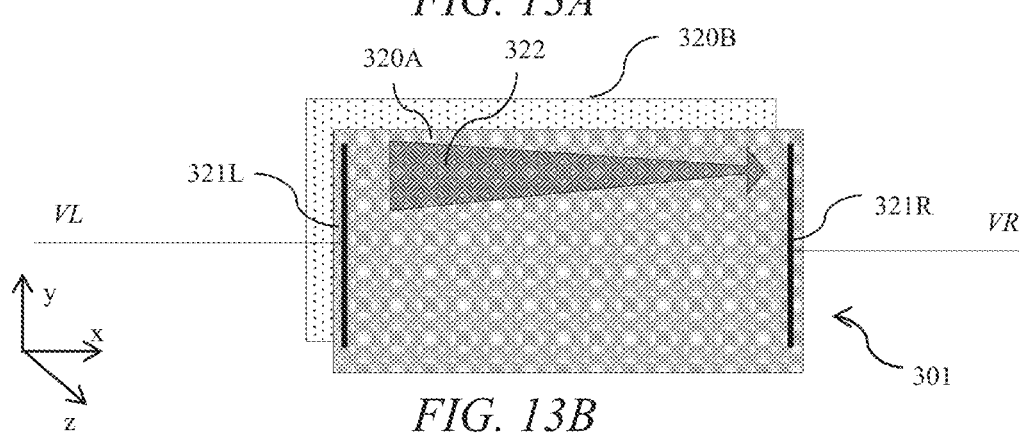
FIG. 13B is an illustration in perspective view of the opposing electrodes of a view angle control arrangement utilising bus bars for one electrode layer.

FIG. 13B is a schematic diagram illustrating in front perspective a further exemplary assembly of switchable liquid crystal retarder 301 comprising opposing transparent electrodes 320A and 320B. Features of the arrangement of FIG. 13B not discussed in further detail may be assumed to correspond to the features with equivalent reference numerals as discussed above, including any potential variations in the features.

In comparison with reference to FIG. 13A, bus bars contacts 321L and 321R are used, as described with reference to FIG. 12B, to create a lateral voltage profile 322 on transparent electrode 320B. The voltage profile 322 may be present on the front or the back of the switchable liquid crystal retarder 301. The lateral voltage profile 322 creates a difference in the magnitude of the electric field 370 in the perpendicular (z-axis direction) over the layer 314 of liquid crystal material 414.

Figure 13C:
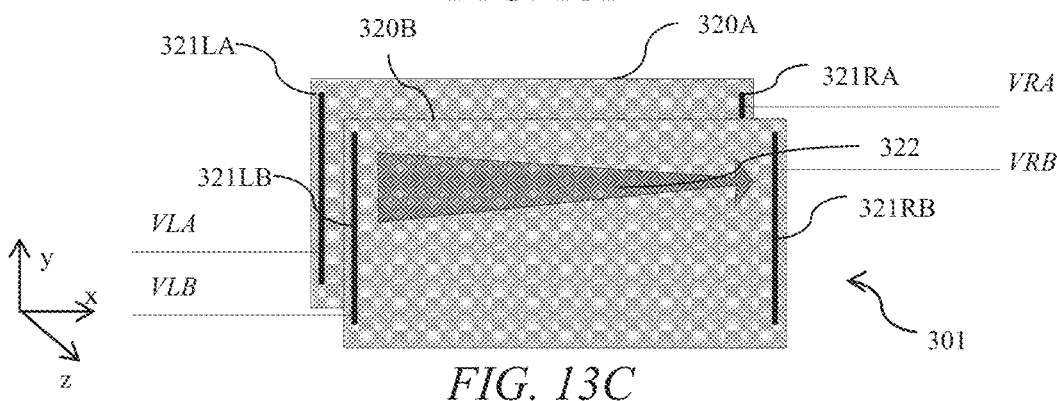
FIG. 13C is an illustration in perspective view of the opposing electrodes of a view angle control arrangement utilising bus bars for both electrodes.

FIG. 13C is a schematic diagram illustrating in front perspective a further exemplary assembly of switchable liquid crystal retarder 301 comprising opposing transparent electrodes 320A and 320B. Features of the arrangement of FIG. 13C not discussed in further detail may be assumed to correspond to the features with equivalent reference numerals as discussed above, including any potential variations in the features.

In this case a voltage profile 322 is produced on both transparent electrode 320A and 320B by means of bus bar contacts 321LA, 321RA and 321LB, 321RB respectively. The voltages VLA, VLB, VRA, VRB applied may be adjusted to give in the required predetermined direction voltage profile 322 to produce the desirable electric field 370 profile in layer 314 of liquid crystal 414 and difference in electro optic response of the liquid crystal in the z-axis of the switchable liquid crystal retarder 301.

In the embodiments of FIG. 12A to FIG. 13C the x-axis voltage profile 322 created depends on the applied voltages VL and VR and the resistance uniformity of the respective transparent electrode 320A or 320B. It is common for deposited transparent electrodes to have a uniform resistance per area and therefore the voltage profile 322 across the transparent electrode 320A from bus bar contacts 321L to 321R is essentially linear. However, the electro optic response of the liquid crystal contained in the switchable liquid crystal retarder 301 may require a different response function to achieve the desired optical effect. It would be desirable to be able to produce a prescribed variation in the profile across one or more of the transparent electrodes.

Figure 13D:
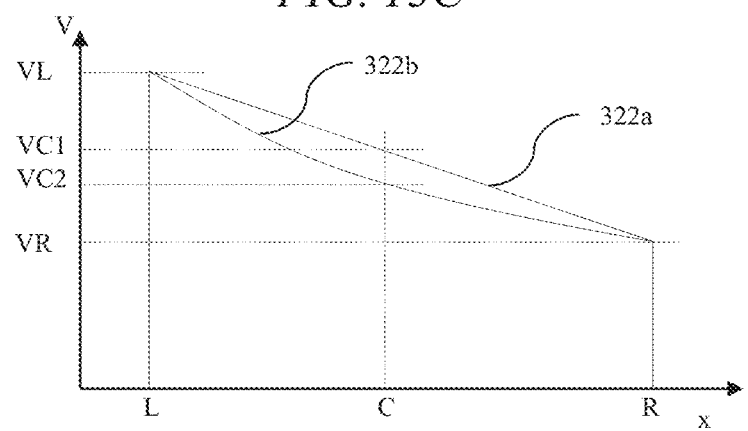
FIG. 13D is a schematic graphical illustration of the different curved response functions.

FIG. 13D is a schematic diagram illustrating different profiles of voltage with lateral position across the display device 100. Features of the arrangement of FIG. 13D not discussed in further detail may be assumed to correspond to the features with equivalent reference numerals as discussed above, including any potential variations in the features.

Voltage profile 322a illustrates a linear voltage profile 322, that is a uniform gradient, between the left and right ends of the electrode layer 320A. However, it may be desirable to produce a non-linear voltage profile 322b between the left and right ends, for example a curve. In this way the voltage VC2 at the centre of the electrode may differ from the linear gradient case voltage VC1. This is so that the electro optic response of the liquid crystal layer 314 varies spatially as desired to provide the desired pupillation of the display. The gradient 322a can be implemented by varying the resistance per square of the electrode material for example.

The curve 322b may be provided to achieve increased accuracy of directing minimum transmission of light rays to point 427 across the at least part of the display device 100. Advantageously increased uniformity may be provided.

It would be desirable to be able to implement curve 322b without control during manufacture of the variation of the sheet resistance per square of the area of the electrode material.

Figure 13E:
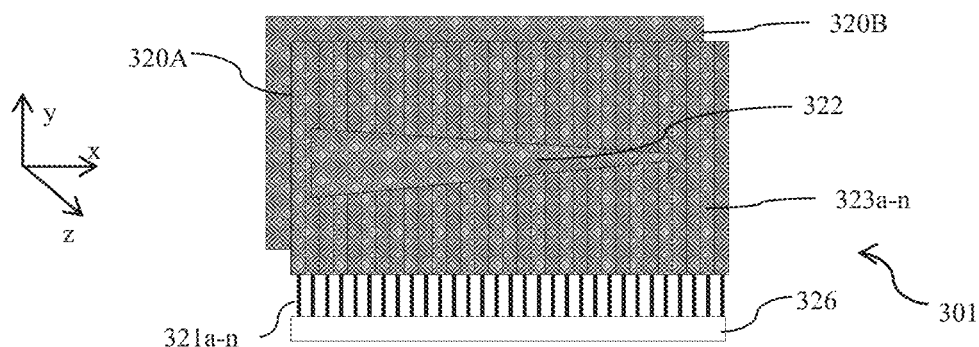
FIG. 13E is an illustration in perspective view of the opposing electrodes of a view angle control arrangement a segmented electrode.
Figure 13F:
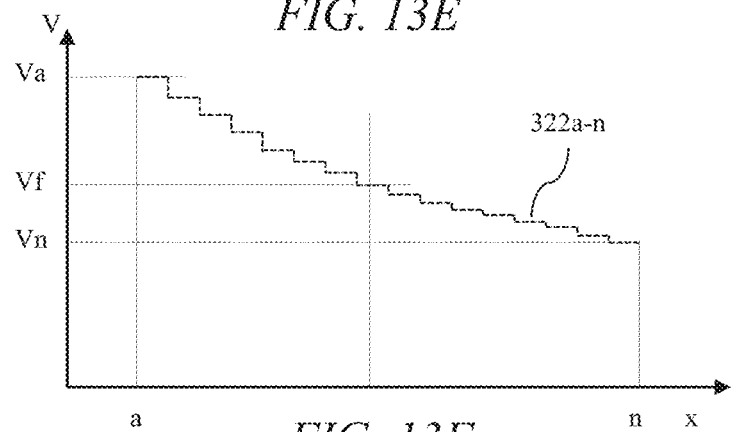
FIG. 13F is a schematic graphical illustration of a stepped response function with a series of voltage steps.

FIG. 13E is a schematic diagram illustrating in front perspective a further exemplary assembly of switchable liquid crystal retarder 301 comprising opposing transparent electrodes 320A and 320B; and FIG. 13F is a schematic graph illustrating an approximation to desired voltage profile 322 curve 322a produced by stepwise approximation using wires 321a-n. Features of the arrangement of FIGS. 13E-F not discussed in further detail may be assumed to correspond to the features with equivalent reference numerals as discussed above, including any potential variations in the features.

The first electrode arrangement 320A comprises plural electrodes 323a-n provided along the predetermined axis, the plural electrodes 323a-n being arranged to supply different voltages that change monotonically along the predetermined axis, for example as illustrated by profile 323a-n of FIG. 13F.

In this alternative embodiment, the transparent electrode 320A is segmented into a number n of y-axis fingers, each of which is connected by respective wire 321a-n to drive circuit 326, which may be an integrated circuit addressed from a control system (not shown). Drive circuit 326 is arranged to apply a different voltage to each of the respective wires 321a-n so that in principle any desired voltage variation with lateral (x-axis) direction may be approximated, including non-monotonic profiles. Advantageously complexity of the electrode resistance per square variation of 320A is reduced.

Referring to FIG. 13F, "n" may be any reasonable integer number, for example 256.

By controlling the voltages on wires 321a-n, areas of the switchable liquid crystal retarder 301 may achieve pupillation and other areas may achieve a different pupillation or no pupillation. This effect can be used to control the viewing of the parts of the display device 100 from different directions. Segmenting plural electrodes 323a-n also provides different parts of the display device 100 to operate to produce different pupillation. In this case the change in voltage within each section is monotonic, but the monotonicity may be broken across the boundary between respective parts.

It may be desirable to provide further control of profile 322.

Figure 13G:
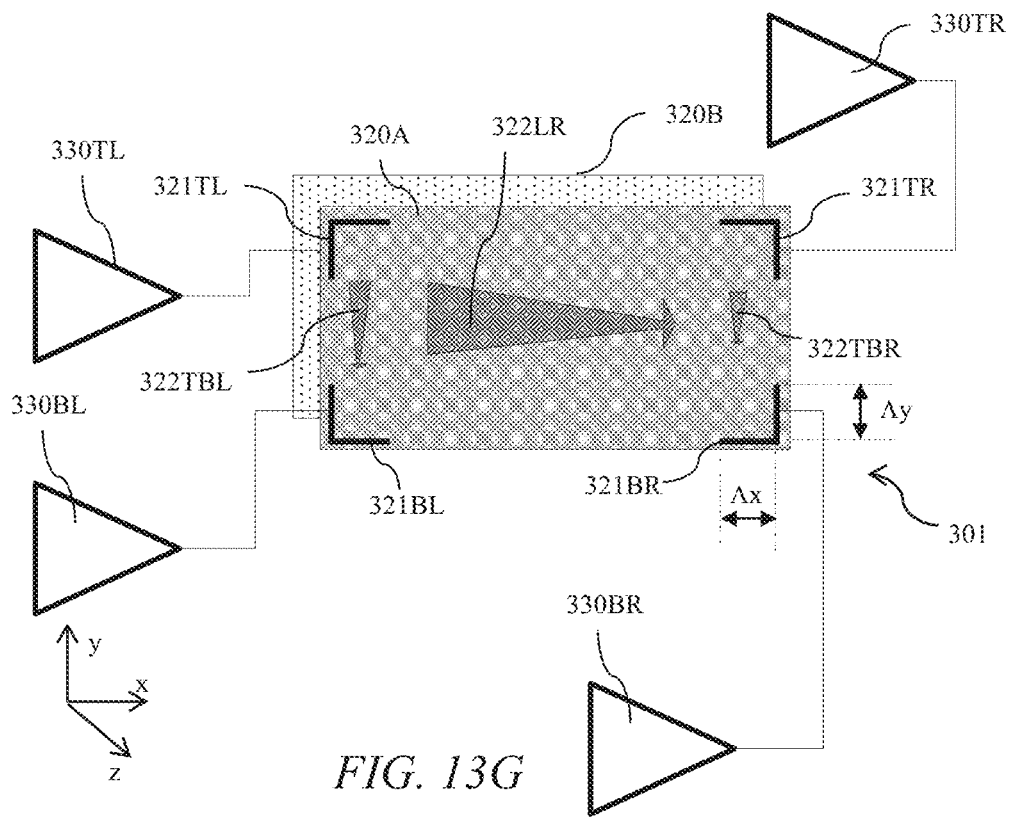
FIG. 13G is a schematic diagram illustrating in a perspective front view the opposing electrodes of a switchable liquid crystal retarder comprising corner bus bar contacts.

FIG. 13G is a schematic diagram illustrating in a perspective front view the opposing electrodes 320A, 320B of a switchable liquid crystal retarder 301 comprising corner bus bar contacts 321TL, 321BL, 321TR, 321BR. Features of the arrangement of FIG. 13G not discussed in further detail may be assumed to correspond to the features with equivalent reference numerals as discussed above, including any potential variations in the features.

In the alternative embodiment of FIG. 13G, the bus bar contacts 321TL, 321BL, 321TR, 321BR are provided with shapes and/or locations to provide improved control of profile 322. Separate drive circuits 330TL, 330BL, 330TR, 330BR respectively are provided to achieve variations such as shown by illustrative profiles 322TBL, 322TBR that are in addition to the lateral profile 322LR.

The sheet resistance of the resistive conductive coating (for example ITO) of the electrode 320A may provide a lower resistance at each of the corners than in the centre of electrode 320A, so that when viewed from the front, the corners and centre of electrode 320A may therefore experience a slightly different voltage.

In operation, the profiles 322TBL, 322TBR and 322LR may be arranged to provide modification of the luminance directed into a common pupil 325 from across the display area such as illustrated in FIG. 6A. Advantageously uniformity may be increased.

In alternative embodiments (not illustrated) a similar arrangement may be implemented on electrode 320B. When the display has a high rectangular aspect ratio, the length of the bus bars 321 may be longer in the x direction, i.e., Λx>Λy to retain a higher voltage along the edge near the corners of the long side of the rectangle. Advantageously visual uniformity may be improved.

It would be desirable to further increase the uniformity of the display device 100.

Figure 14A:
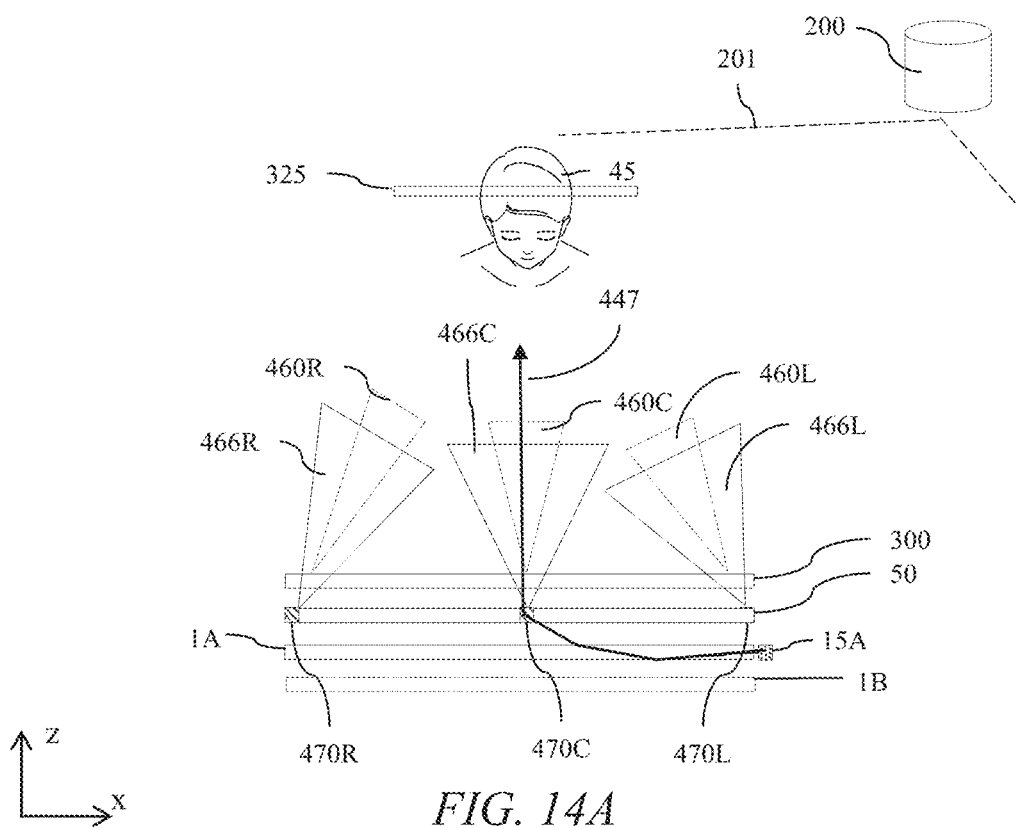
FIG. 14A is a schematic top view illustrating schematically the operation for a passenger of a privacy display comprising a backlight of FIG. 2A comprising a first waveguide comprising a first luminance profile.

FIG. 14A is a schematic top view illustrating schematically the operation for a passenger 45 of a privacy display device 100 comprising a backlight 20 of FIG. 2A comprising a first illuminated waveguide 1A, pupillated turning component 50 and polar control retarder 300. Features of the arrangement of FIG. 14A not discussed in further detail may be assumed to correspond to the features with equivalent reference numerals as discussed above, including any potential variations in the features.

During operation in privacy mode, light rays 447 from light source 15A are guided through waveguide 1A, and are directed onto light turning film component 50, being directed towards the passenger 45.

As will be described further hereinbelow with respect to FIGS. 26A-C, light turning film component 50 may be pupillated, that is arranged to provide light cones 466R, 466C, 466L that vary in nominal pointing direction across the display device 100. The transmission profiles 460R, 460C, 460L may be arranged in alignment with the profiles 466R, 466C, 466L from both the backlight 20 illumination and for the transmission profiles and pupil 325 may be provided. Advantageously uniformity of luminance provided to the passenger 45 may be increased.

Figure 14B:
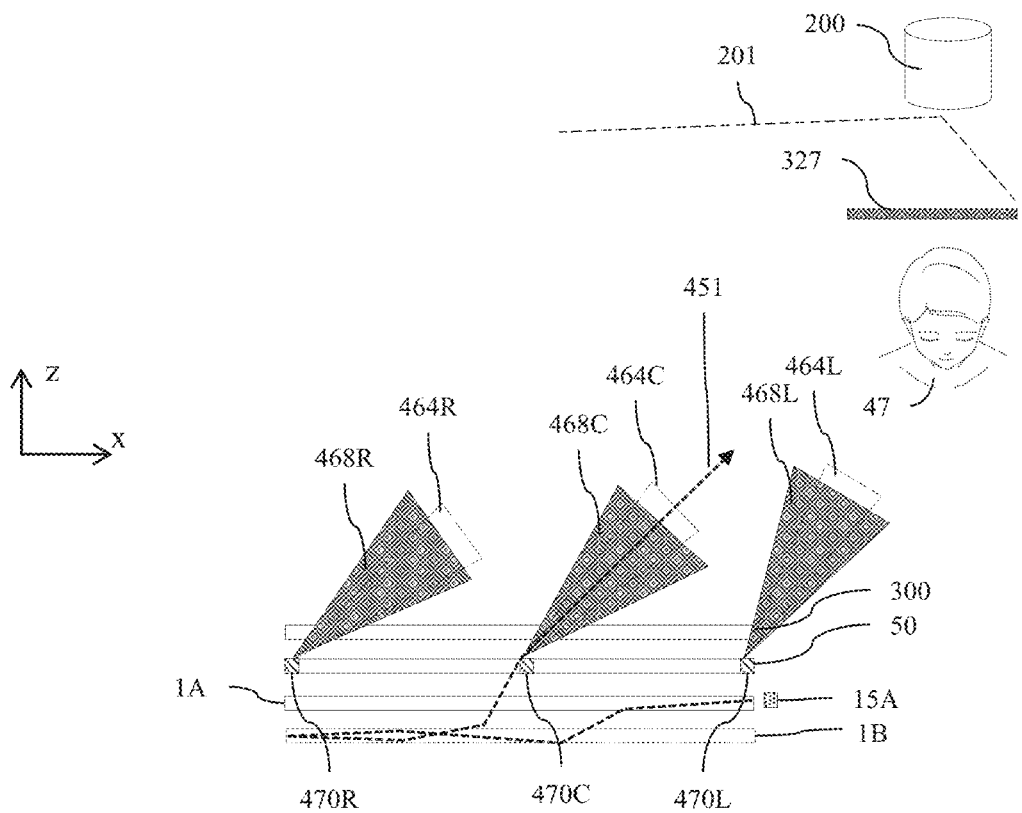
FIG. 14B is a schematic top view illustrating the operation for a driver of a privacy display comprising a backlight of FIG. 2A comprising a second waveguide comprising a second luminance profile.

FIG. 14B is a schematic top view illustrating schematically the operation for a driver 47 of a privacy display device 100 comprising a backlight 20 of FIG. 2A comprising a second waveguide 1B comprising a second luminance profile. Features of the arrangement of FIG. 14B not discussed in further detail may be assumed to correspond to the features with equivalent reference numerals as discussed above, including any potential variations in the features.

During operation in privacy mode, stray light rays 451 from light source 15A are guided through waveguide 1A, and are directed onto the waveguide 1B. Such light rays 451 are then output onto the light turning film and directed towards the driver 47 into light cones 468R, 468C, 468L that are pupillated towards driver 47 illumination window (optical pupil) 327 such that the uniformity of stray light is increased.

Light cones 464R, 464C, 464L similarly provide reduction of the luminance of the light cones 468R, 468C, 468L that is uniform across the display device 100. The reduction of luminance can be arranged to minimise the visibility of stray light 451, advantageously achieving increased uniformity of security factor.

An alternative arrangement for achieving improved uniformity using a curved display device 100 will now be described.

Figure 15A:
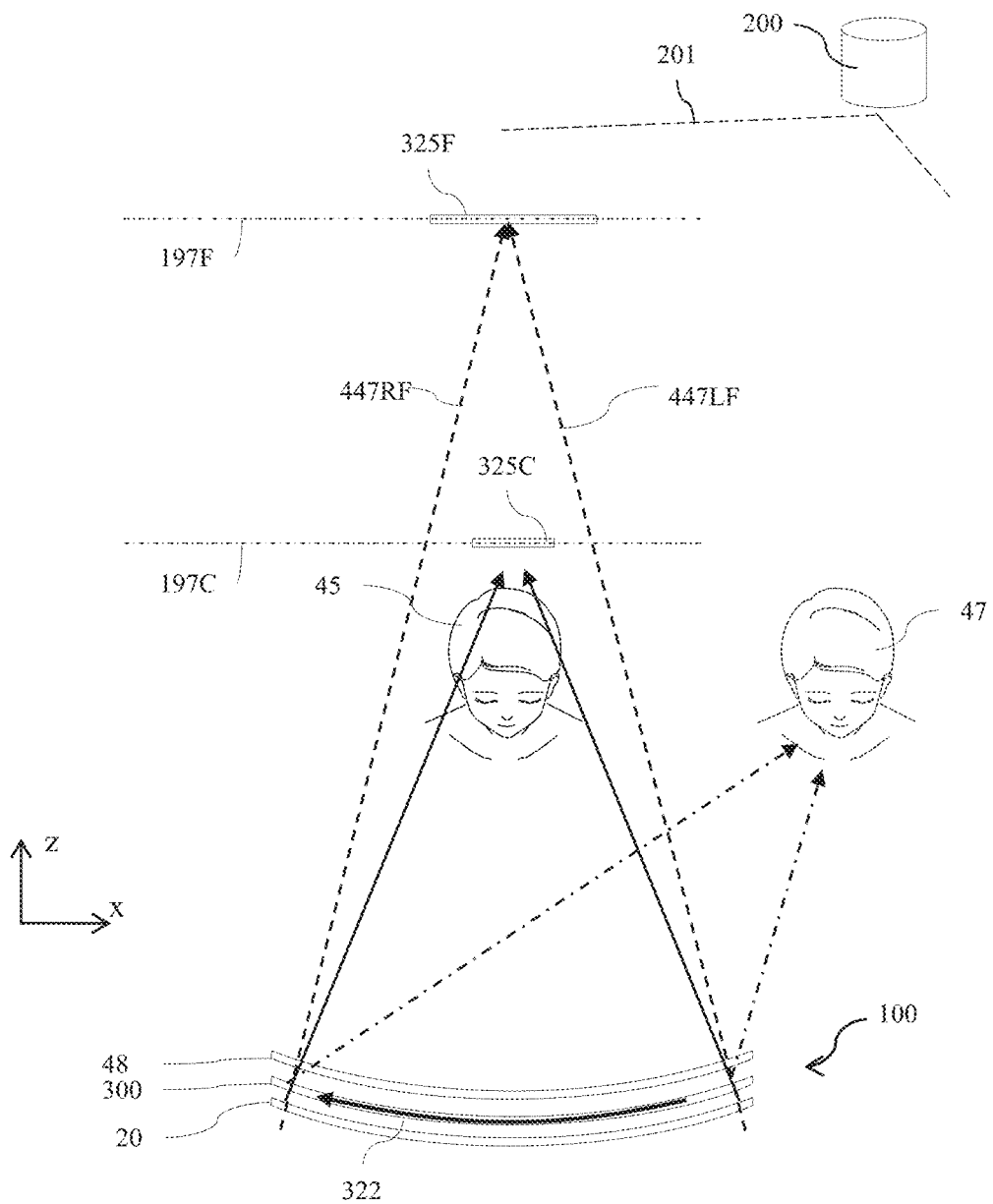
FIG. 15A is a schematic top view illustrating a curved privacy display comprising the polar control retarder with a voltage profile across the polar control retarder.

FIG. 15A is a perspective view of a user 45 in front of a curved display device 100 comprising a curved polar control retarder 300 comprising a liquid crystal retarder 301 as described elsewhere herein. Features of the arrangement of FIG. 15A not discussed in further detail may be assumed to correspond to the features with equivalent reference numerals as discussed above, including any potential variations in the features.

In the alternative of FIG. 15A, the display device 100 is curved about the y-axis and has a centre of curvature on the same side of the display device 100 as the user 45. At least one of the backlight 20 and polar control retarder 300 may be curved. In the illustrative example of FIG. 15A both the backlight 20 and polar control retarder 300 are curved.

By way of comparison with the arrangement of FIG. 15A, if the polar control retarder 300 and backlight were flat then the respective pupillation properties would be arranged to provide a viewing window 325F at a window plane distance 197F. In the present embodiment, the curvature of the display device 100 provides a window plane 325C at a shorter window plane distance 197C.

The voltage profile 322 across the polar control retarder 301 may be modified in correspondence to the curvature of the display.

The variation of voltage profile 322 across the polar control retarder 301 may be reduced to achieve a desirable window 325C. The optical transmission profiles of the polar control retarder 301 provided across the display device 100 may have a smaller variation than for the corresponding flat polar control retarder and advantageously increased uniformity may be achieved.

In alternative embodiments, the curvature may be non-uniform to provide a shaped display to match the profile of the surface of a vehicle, with the voltage profile 322 adjusted accordingly to provide common optical windows 325, 327 for points across the display device 100. Advantageously high image uniformity and security factor uniformity may be provided for displays with non-uniform surface profiles.

It would be desirable to provide multiple displays that are adjacent to each other. Arrangements of alignment directions for tiled displays will now be described.

Figure 15B:
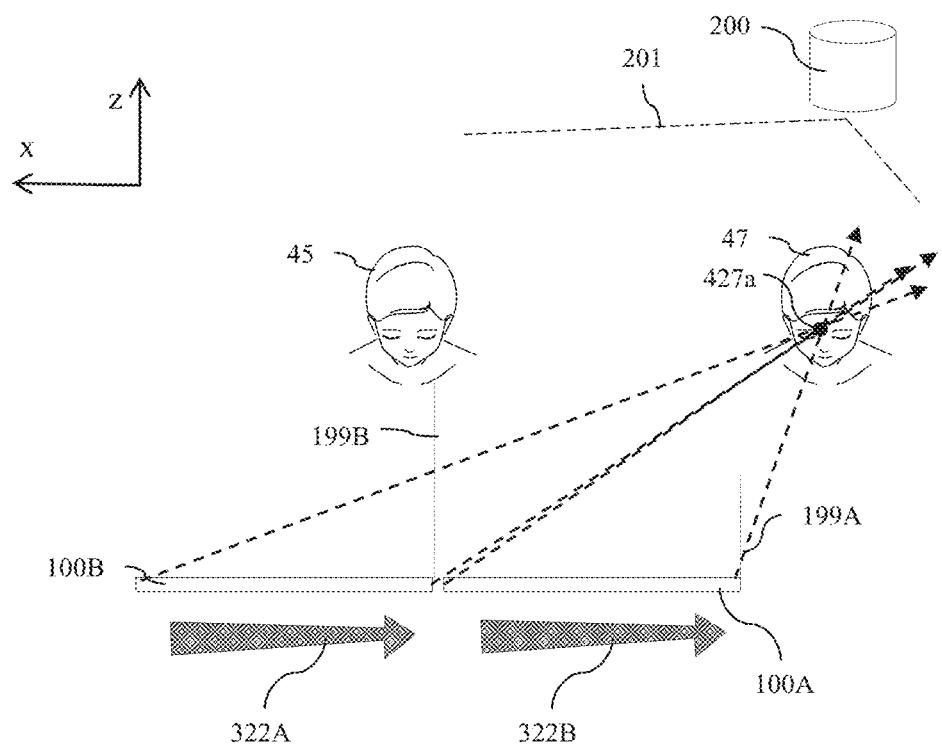
FIG. 15B is a schematic diagram illustrating a schematic top view of a pair of co-planar tiled display devices.
Figure 15C:
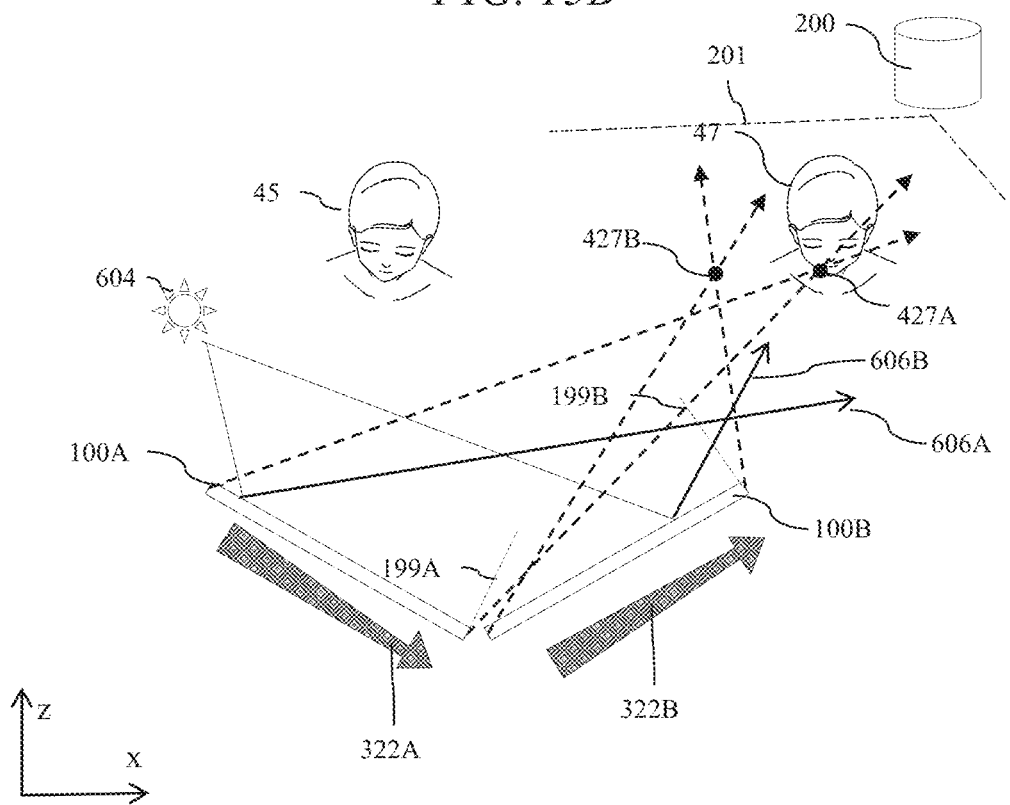
FIG. 15C is a schematic diagram illustrating a schematic top view of a pair of tilted planar tiled display devices.

FIG. 15B is a schematic diagram illustrating a schematic top view of a pair of co-planar tiled display devices 100A, 100B; and FIG. 15C is a schematic diagram illustrating a schematic top view of a pair of tilted planar tiled display devices 100A, 100B. Features of the arrangements of FIGS. 15B-C not discussed in further detail may be assumed to correspond to the features with equivalent reference numerals as discussed above, including any potential variations in the features.

In the alternative embodiments of FIGS. 15B-C, display devices 100A, 100B have respective voltage profiles 322A, 322B, wherein the profiles 322A, 322B are different to desirably achieve common points 427A, 427B at or near the driver 47 wherein the transmission of the polar control retarder 300 is minimised. Advantageously uniformity of security factor S to the driver and uniformity of image to the passenger 45 may be achieved.

Common points 427A, 427B may be aligned as in the illustrative embodiment of FIG. 15B. Advantageously the lowest luminance is achieved for a driver 47 at said common location 427A, 427B.

In alternative embodiments the common points 427A, 427B may be offset as illustrated in FIG. 15C. For the first display device 100A, the visibility of reflected light rays 606A from ambient light source 604 to the driver 47 may be lower than the visibility of reflected light rays 606B for the second display device 100B. For a given luminance reduction at the common points 427A, 427B, the security factor of display device 100B would be higher than for display device 100A. It would be desirable to provide a uniform security factor for various locations of the driver 47 while the reflectivity varies.

Driver 47 at point 427A sees a low luminance from display device 100A but lower frontal reflections from rays 606A. By comparison the driver sees higher front reflections from rays 606B from display device 100B but higher luminance due to the offset from point 427B. The offset of common points 427A, 427B advantageously achieves a wider viewing region of driver 47 for which the security factor is above a desirable threshold.

As is apparent from FIGS. 15B-C, a passenger 45 may no longer be arranged on-axis near to the centre of each display device 100A, 100B. Instead, the user may, approximately, be positioned on-axis with an edge of each display device 100A, 100B.

Further in an alternative embodiment the control system 500 may be provided to control the location of the points 427A, 427B in response to ambient illumination 604 measured by ambient light sensor 204 and driver 47 location measured by observer position location viewer tracking system 200 to achieve optimised security factor for a measured driver 47 location and illumination conditions.

In other embodiments the number of parts 101 may be increased to advantageously achieve improved visual performance for privacy and share mode operation.

In alternative embodiments, at least one of the display devices 100 may be curved as illustrated in FIG. 15A.

Figure 15D:
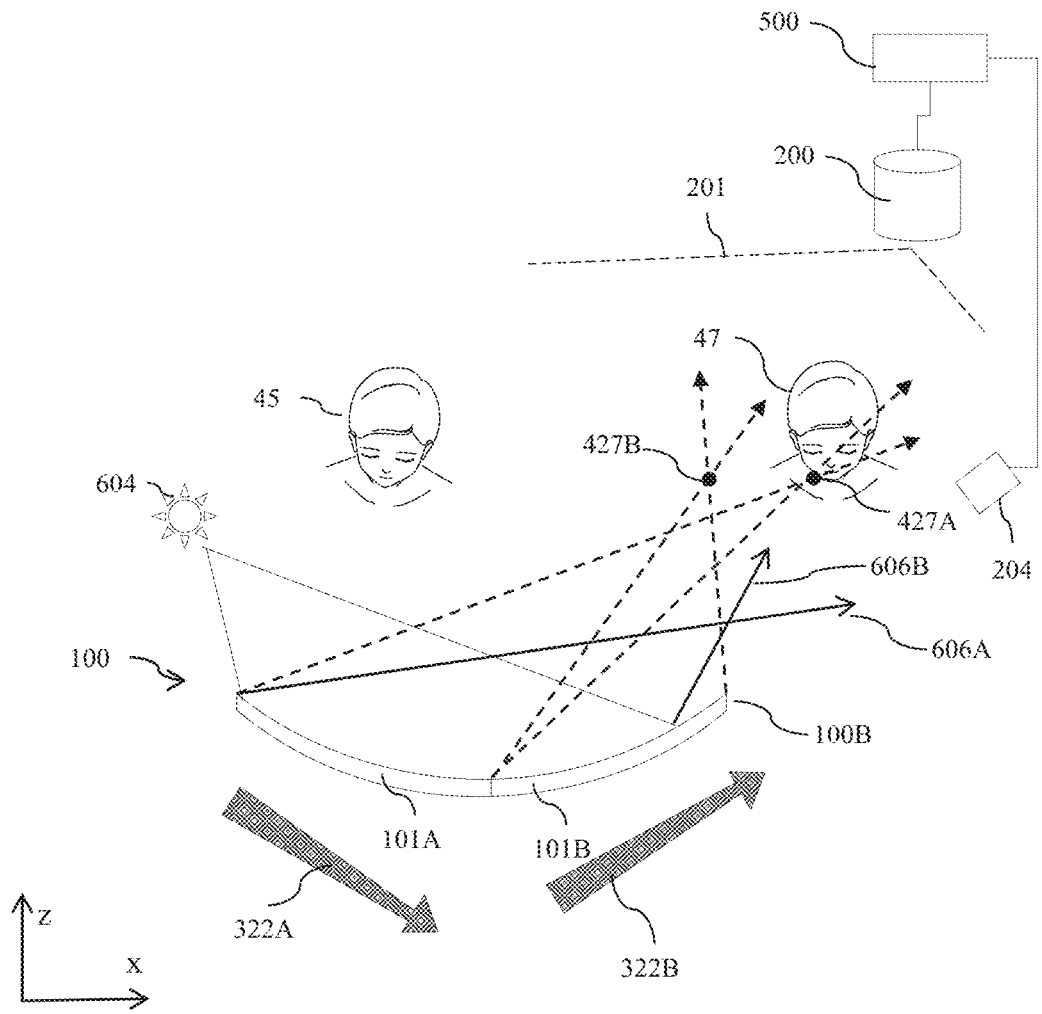
FIG. 15D is a schematic diagram illustrating a schematic top view of a segmented curved display device comprising offset common points.

FIG. 15D is a schematic diagram illustrating a schematic top view of a segmented curved display device comprising offset common points 427A, 427B. Features of the arrangement of FIG. 15D not discussed in further detail may be assumed to correspond to the features with equivalent reference numerals as discussed above, including any potential variations in the features.

In comparison to the arrangement of FIG. 15C, a single display device 100 may be provided, with part 101A and part 101B. Profiles 332A, 332B may be provided that are different on the parts 101A, 101B respectively to provide different common points 427A, 427B. In a similar manner to FIG. 15C, the security factor across the display may be provided with increased uniformity.

Figure 15E:
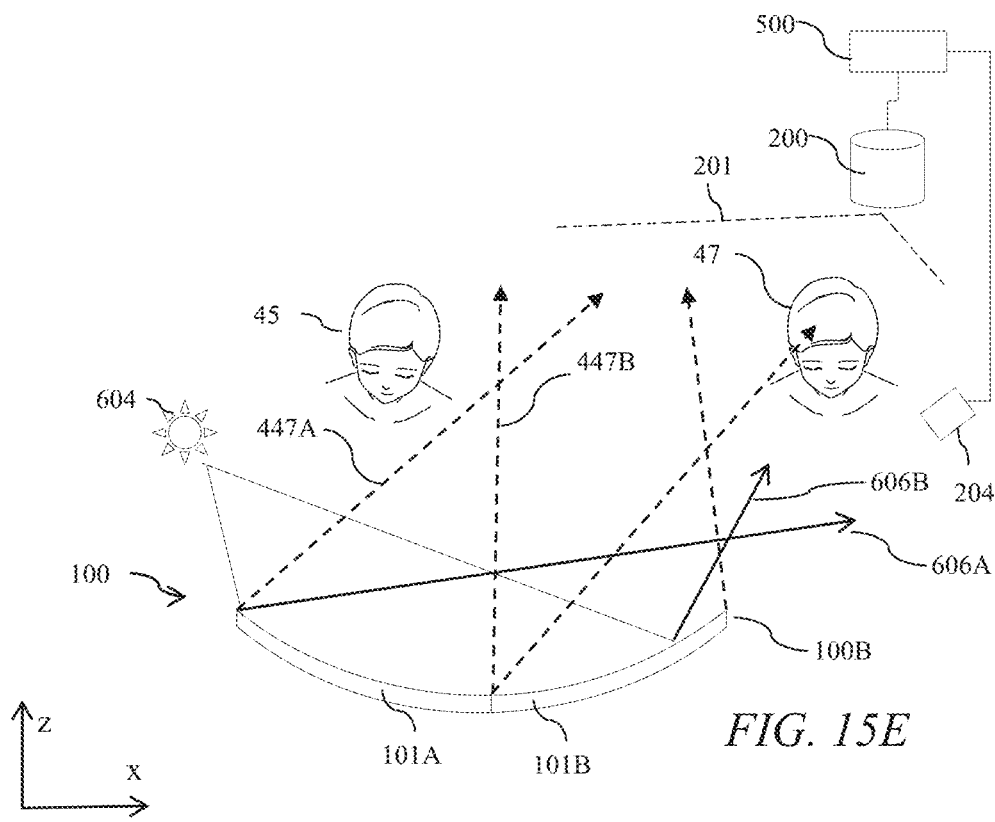
FIG. 15E is a schematic diagram illustrating a schematic top view of a segmented curved display device comprising different polar control retarder drive voltages.

FIG. 15E is a schematic diagram illustrating a schematic top view of a segmented curved display device 100 comprising different polar control retarder 300 drive voltages. Features of the arrangement of FIG. 15E not discussed in further detail may be assumed to correspond to the features with equivalent reference numerals as discussed above, including any potential variations in the features.

In comparison with the arrangement of FIG. 15D, the parts 101A, 101B are provided with different drive voltages, but no profile of voltage is provided across the respective parts 101A, 110B. The output light rays with minimum luminance 447A, 447B may be pupillated at least to an extent by the curvature of the display device 100 as described in FIG. 15A above.

The direction of light rays 447A, 447B from respective sides of the display parts 101A, 101B may be different. The display device 100A may have an electrode arrangement 320 that is advantageously less complicated than for FIG. 15D. The directions of light rays 447A, 447B may be modified by control of the voltages VA, VB across the liquid crystal layer 314 of the respective parts 101A, 101B that are different. The voltages VA, VB may be arranged to achieve improved security factor for moving driver 47, and may be in response to measured driver 47 location and/or in response to ambient illumination from ambient light source 604 in a similar manner to that described in FIG. 15D. Advantageously the security factor uniformity may be improved and cost may be reduced.

It may be desirable to provide displays with alternative arrangements of curvature.

Figure 15F:
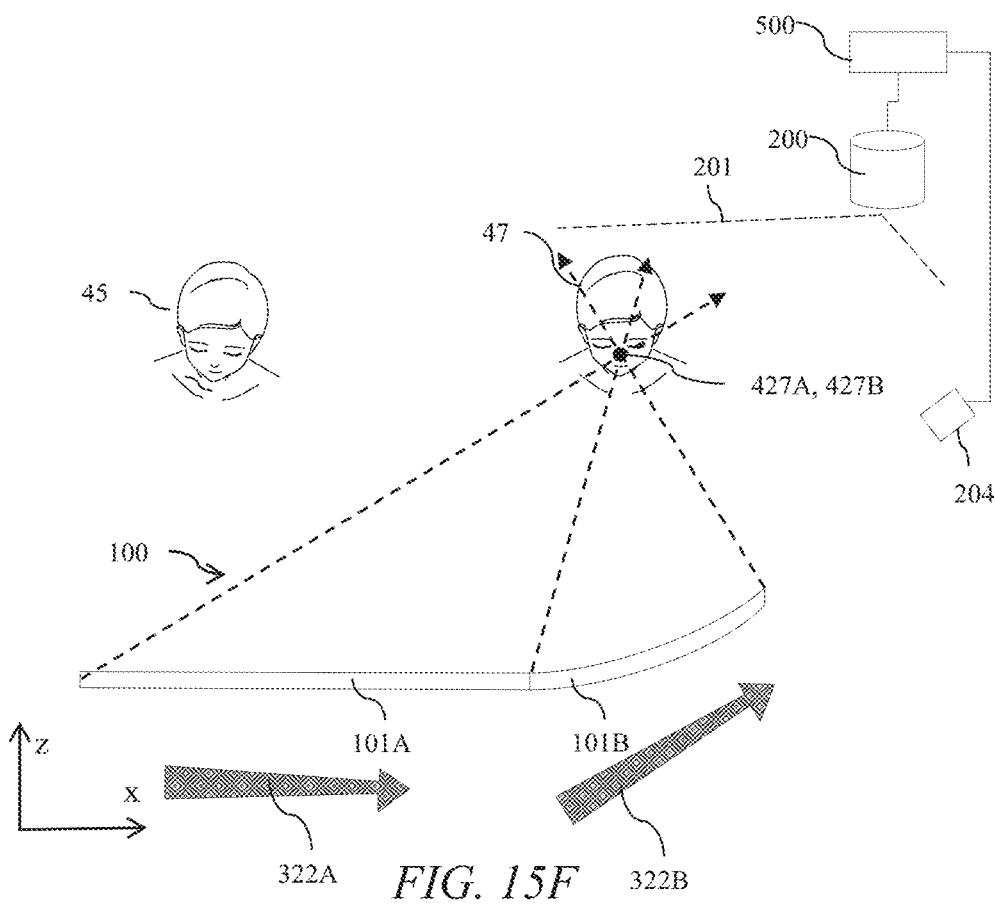
FIG. 15F is a schematic diagram illustrating a schematic top view of a segmented curved display device comprising a planar part and a curve part.

FIG. 15F is a schematic diagram illustrating a schematic top view of a segmented curved display device 100 comprising a planar part 101A and a curved part 101B. Features of the arrangement of FIG. 15F not discussed in further detail may be assumed to correspond to the features with equivalent reference numerals as discussed above, including any potential variations in the features.

In the alternative embodiment of FIG. 15F, the display device 100 may be arranged to provide an aesthetically desirable profile across the dashboard of a vehicle 600 for example.

The profiles 322A, 322B may be modified to provide the desirable common points 427A, 427B as described hereinabove. Planar part 101A may be arranged with a profile 322A that is different to the profile 322B to achieve points 427A, 427B that in the illustrative example of FIG. 15F are coincident. Advantageously a uniform display uniformity may be achieved for the passenger 47, and the driver 45 may see a display 100 with no driver distraction.

In alternative embodiments, not shown, the parts 101A, 101B may be provided by separate displays 100A, 100B. Advantageously yield of manufacture may be increased and replacement cost reduced.

In alternative embodiments, the part 101A may be arranged to provide images that are arranged to be seen by the driver, and the profile 322A may provide a uniform voltage profile across the liquid crystal retarder 301. Advantageously cost and complexity may be reduced.

The operation of the backlight 20 of FIG. 2A will now be further described.

Figure 26A:
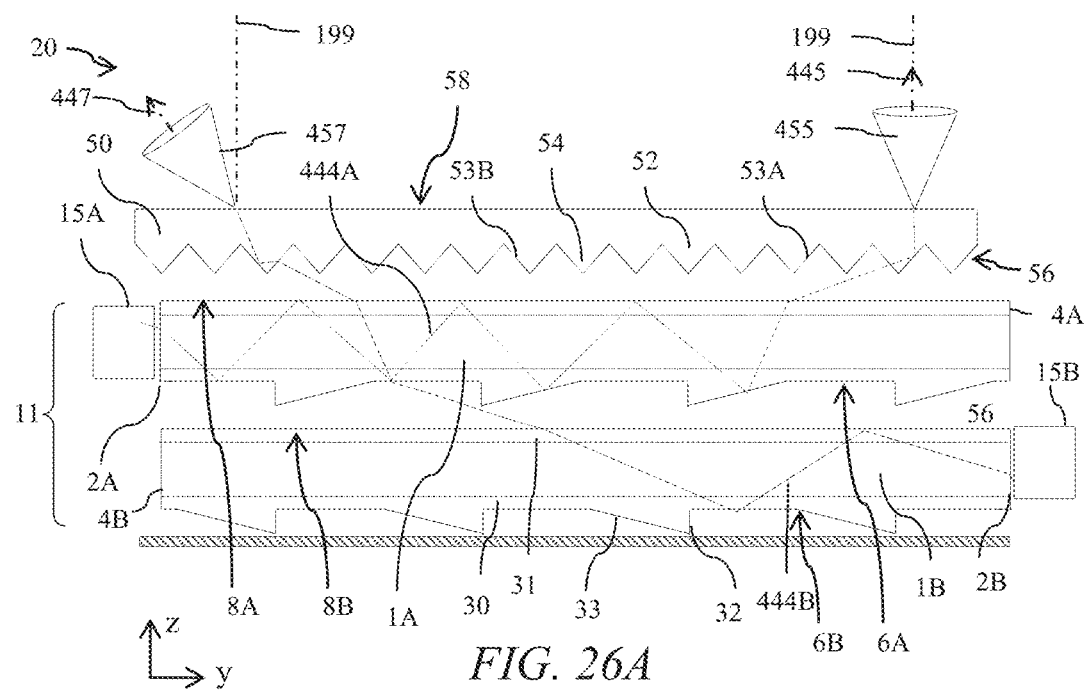
FIG. 26A is a schematic diagram illustrating a side view of a switchable backlight comprising first and second waveguides, a rear reflector and an optical turning film and outputting light beams for passenger and driver nominal directions.
Figure 26B:
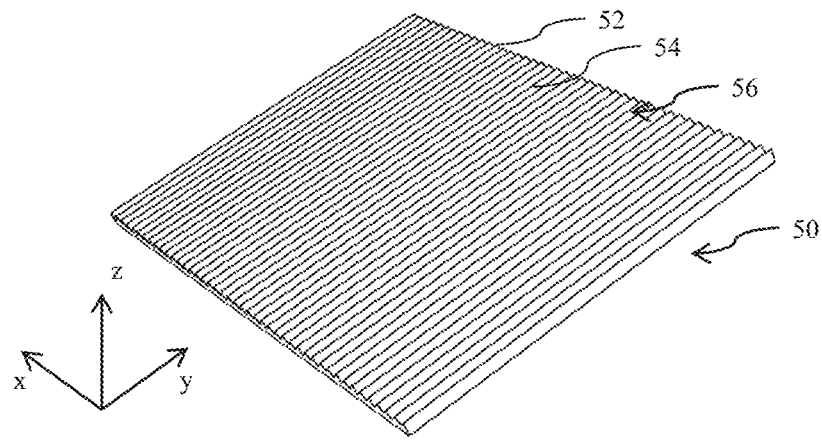
FIG. 26B is a schematic diagram illustrating a front perspective view of an optical turning film component for the backlight of FIG. 26A.
Figure 26C:
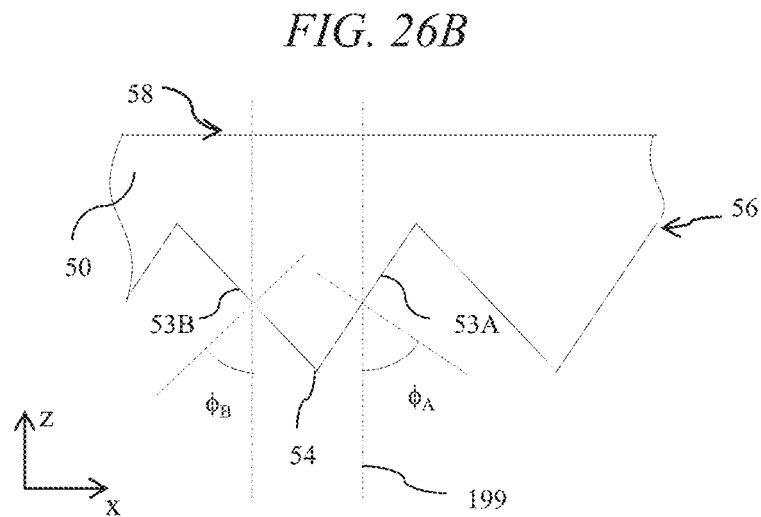
FIG. 26C is a schematic diagram illustrating a side view of an optical turning film component.

FIG. 16A is a schematic graph illustrating the simulated polar variation of luminance output for an illustrative backlight 20 of FIG. 2A and FIG. 26A primarily operating to direct light to the passenger 45, that is light source 15A is illuminated and light source 15B is not illuminated.

Advantageously most light is directed towards the passenger 45 in direction 445 and high suppression of luminance is achieved in the driver 47 in direction 447. High power efficiency for passenger 45 illumination is achieved. However, such an illumination profile is not sufficient to achieve desirable security factor, S as will be described further hereinbelow.

Figure 16B:
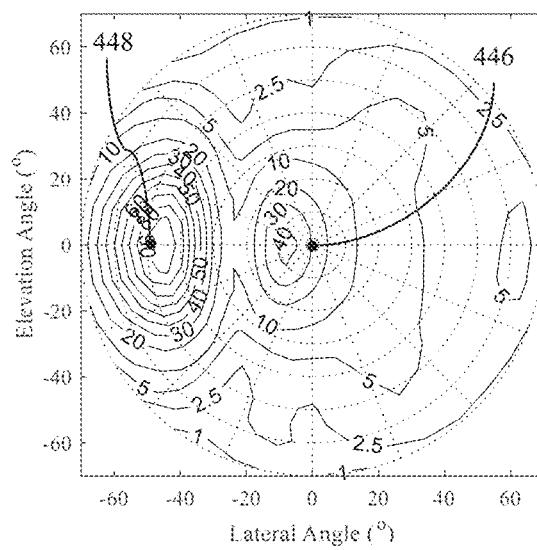
FIG. 16B is a schematic graph illustrating the polar variation of luminance output for an alternative backlight of FIG. 2 primarily operating to direct light to the driver.

FIG. 16B is a schematic graph illustrating the polar variation of luminance output for an illustrative alternative backlight 20 of FIG. 2A and FIG. 26A primarily operating to direct light to the driver 47, that is light source 15B is illuminated and light source 15A is not illuminated. Advantageously most light is directed towards the driver 47 in direction 447 and low luminance is achieved in the passenger 45 direction. High power efficiency for driver 47 illumination is achieved in a mode of operation in which the light source 15B is illuminated.

Figure 17A:
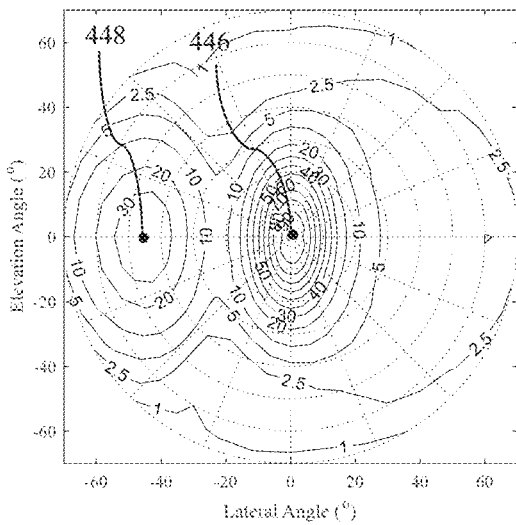
FIG. 17A is a schematic graph illustrating the polar variation of luminance output for an alternative backlight of FIG. 2 operating to direct light to the passenger and to the driver.
Figure 17B:
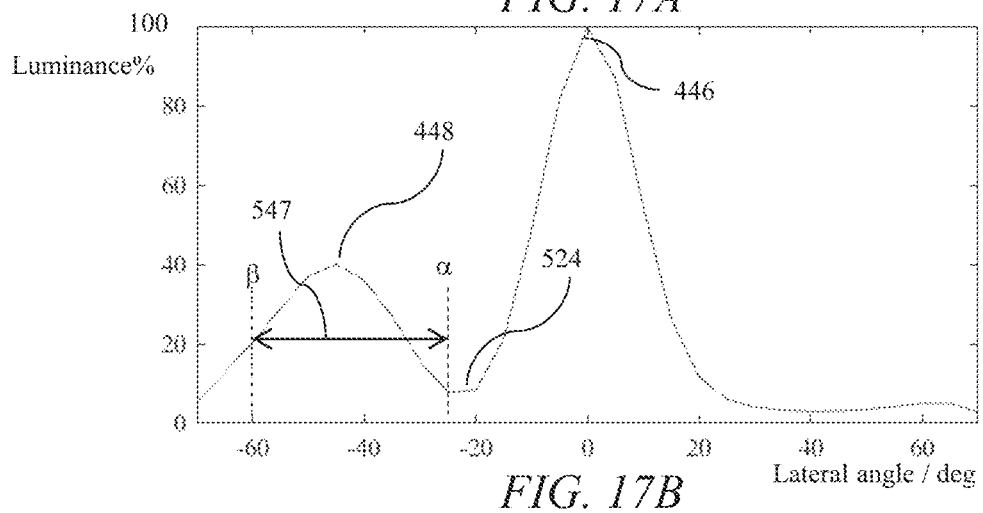
FIG. 17B is a schematic graph illustrating the variation of relative luminance output at zero elevation for the alternative backlight profile of FIG. 5C operating to direct light to the passenger and driver.

FIG. 17A is a schematic graph illustrating the polar variation of luminance output for an illustrative backlight 20 of FIG. 2A and FIG. 26A operating to direct light to the passenger 45 and to the driver 47, that is both light sources 15A, 15B are illuminated; and FIG. 17B is a schematic graph illustrating the variation of relative luminance output at zero elevation for the alternative backlight profile of FIG. 17A operating to direct light to the passenger 45 and driver 47 in a share mode of operation. Such a profile may be provided by a backlight 20 as will be described with reference to FIG. 26A hereinbelow for example.

The backlight 20 in a second mode of operation has a second luminance distribution having an output luminance profile having first and second maxima at polar locations 466, 468 in luminance at first and second different polar locations 445, 447 with a minimum 524 in luminance therebetween. The luminance of the minimum 524 is desirably at most 25% of the luminance of the first and second maxima.

Advantageously a display device 100 that may be observed by both driver 47 and passenger 45 may be provided.

Other arrangements of display will now be described.

Figure 18:
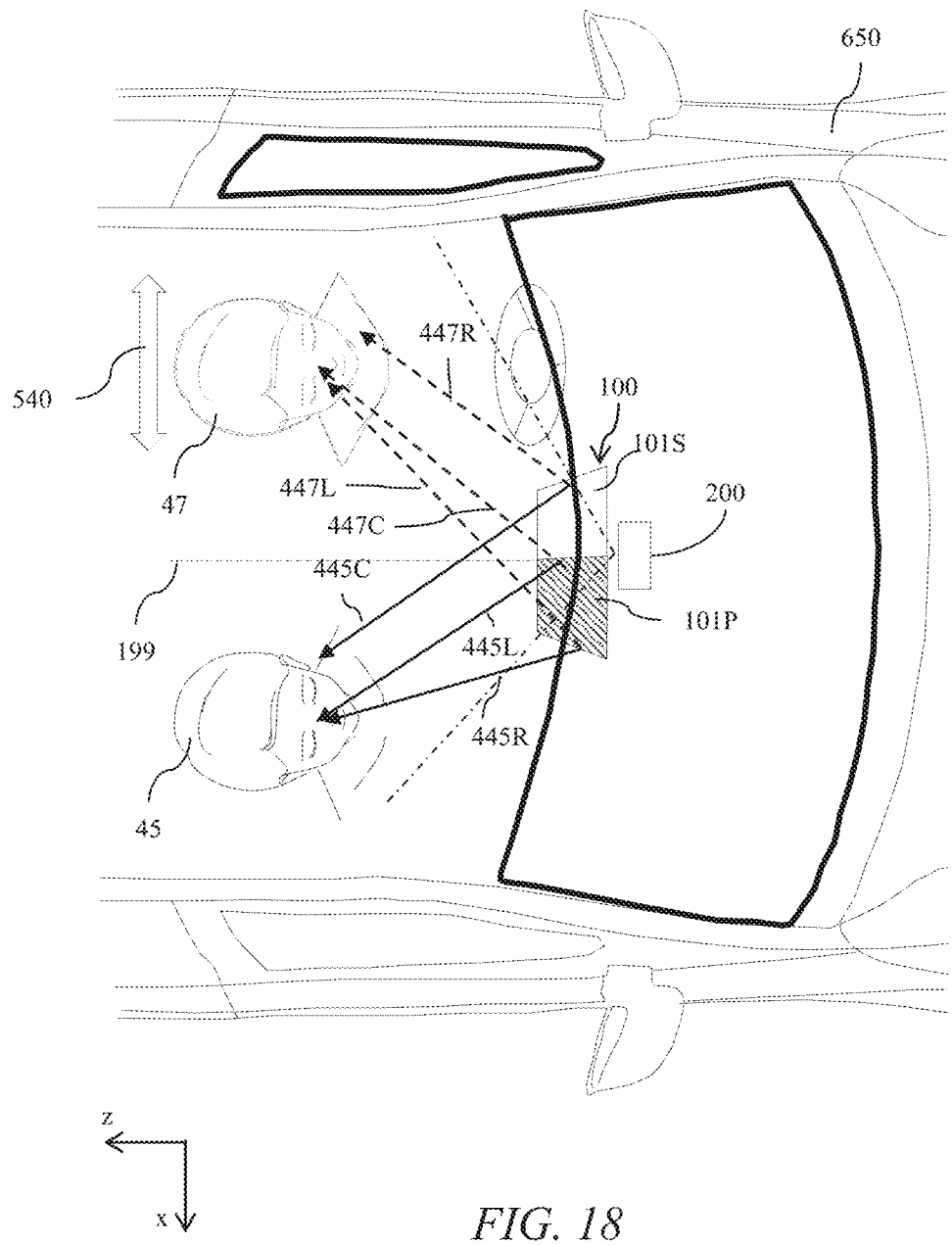
FIG. 18 is a schematic graph illustrating a centre stack display for an automotive vehicle.

FIG. 18 is a schematic top view of a centre stack display for an automotive vehicle 650. Features of the arrangement of FIG. 18 not discussed in further detail may be assumed to correspond to the features with equivalent reference numerals as discussed above, including any potential variations in the features.

In the alternative embodiment of FIG. 18, display device 100 comprises a right-hand part 101P that is a switchable privacy display arranged to provide privacy and share modes; and a left-hand part 101D that is a fixed share mode display. Other arrangements of mixed function display may be provided, for example to provide switchable privacy functions to each of driver 47 and passenger 45 on respective sides of the display.

In the alternative embodiment of FIG. 18, the left part 101D of the display is provided such that the magnitude of the electric field across the layer 314 of liquid crystal material is uniform across the area of the polar control retarder 300. Such a uniform region could for example be provided with $n_o$ transparent electrode, or with a segmented electrode that is separately driven for the part 101D and 101P. Both driver 47 and passenger 45 may see a high luminance image provided by high transmission from the polar control retarder 300 over a wide polar range, such as illustrated in FIG. 5C for example.

By comparison the region of the polar control retarder 300 arranged for the right-hand part 101P of the display may be provided with a voltage profile 322 such that a pupillated low transmission profile is directed to the driver to achieve high uniformity of security factor for the right-hand part 101P of the display device 100 while achieving high image uniformity for the passenger 45 in the manner described hereinabove.

Various alternative embodiments of display device 100 structures will now be described.

It may be desirable to use an SLM 48 with polariser 210, 218 electric vector transmission directions 211, 219 that are not at 45 degrees to the edge of the active area of the display device 100.

Figure 19A:
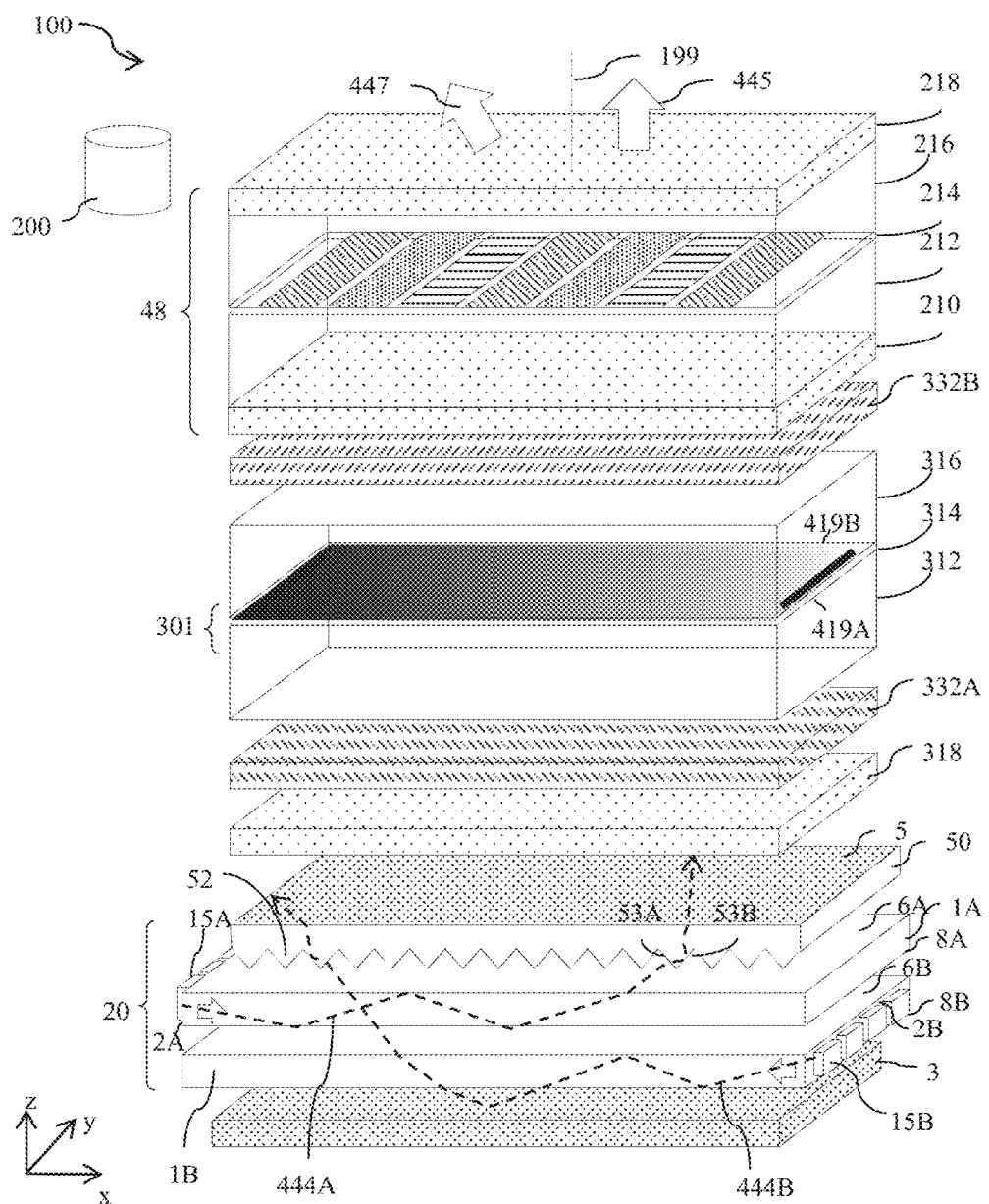
FIG. 19A is a schematic side perspective view of a display device providing uniformity for a display user wherein the polariser transmission directions of the display polarisers are different to those of FIG. 2A.
Figure 19B:
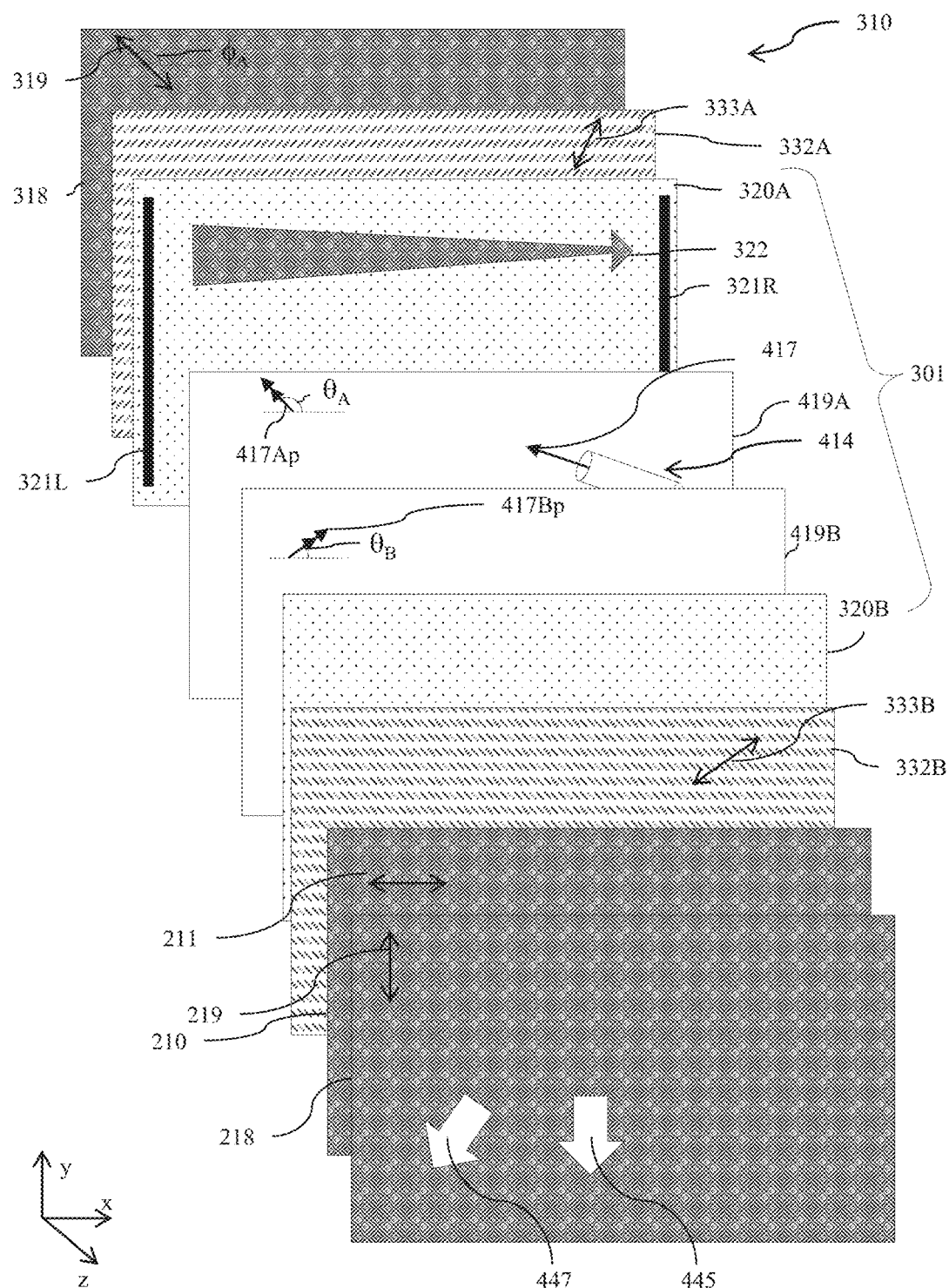
FIG. 19B is a front view of the stack of layers of the display device of FIG. 19A.

FIG. 19A is a schematic side perspective view of a display device 100 providing uniformity for a display user wherein the polariser transmission directions of the display polarisers are different to those of FIG. 2A; and FIG. 19B is a front view of the stack of layers of the display device 100 of FIG. 19A. Features of the arrangement of FIGS. 19A-B not discussed in further detail may be assumed to correspond to the features with equivalent reference numerals as discussed above, including any potential variations in the features.

The at least one polar control retarder 300 further comprises passive retarders 332A, 332B that are half wave plates that may be an A-plate with a retardance for light of a wavelength of 550 nm in a range of 250 nm to 300 nm.

Backlight 20 typically provides partially polarised light 420 incident onto the additional polariser 318. In the present embodiments, desirably the electric vector transmission direction 319 of the additional polariser 318 is aligned to the linear polarisation transmission direction of the backlight 20. It would be desirable to provide electric vector transmission direction 319 of additional polariser 318 to be at 0 degrees.

In the alternative embodiment of FIGS. 19A-B, half wave plate retarder 332A has an optical axis direction 333A that is inclined at 67.5 degrees to the easterly direction, so that the polarisation state of light incident onto the liquid crystal retarder 301 is 135 degrees. Advantageously transmission efficiency of light from the backlight 20 is improved.

In the embodiment of FIGS. 19A-B, an SLM 48 input polariser 210 with horizontal transmission direction 211 and vertical output polariser 218 transmission direction 219 is provided. Such polariser arrangements are typically provided for fringe field switching LCDs and vertically aligned nematic LCDs. Advantageously wide angle contrast of images may be improved compared to the TN LCD of FIG. 2A. Further the output polarisation state 219 may be aligned to the transmission of polarised sunglasses so that advantageously display brightness is improved in displays where the display user is wearing sunglasses.

In the embodiment of FIG. 19A, a further passive retarder 332B has an optical axis direction 333B that is inclined at 22.5 degrees so that for light rays directed to the point 427, the output polarisation state from the polar control retarder 300 is aligned to be absorbed by the input polariser 210 as described elsewhere herein.

In alternative embodiments one of the retarders 332A, 332B may be omitted and the additional polariser 318 and display polariser 210, 218 aligned accordingly with respect to the directions 417Ap, 417Bp of the polar control retarder 300. Advantageously performance may be improved and cost reduced.

In alternative embodiments, retarders 332A, 332B may comprise multi-layer retarders such as Pancharatnam retarders. Advantageously undesirable colouration of transmitted light may be reduced.

Alternatives to the arrangement of TABLE 1 will now be described.

FIGS. 20A-F are graphs illustrating the variation of transmission with polar direction for various arrangements of liquid crystal polar control retarder, display polarisers and additional polarisers.

More generally, the switchable liquid crystal retarder 301 may have a retardance for light of a wavelength of 550 nm in a range from 300 nm to 1500 nm, preferably in a range from 400 nm to 1200 nm. The twist may be in a range from 60° to 120°, and preferably in a range from 70° to 90°.

Figures 20A, 20B:
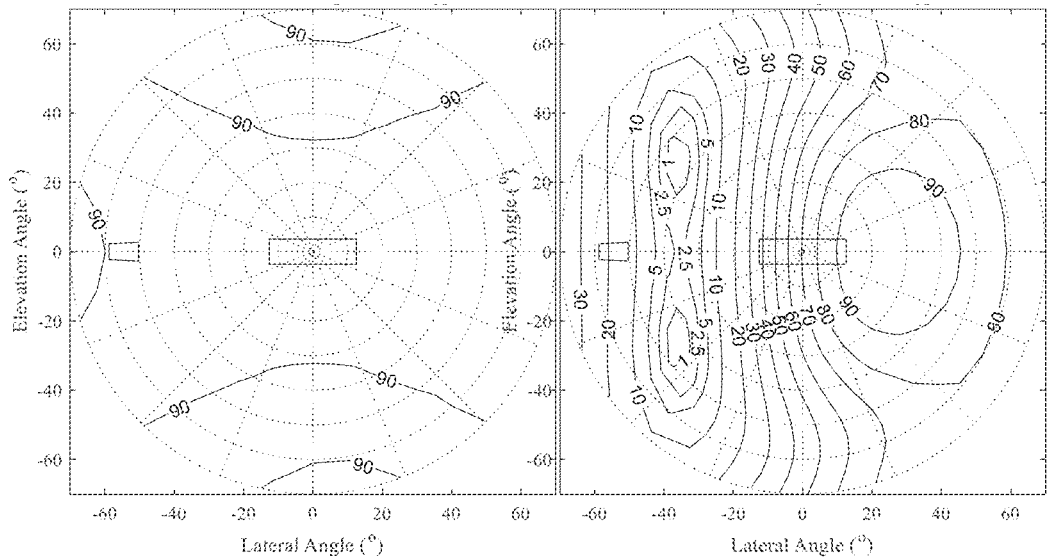
FIG. 20A, FIG. 20B, FIG. 20C, FIG. 20D, FIG. 20E, and FIG. 20F are graphs illustrating the variation of transmission with polar direction for various arrangements of liquid crystal polar control retarder, display polarisers and additional polarisers.

TABLE 3 and FIGS. 20A-B illustrate an embodiment with 80° twist. In comparison to the embodiment of FIG. 4B, the amount of light directed to the side passenger window may be reduced. In comparison to the embodiment of FIG. 5C, share mode performance may be enhanced, with reduced colouration.

TABLE 3

| | | | | Active LC retarder 301 | | | |
|---|---|---|---|---|---|---|---|
| Item | In-plane rotation angle | In-plane rotation angle | Twist | Alignment layers | Pretilt | Δn.d | $V_C$ (representative profile figure) |
| 318 | 319, $\phi_A$ | 130° | | | | | |
| 314 | 417Ap, $\theta_A$ | 130° | 80° | Homogeneous | 2° | 650 nm | 0 V (FIG. 20A) |
| | 417Bp, $\theta_B$ | 50° | | Homogeneous | 2° | | 1.6 V (FIG. 20B) |
| 210 | 211, $\phi_B$ | 50° | | | | | |

Figures 20C, 20D:
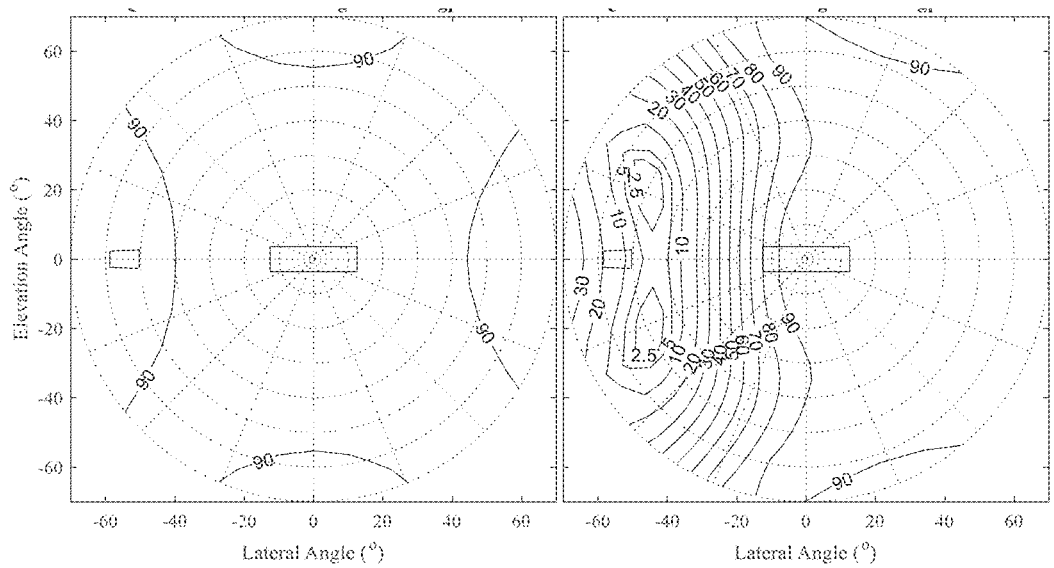

TABLE 3 and FIGS. 20C-D illustrate an embodiment with 70° twist. In comparison to the embodiment of TABLE 3, the size of the high transmission viewing zone for the passenger 45 is increased, and on-axis luminance is increased for passenger 45 near to the optical axis 199 of the display. Further if retarders 332A, 332B are provided as described with respect to FIGS. 19A-B then the angle of adjustment of polarisation to match desirable backlight 20 and SLM 48 alignment directions is advantageously reduced, reducing chromaticity and off-axis degradations from said retarders 332A, 332B.

TABLE 4

| | | | | Active LC retarder 301 | | | |
|---|---|---|---|---|---|---|---|
| Item | In-plane rotation angle | In-plane rotation angle | Twist | Alignment layers | Pretilt | Δn.d | $V_C$ (representative profile figure) |
| 318 | 319, $\phi_A$ | 125° | | | | | |
| 314 | 417Ap, $\theta_A$ | 125° | 70° | Homogeneous | 2° | 1000 nm | 0 V (FIG. 20C) |
| | 417Bp, $\theta_B$ | 55° | | Homogeneous | 2° | | 1.55 V (FIG. 20D) |
| 210 | 211, $\phi_B$ | 55° | | | | | |

Figure 20E:
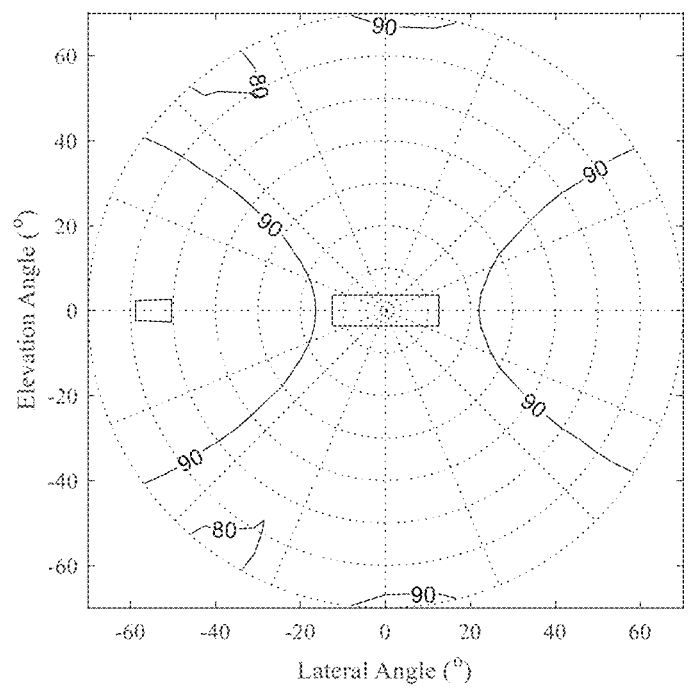
Figure 20F:
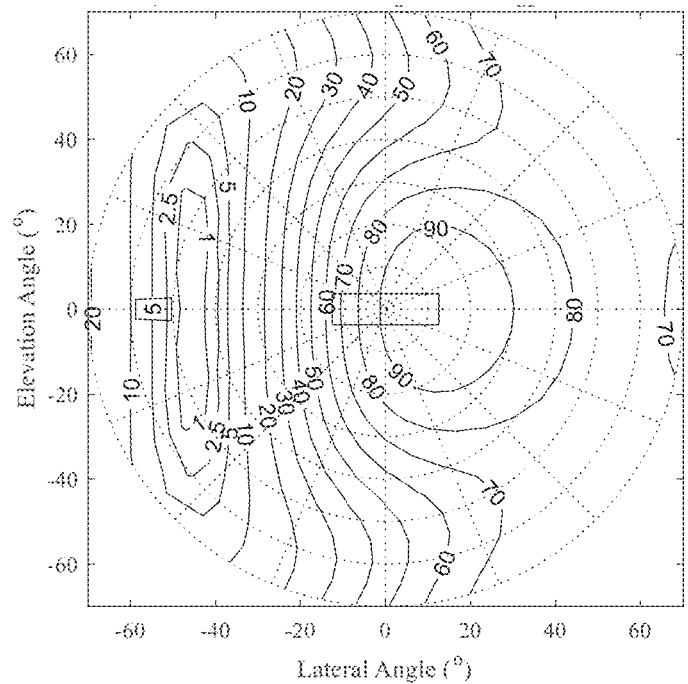

TABLE 5 and FIGS. 20E-F illustrate an embodiment with 80° twist and additional polariser 318 that is crossed to display polariser 210. In comparison to the embodiment of TABLE 3, the alignment of polarisers may be conveniently achieved without the cost and complexity of retarders 332A, 332B such as illustrated in FIGS. 19A-B.

TABLE 5

| | | | | | | Active LC retarder 301 |
|---|---|---|---|---|---|---|
| Item | In-plane rotation angle | In-plane rotation angle | Twist | Alignment layers | Pretilt | Δn.d | $V_C$ (representative profile figure) |
| 318 | 319, $\phi_A$ | 135° | | | | | |
| 314 | 417Ap, $\theta_A$ | 130° | 80° | Homogeneous | 2° | 650 nm | 0 V (FIG. 20E) |
| | 417Bp, $\theta_B$ | 50° | | Homogeneous | 2° | | 1.55 V (FIG. 20F) |
| 210 | 211, $\phi_B$ | 50° | | | | | |

It may be desirable to provide privacy operation for an emissive display.

Figure 21:
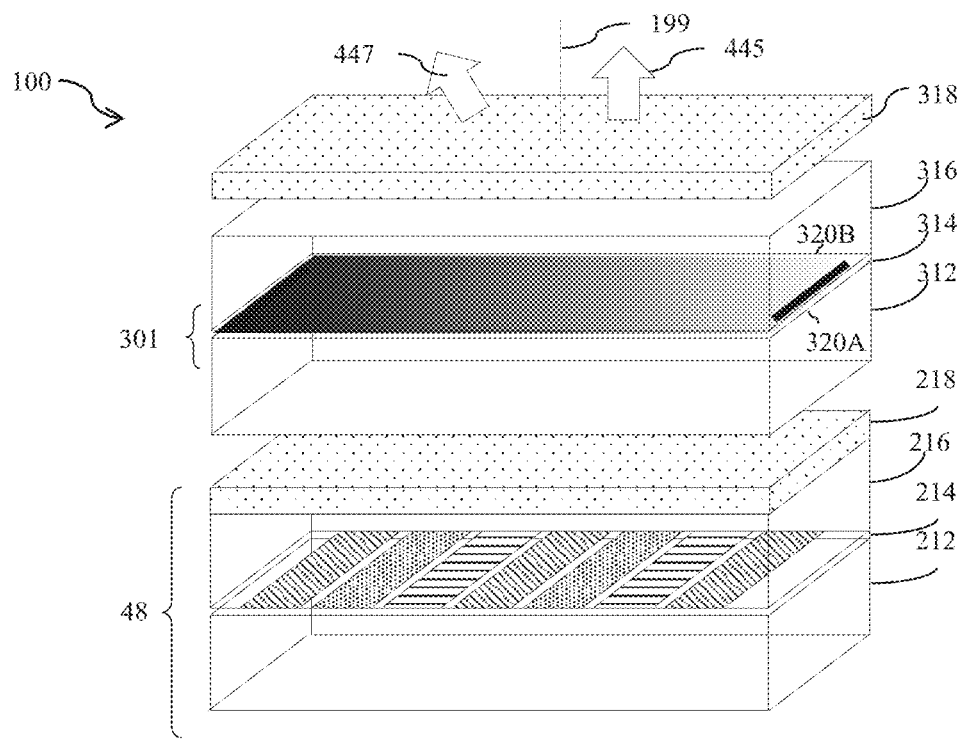
FIG. 21 is a schematic side perspective view of a display device comprising an emissive spatial light modulator and a polar control retarder and additional polariser arranged to receive light from the spatial light modulator.

FIG. 21 is a schematic side perspective view of a display device 100 comprising an emissive SLM 48 and a polar control retarder 300 and additional polariser arranged to receive light from the SLM 48. Features of the arrangement of FIG. 21 not discussed in further detail may be assumed to correspond to the features with equivalent reference numerals as discussed above, including any potential variations in the features.

In the alternative embodiment of FIG. 21, the SLM 48 comprises an emissive SLM 48 arranged to emit the spatially modulated light. Pixels 220, 222, 224 may be provided by emissive elements such as OLED, micro-LED or other known emitting elements. Advantageously thickness may be reduced in comparison to the embodiment of FIG. 1A. Said display polariser 210 is an output display polariser 218 arranged on the output side of the SLM 48.

Advantageously thickness is reduced in comparison to the embodiment of FIG. 2A. Emissive displays also typically advantageously exhibit high image contrast for the passenger 45 in comparison to conventional LCDs.

In the embodiment of FIG. 21, there is not a reflective polariser arranged between the output display polariser 218 and the at least one polar control retarder 300. In liquid crystal modes that are asymmetric in the predetermined direction (such as shown in FIG. 4B), reflectivity of light from a reflective polariser (as will be described hereinbelow with respect to FIG. 23C and FIG. 25A) is reduced because of high input transmission of light from an ambient light source (such as illustrated by source 604 in FIG. 2A) but low reflected luminance. Such reflective polarisers as will be described thus have reduced efficacy for asymmetric modes.

Figure 22:
FIG. 22 is a schematic side perspective view of an optical component comprising a polar control retarder comprising electrodes arranged to provide a variable profile of voltage in the lateral direction across at least one region of the polar control retarder.

FIG. 22 is a schematic side perspective view of an optical component comprising a polar control retarder 300 comprising electrodes arranged to provide a variable voltage V profile 322 in the lateral direction across at least one region of the polar control retarder 300. Features of the arrangement of FIG. 22 not discussed in further detail may be assumed to correspond to the features with equivalent reference numerals as discussed above, including any potential variations in the features.

It may be desirable to provide reduction of luminance to the driver over an increased polar range and to a lower light level.

Figure 23A:
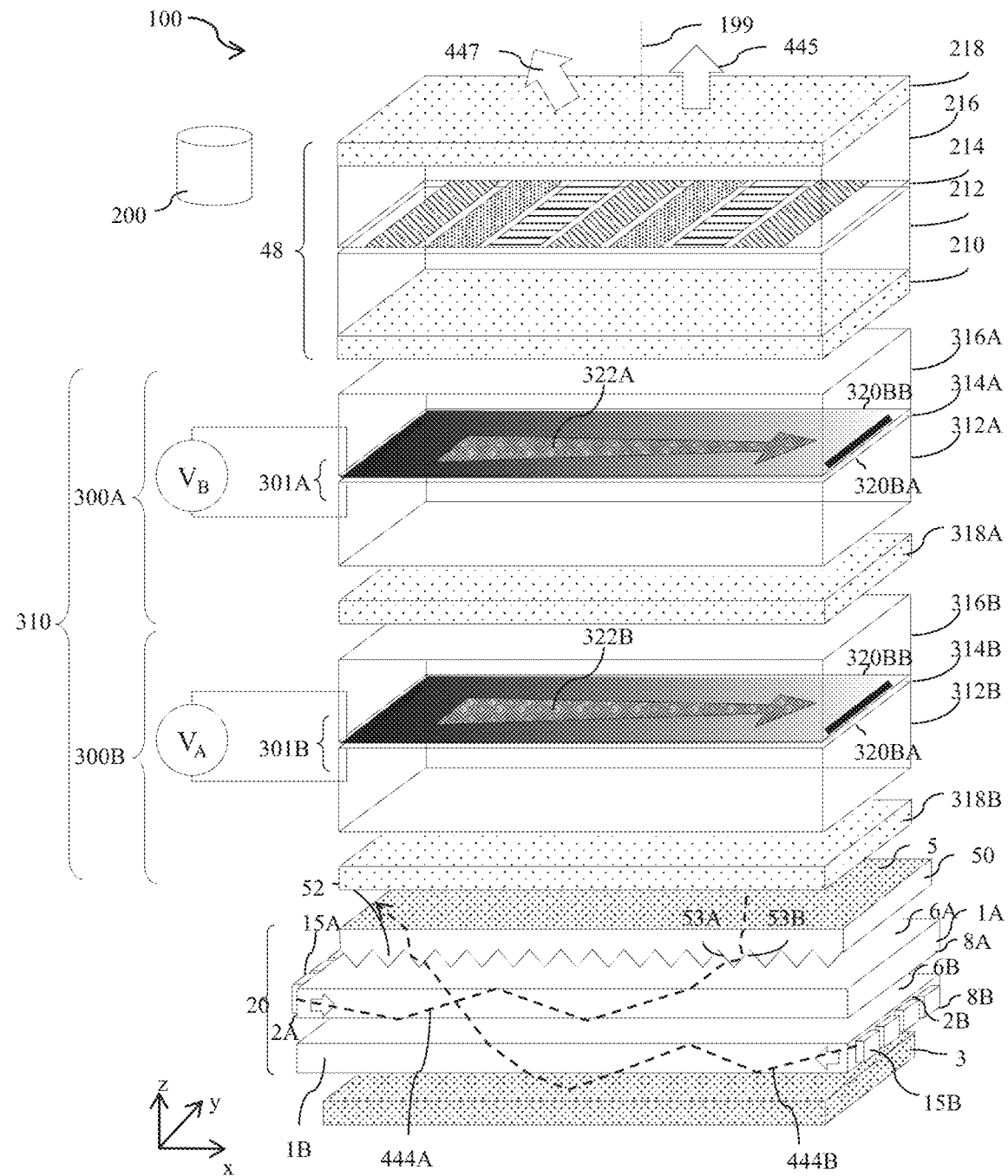
FIG. 23A is a schematic side perspective view of a display device providing uniformity for a display user comprising first and second polar control retarders and a further additional polariser.

FIG. 23A is a schematic side perspective view of a display device 100 providing uniformity for a display user 47 comprising first and second polar control retarders 300A, 300B with further additional polariser 318B arranged on the input side of the additional polariser 318. Features of the arrangement of FIG. 23A not discussed in further detail may be assumed to correspond to the features with equivalent reference numerals as discussed above, including any potential variations in the features.

In comparison to the embodiment of FIGS. 2A-C, in the alternative embodiment of FIG. 23A, the display device 100 further comprises: a further additional polariser 318B arranged on the same side of the SLM 48 as the additional polariser 318A outside the additional polariser 318A, the further additional polariser 318B being a linear polariser; and at least one further polar control retarder 300B arranged between the additional polariser 318A and the further additional polariser 318B.

The at least one further polar control retarder 300B comprises a switchable liquid crystal retarder 301B comprising a layer 314B of liquid crystal material 414B, and the display device 100 further comprises first and second electrode arrangements 320BA, 320BB disposed on opposite sides of the layer 314B of liquid crystal material 414, wherein first and second electrode arrangements 320BA, 320BB are arranged to provide an electric field 370 perpendicular to the layer 314B of liquid crystal material 414, wherein the magnitude of the electric field 370 changes monotonically along a predetermined axis across at least part of display device 100.

The retardance, twists, and or pre-tilts of the liquid crystal layer 314A, 314B may be different for the polar control retarder 300A, 300B respectively. The profiles 322A, 322B may be different and may provide common points 427 or different points 427 at which transmission uniformity is greatest as described hereinbefore. Additional passive retarders 332AA, 332AB, 332BA, 332BB (not illustrated) may be provided to achieve desirable polarisation rotations as described elsewhere herein, for example with reference to FIGS. 19A-B.

Advantageously different polar regions may have reduced transmission, increasing polar region of driver 47 location for high image security.

The embodiment of FIG. 23A has the SLM 48 arranged between the view angle control arrangement 310 and the output side of the display device 100. Advantageously reduced visibility of frontal reflections from additional layers may be achieved.

Figure 23B:
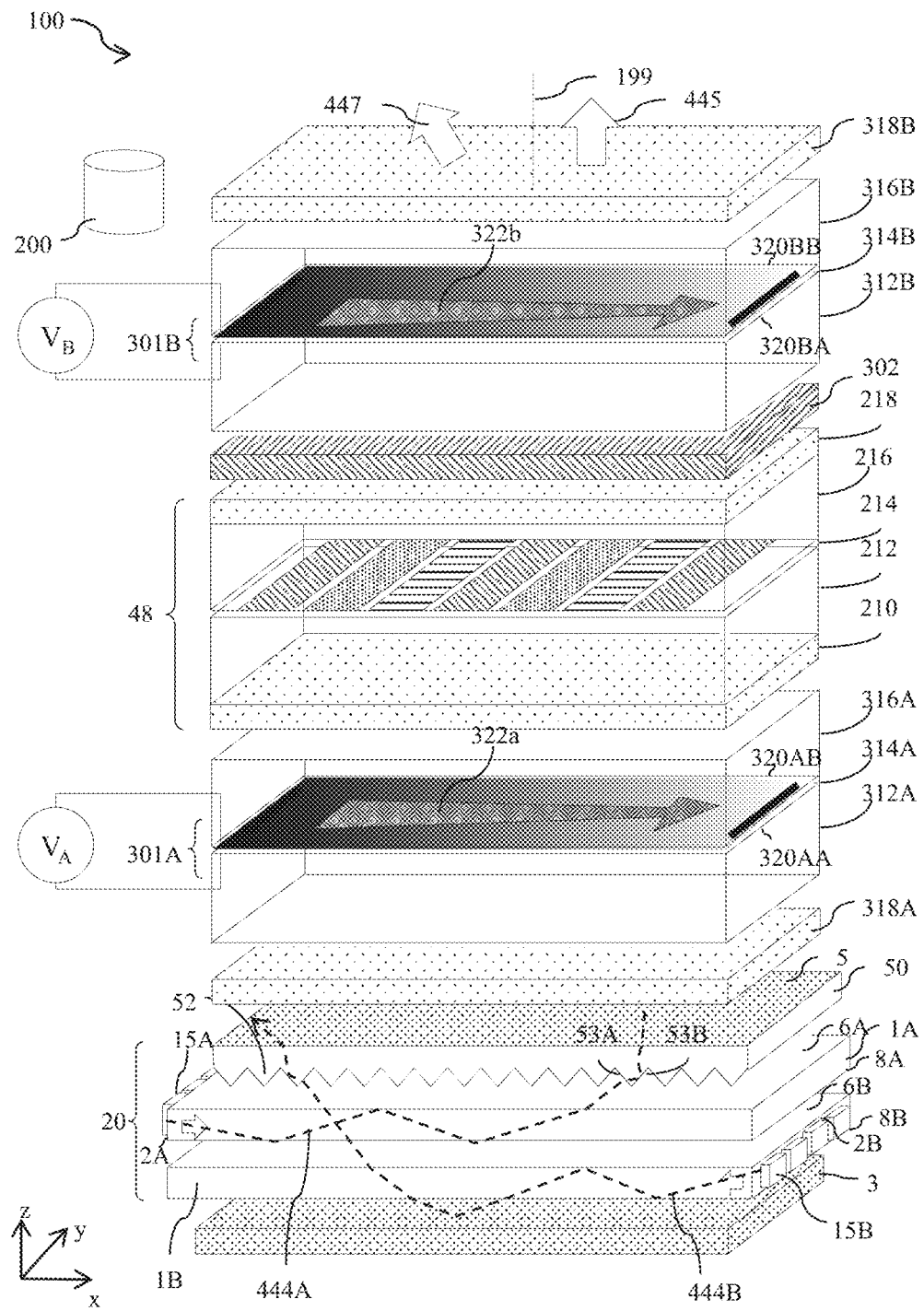
FIG. 23B is a schematic side perspective view of a display device comprising first and second polar control retarders with further additional polariser and second polar control retarder 300B arranged on the output side of the display output polariser.

FIG. 23B is a schematic side perspective view of a display device 100 providing uniformity for a display user comprising first and second polar control retarders 300A, 300B with further additional polariser 318B and second polar control retarder 300B arranged on the output side of the display output polariser 218. Features of the arrangement of FIG. 23B not discussed in further detail may be assumed to correspond to the features with equivalent reference numerals as discussed above, including any potential variations in the features.

In comparison to the embodiment of FIG. 23A, in the alternative embodiment of FIG. 23B, the display device 100 comprises: an output display polariser 218 arranged on the output side of the SLM 48; a further additional polariser 318B arranged on the output side of the SLM 48; and at least one further polar control retarder 300B arranged between the further additional polariser 318B and the output display polariser 218.

The at least one further polar control retarder 300B comprises a switchable liquid crystal retarder 301B comprising a layer 314B of liquid crystal material 414B, and the display device 100 further comprises first and second electrode arrangements 320BA, 320BB disposed on opposite sides of the layer 314B of liquid crystal material 414, wherein first and second electrode arrangements 320BA, 320BB are arranged to provide an electric field 370 perpendicular to the layer 314B of liquid crystal material 414, wherein the magnitude of the electric field 370 changes monotonically along a predetermined axis across at least part of display device 100.

The retardance, twists, and or pre-tilts of the liquid crystal layer 314A, 314B may be different for the polar control retarder 300A, 300B respectively. The profiles 322A, 322B may be different and may provide common points 427 or different points 427 at which transmission uniformity is greatest as described hereinbefore. Additional passive retarders 332AA, 332AB, 332BA, 332BB (not illustrated) may be provided to achieve desirable polarisation rotations as described elsewhere herein, for example with reference to FIGS. 19A-B.

Advantageously different polar regions may have reduced transmission, increasing polar region of driver 47 location for high image security.

The display device 100 may further comprise a reflective polariser 302 arranged between the output polariser 218 and the at least one polar control retarder 300, the reflective polariser being a linear polariser arranged to pass the same linearly polarised polarisation component as the output polariser 218. The polarisers 218, 318B may have electric vector transmission directions that are parallel and the polar control retarder 300B may be arranged to provide a more rotationally symmetric polar output than that provided by the polar control retarder 300A. In alternative embodiments, the profile 322B may be omitted and a uniform voltage applied to the further polar control retarder 300B. Advantageously the reflectivity of the display to off-axis light may be improved when the layer 314 is arranged for privacy mode operation. Security factor, S may advantageously be improved.

Figure 23C:
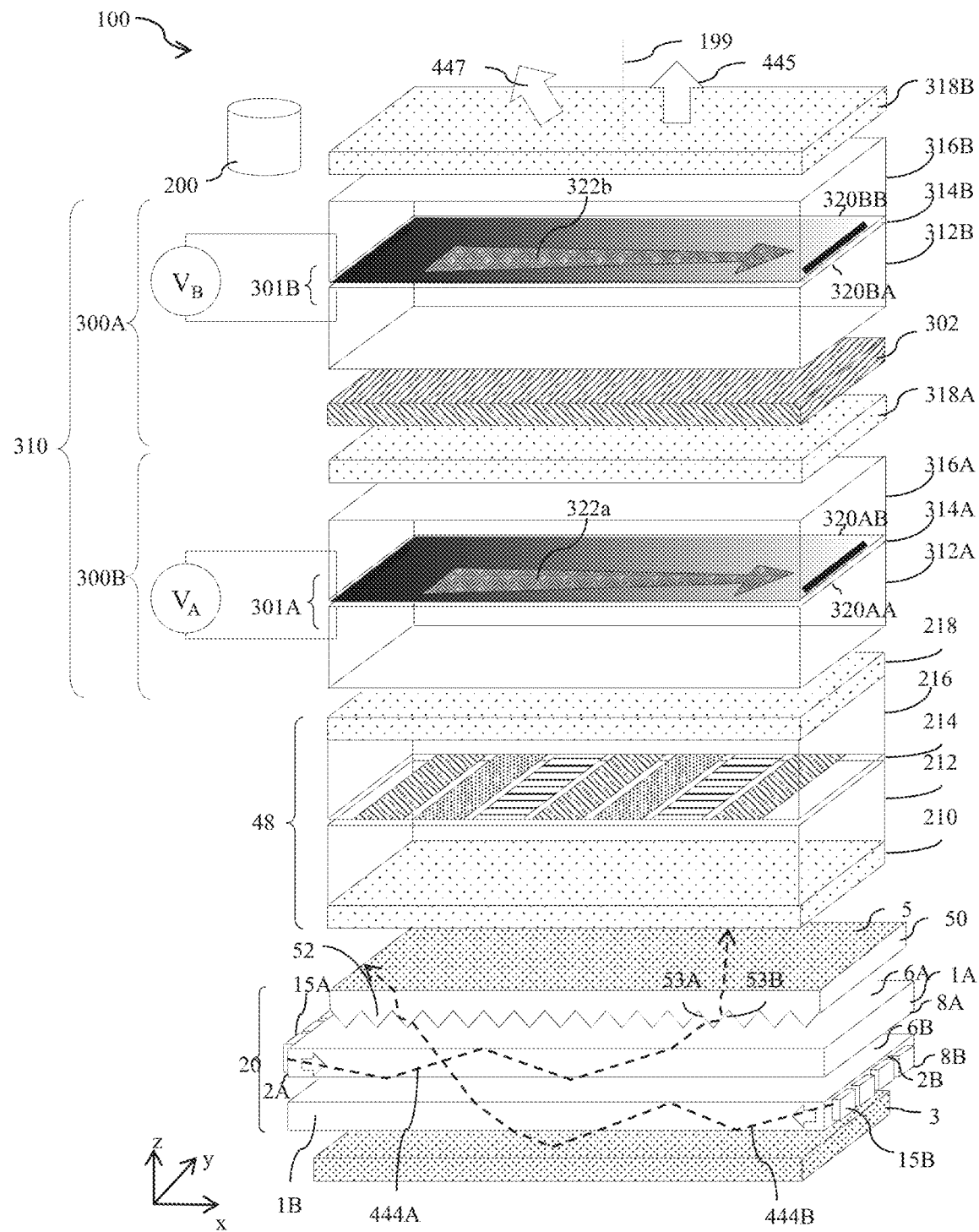
FIG. 23C is schematic side perspective view of a display device comprising first and second polar control retarders with additional polariser and first polar control retarder arranged on the output side of the display output polariser and additional polariser and second polar control retarder arranged on the output side of the additional polariser.

FIG. 23C is a schematic side perspective view of a display device 100 providing uniformity for a display user comprising first and second polar control retarders 300A, 300B arranged on the output side of the output display polariser 318. Features of the arrangement of FIG. 23C not discussed in further detail may be assumed to correspond to the features with equivalent reference numerals as discussed above, including any potential variations in the features.

In comparison to the embodiment of FIGS. 23A-B, in the alternative embodiment of FIG. 23A, such an arrangement may be provided for an emissive display. Further, the view angle control element 310 may be provided as a single component, reducing cost and complexity.

It may be desirable to further improve the security factor of a display.

Figure 24A:
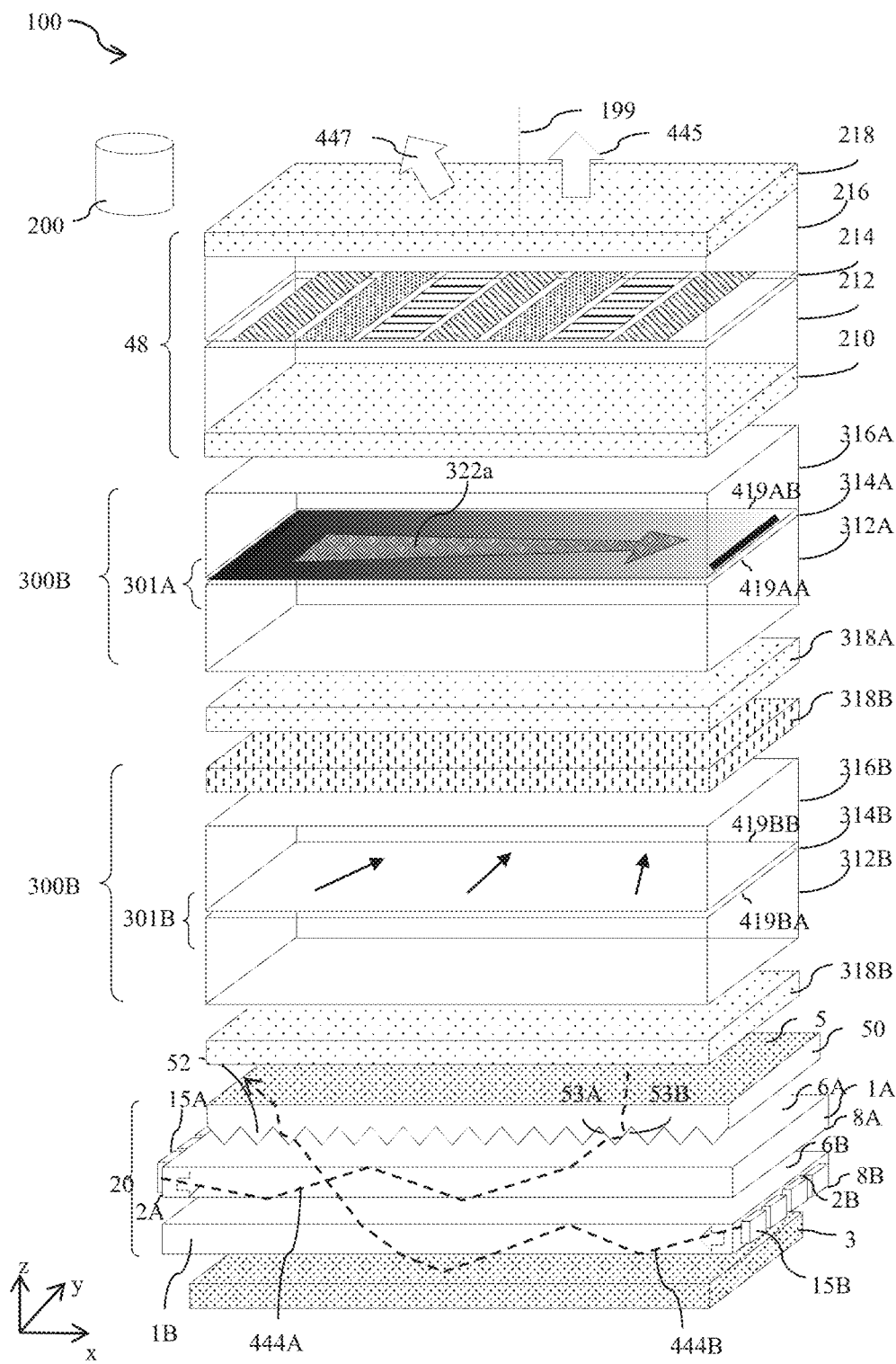
FIG. 24A is a schematic side perspective view of a display device providing uniformity for a display user comprising a first polar control retarder with a profile of voltage and a second polar control retarder with a profile of alignment layer orientations.

FIG. 24A is a schematic side perspective view of a display device 100 providing uniformity for a display user comprising a first polar control retarder 300 with a voltage V profile 322 and a second polar control retarder 300 with a profile of alignment layer orientations.

In the alternative embodiment of FIG. 24A, the polar control retarder 300A may comprise a twisted liquid crystal layer 314A as described elsewhere hereinbefore.

By way of comparison, the further polar control retarder 300B comprises passive polar control retarder 330, i.e. at least one passive compensation retarder, and a layer 314B of liquid crystal material 414B provided by a switchable liquid crystal retarder 301B. In general, the polar control retarder 300B may comprise any configuration of at least one retarder, some examples of which are present in the devices described below.

An illustrative arrangement of alignment layers 419BA, 419BB for the alternative embodiment of FIG. 24A will now be further described.

Figure 24B:
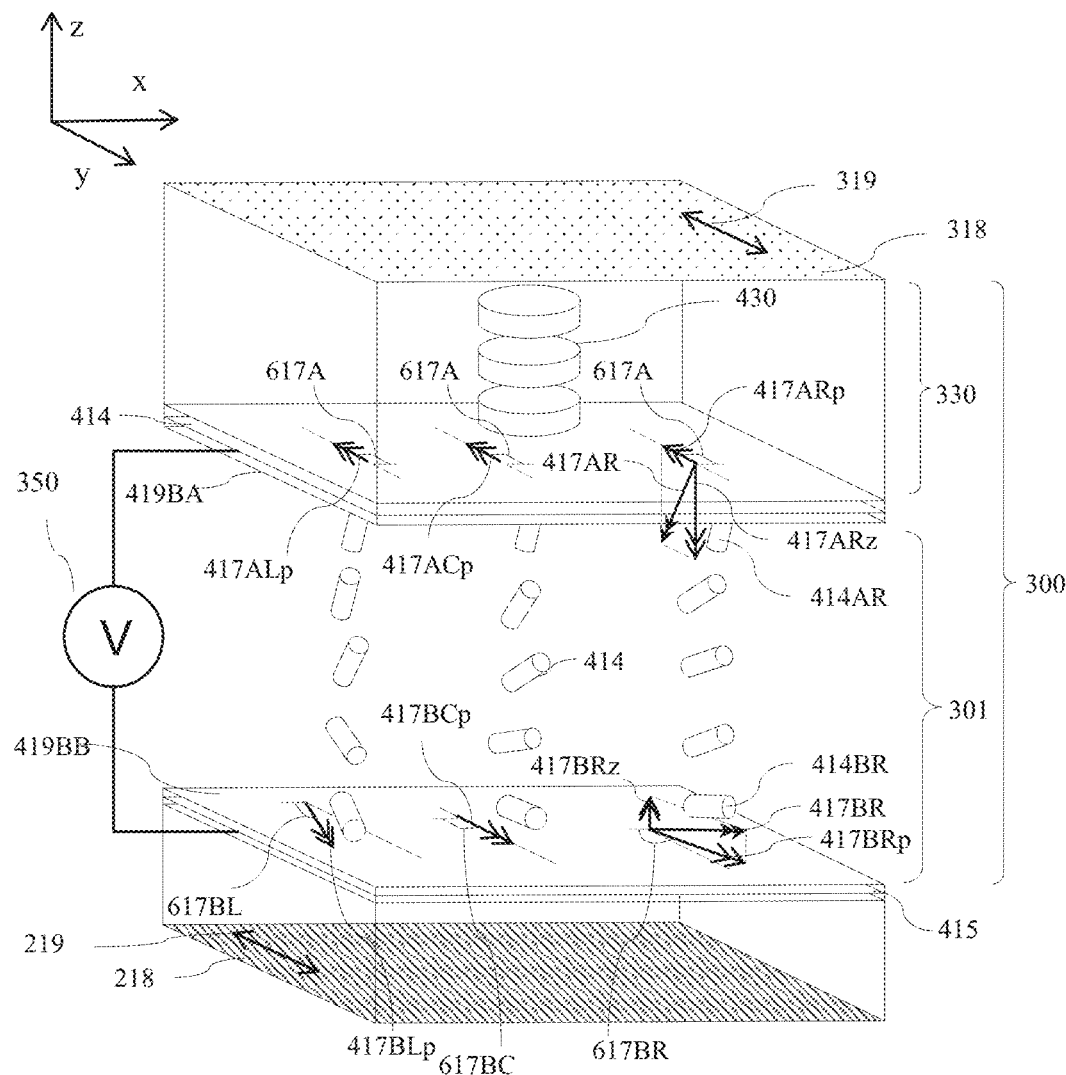
FIG. 24B is schematic side perspective view of polar control retarders that may be applied in FIG. 24A, comprising a homeotropically and homogeneously aligned switchable LC retarder and a negative C-plate retarder wherein the alignment direction of the homeotropic alignment layer is common across the lateral direction and wherein the alignment direction of the homogeneous alignment layer varies across the lateral direction.

FIG. 24B is perspective views of polar control retarder 300B that may be applied in FIG. 24A, comprising a homeotropically and homogeneously aligned switchable LC retarder 301 and a negative C-plate passive retarder 330 and wherein the alignment direction of the homeotropic alignment layer 419BA is common across the lateral direction and wherein the alignment direction of the homogeneous alignment layer 419BB varies across the lateral direction. Features of the arrangements of FIG. 24B not discussed in further detail may be assumed to correspond to the features with equivalent reference numerals as discussed above, including any potential variations in the features.

An exemplary embodiment is illustrated in TABLE 6.

TABLE 6

| | Passive polar control retarder 330 | | Active LC retarder 301 | | | |
|---|---|---|---|---|---|---|
| Mode | Type | Δn.d/ nm | Alignment layers | Pretilt/ deg | Δn.d/ nm | Voltage/ V |
| Public | Negative C | −900 | Homogeneous | 2 | 1000 | 10.0 |
| Privacy | | | Homeotropic | 88 | | 1.4 |

FIG. 24B is a front view of a first surface alignment layer 419BA of the display device 100 of FIG. 24A wherein the angle of in-plane component of the alignment varies along the predetermined direction, for example the x-axis. Features of the arrangement of FIG. 24B not discussed in further detail may be assumed to correspond to the features with equivalent reference numerals as discussed above, including any potential variations in the features.

The surface alignment layer 419BA may have material that provides different alignment orientations 417BLp, 417BCp, 417BRp across the surface alignment layer 419BB. The operation of the different alignment layer orientations is described further in U.S. Pat. No. 11,079,646 and in U.S. Pat. No. 11,099,448, both of which are herein incorporated by reference in their entireties.

The operation and function of the arrangement of FIG. 24B is different to that achieved by the arrangement of FIG. 3A, other than appropriate phase shifts are provided across the predetermined direction. Advantageously increased uniformity of illumination to on-axis viewers may be increased.

The alignment orientation 417BLp, 417BCp, 417BRp change monotonically across at least part of the display device 100. In manufacture, the gradient of the profile may be varied to provide maximum uniformity for different nominal viewing distances of the primary viewer from the display device 100. For example, a high gradient may be used for a short viewing distance while a lower gradient of profile may be provided for displays arranged to be operated at longer viewing distances. Advantageously uniformity of luminance may be optimised for the passenger 45 and uniformity of security factor may be optimised for the driver 47.

Figure 24C:
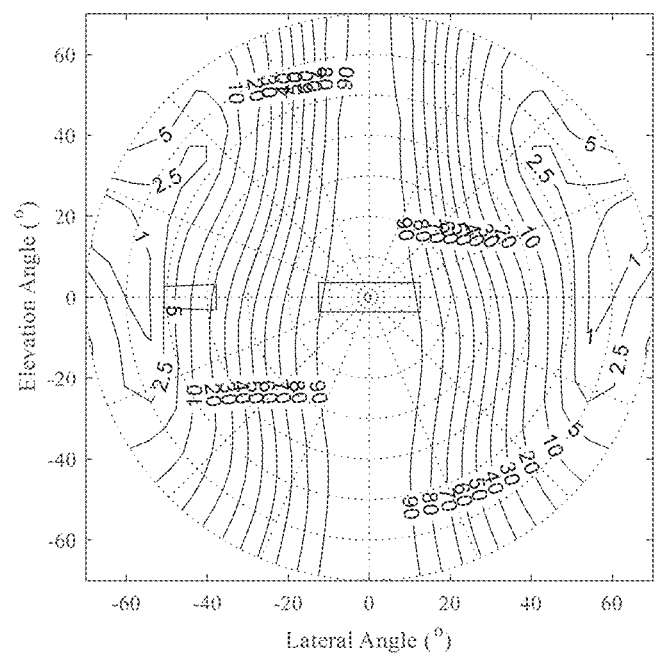
FIG. 24C is a schematic graph illustrating the variation of transmission with polar direction for the polar control retarder of FIG. 24B in a privacy mode of operation.
Figure 24D:
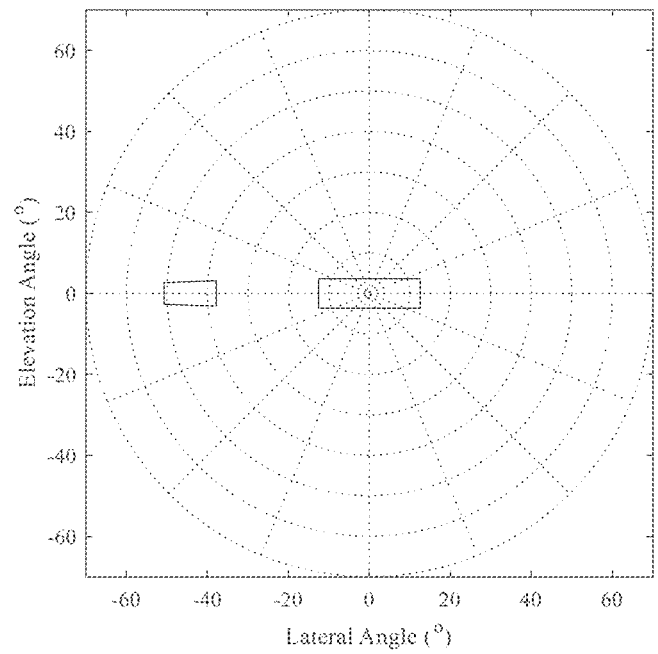
FIG. 24D is a schematic graph illustrating the variation of transmission with polar direction for the polar control retarder of FIG. 24B in a share mode of operation.

FIG. 24C is a schematic graph illustrating the variation of transmission with polar direction for the polar control retarder of FIG. 24B in a privacy mode of operation; and FIG. 24D is a schematic graph illustrating the variation of transmission with polar direction for the polar control retarder of FIG. 24B in a share mode of operation.

In comparison with FIG. 4B, the profile of FIG. 24C has higher symmetry. Symmetry may be reduced by increasing the average rotation of the alignment layer 417BB. In comparison to the profile of FIG. 5C, there is substantially no change with viewing angle and thus colour may be improved.

Returning to the description of FIG. 24A, a display may be provided with higher off-axis reduction of luminance levels, increasing polar region of high security factor.

Figure 25A:
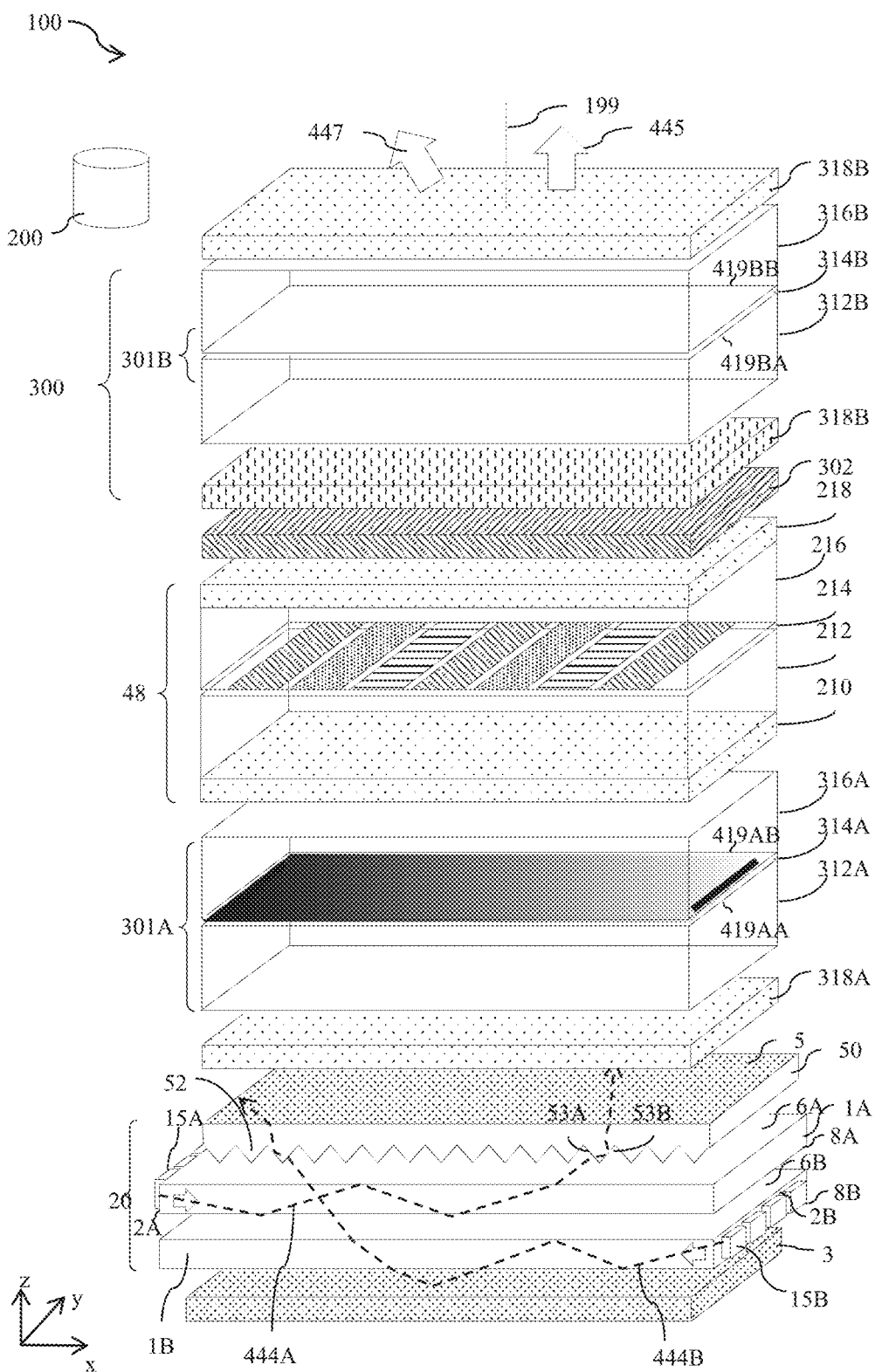
FIG. 25A is a schematic side perspective view of a display device providing uniformity for a display user comprising a first polar control retarder with a profile of voltage arranged between the backlight and transmissive spatial light modulator; and a reflective polariser, further polar control retarder and further additional polariser arranged to receive light from the spatial light modulator.

FIG. 25A is a schematic side perspective view of a display device 100 providing uniformity for a display user comprising a first polar control retarder 300 with a voltage V profile 322 arranged between the backlight 20 and transmissive SLM 48, and a reflective polariser, further polar control retarder 300 and further additional polariser arranged to receive light from the SLM 48. Features of the arrangement of FIG. 25A not discussed in further detail may be assumed to correspond to the features with equivalent reference numerals as discussed above, including any potential variations in the features.

In comparison to the arrangement of FIGS. 23B-C, increased symmetry of the second polar control retarder 300B may be achieved, and a larger region with high reflectivity achieved. Advantageously the polar region for high security factor may be increased. The second polar control retarder 300B may have variable alignment across the predetermined direction as illustrated in FIG. 24B or may have a common alignment across the predetermined direction. Advantageously the size of the polar region of increased reflectivity may be increased and security factor may be increased.

The embodiments of FIGS. 23A-C, FIG. 24A and FIG. 25A illustrate that the polar control retarders 300A, 300B are provided with a common predetermined direction. In other embodiments, not shown, the predetermined directions may be different.

For example, the predetermined directions may be opposite. Returning to the description of FIG. 1B, one of the polar control retarders 300A, 300B may be arranged to provide privacy to the left side of the display device 100 for user 47, and the other of the polar control retarders 300A, 300B may be arranged to provide privacy to the right side of the display device 100 for user 49.

In other embodiments, the predetermined directions may be crossed and one of the polar control retarders 300A, 300B may be arranged to provide privacy to the left side of the display device 100 for user 47, and the other of the polar control retarders 300A, 300B may be arranged to provide privacy for the vertical direction, for example to minimise windscreen reflections in an automotive vehicle 650.

Figure 25B:
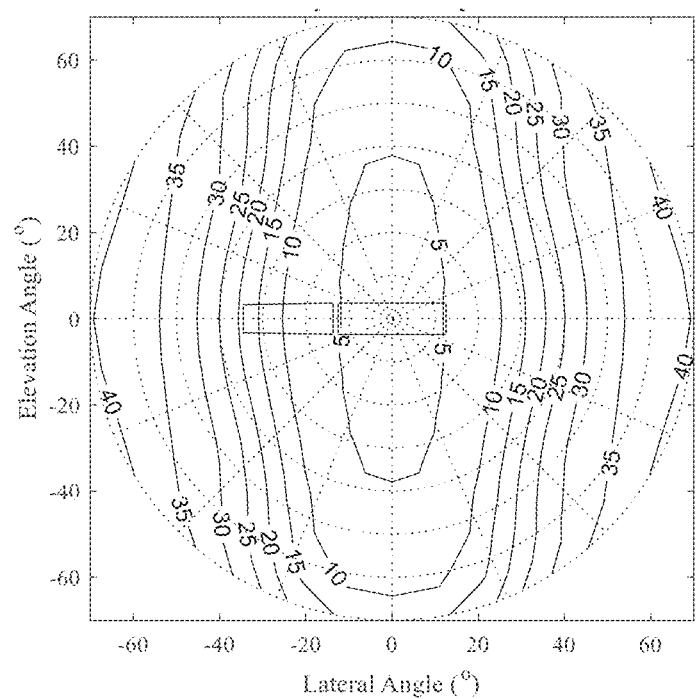
FIG. 25B is a schematic graph illustrating the variation of reflectivity with polar direction for the polar control retarder of FIG. 25A in a share mode of operation.
Figure 25C:
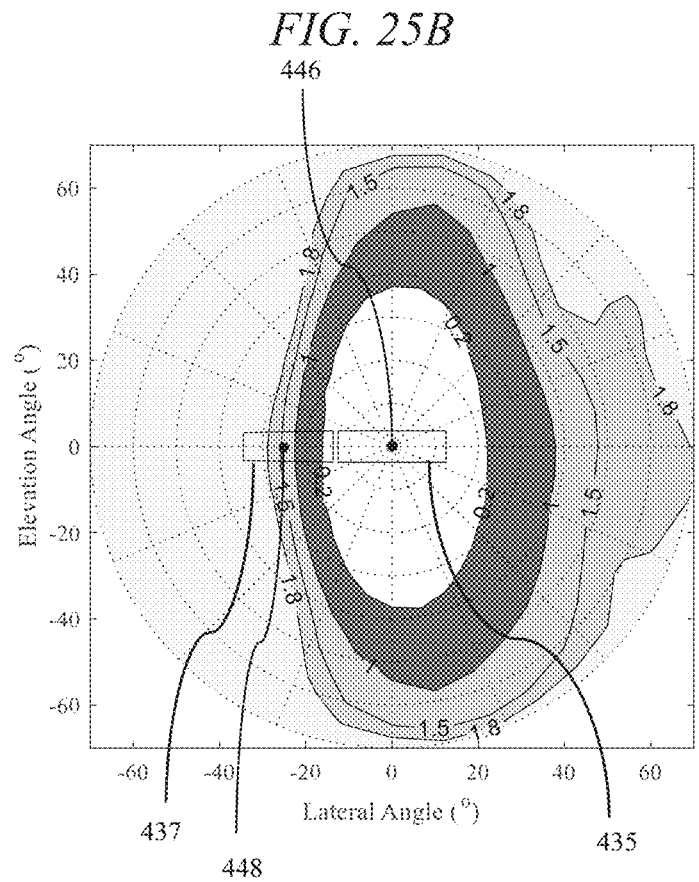
FIG. 25C is a graph illustrating a simulated polar profile of the security level, S of the arrangement of FIG. 25 for an ambient illuminance measured in lux that is the same as the head-on display luminance measured in nits and for the polar profile of backlight luminance of FIG. 16A and polar profile of polar control retarder transmission of FIG. 24C and reflectivity of FIG. 25B.

FIG. 25B is a schematic graph illustrating the variation of reflectivity with polar direction for the polar control retarder 300B and reflective polariser 302 of FIG. 25A and TABLE 6 in a share mode of operation; and FIG. 25C is a graph illustrating a simulated polar profile of the security level, S of the arrangement of FIG. 25 for an ambient illuminance measured in lux that is the same as the head-on display luminance measured in nits and for the polar profile of backlight luminance of FIG. 16A, polar profile of polar control retarder 300B transmission of FIG. 24C and reflectivity of polar control retarder 300B and reflective polariser 302 of FIG. 25B.

In comparison to the arrangement of FIG. 25C, the polar region for desirable security factor is substantially increased. Further the pupillation of the polar control retarders 300A, 300B and backlight 20 may achieve advantageously high image security uniformity around the direction 448 across the area of the display device 100.

The structure and operation of various alternative backlights 20 that provide desirable illumination characteristics for the switchable privacy display device 100 of the present embodiments will now be described further.

FIG. 26A is a schematic diagram illustrating a side view of the switchable backlight 20 of FIG. 2 comprising waveguides 1A, 1B, a rear reflector 3 and an optical turning film component 50 and outputting light beams 445, 447 with the angular distributions as illustrated in FIGS. 4A-C; FIG. 26B is a schematic diagram illustrating a front perspective view of an optical turning film component 50 for the backlight 20 of FIG. 26A; and FIG. 26C is a schematic diagram illustrating a side view of an optical turning film component 50. Features of the embodiments of FIGS. 26A-C not discussed in further detail may be assumed to correspond to the features with equivalent reference numerals as discussed above, including any potential variations in the features.

The backlight 20 comprises: at least one first light source 15A arranged to provide input light; at least one second light source 15B arranged to provide input light in an opposite direction from the at least one first light source 15A; a waveguide arrangement 11 comprising at least one waveguide 1, the waveguide arrangement 11 being arranged to receive the input light from the at least one first light source and the at least one second light source and to cause light from the at least one first light source and the at least one second light source to exit from the waveguide arrangement 11 by breaking total internal reflection; and an optical turning film component 50 comprising: an input surface 56 arranged to receive the light exiting from a waveguide 1 through a light guiding surface 8 of the waveguide 1 by breaking total internal reflection, the input surface 56 extending across the plane; and an output surface 58 facing the input surface 56, wherein the input surface 56 comprises an array of prismatic elements 51. The prismatic elements 51 may be elongate.

The waveguide arrangement 11 comprises: a first waveguide 1A extending across a plane and comprising first and second opposed light guiding surfaces arranged to guide light along the waveguide, the second light guiding surface being arranged to guide light by total internal reflection; and a first input end 2A arranged between the first and second light guiding surfaces 6A, 8A and extending in a lateral direction between the first and second light guiding surfaces 6A, 8A; wherein the at least one first light source 15A is arranged to input light 445 into the first waveguide 1A through the first input end, and the first waveguide 1A is arranged to cause light from the at least one first light source 15A to exit from the first waveguide 1A through one of the first and second light guiding surfaces 6A, 8A by breaking total internal reflection; a second waveguide 1B extending across the plane arranged in series with the first waveguide 1A and comprising first and second opposed light guiding surfaces 6B, 8B arranged to guide light along the waveguide 1B, the second light guiding surface 8B being arranged to guide light by total internal reflection, and a second input end 2B arranged between the first and second light guiding surfaces 6B, 8B and extending in a lateral direction between the first and second light guiding surfaces 6B, 8B; wherein the at least one second light source 15B is arranged to input light 447 into the second waveguide 1B through the second input end 2B, and the second waveguide 1B is arranged to cause light from the at least one second light source 15B to exit from the second waveguide 1B through one of the first and second light guiding surfaces 6B, 8B by breaking total internal reflection, and wherein the first and second waveguides 1A, 1B are oriented so that at least one first light source 15A and at least one second light source 15B input light 445, 447 into the first and second waveguides 1A, 1B in opposite directions.

The optical turning film component 50 comprises: an input surface 56 arranged to receive the light 444A, 444B exiting from the waveguide arrangement 11 through a light guiding surface of the at least one waveguide 1A, 1B of the waveguide arrangement by breaking total internal reflection, the input surface 56 extending across the plane; and an output surface 58 facing the input surface, wherein the input surface 56 comprises an array of prismatic elements 52. The prismatic elements each comprise a pair of elongate facets 52 defining a ridge 54 therebetween. Angles $\phi_A$, $\phi_B$ of prism surfaces 53A, 53B are provided to direct the nominal light output from waveguides 1A, 1B to directions 445, 447 by refraction and reflection at surfaces 53A, 53B. Advantageously desirable illumination directions such as illustrated in FIGS. 4A-F may be achieved by selection of angles $\phi_A$, $\phi_B$.

The backlight 20 of FIG. 26A may provide the exemplary luminance profiles of FIGS. 16A-B hereinabove. In operation, the light 444A from the first light source 15A exits the backlight 20 with a first angular distribution 445 as illustrated in FIG. 16A and the light from the second light source 15B exits the backlight 20 with a second angular distribution 457 as illustrated in FIG. 16B different from the first angular distribution 455. The first angular distribution 455 may be symmetrical about an axis 199 of symmetry of the backlight 20 and the second angular distribution 457 is asymmetrical about the same axis 199 of symmetry of the backlight 20. In a left-hand drive vehicle, the asymmetrical distribution 457 may be to the left of the axis 199 of symmetry of the backlight 20 and in a right-hand drive vehicle the asymmetrical distribution 457 may be to right of the axis 199 of symmetry of the backlight 20.

Waveguides 1A, 1B comprise surface relief features that are arranged to leak some of the guiding light either towards the rear reflector 3 or towards the light turning component 50. Each waveguide 1A, 1B comprise a surface relief 30 arranged on the first side 6A, 6B that may comprise prism surfaces 32, 33. Further the second sides 8A, 8B may further comprise surface relief 31 that may comprise elongate features or prism features as illustrated in FIG. 14D hereinbelow. In operation the surface reliefs 30, 31 provide leakage of light 445, 447 from the waveguide 1A, 1B for light guiding along the waveguide 1A, 1B.

Figure 27:
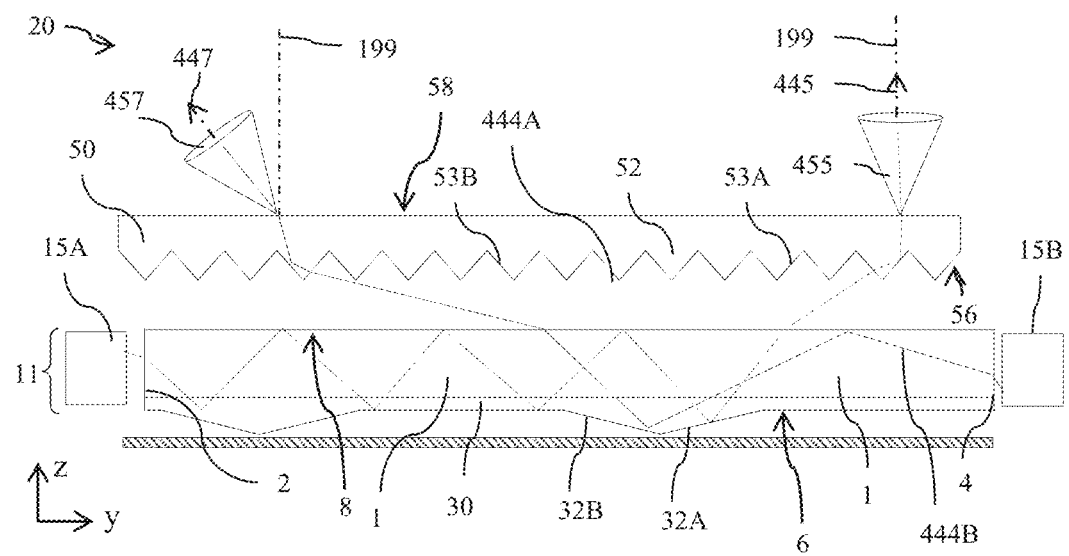
FIG. 27 is a schematic diagram illustrating a side view of a switchable backlight comprising a waveguide, first and second light sources at respective opposite input sides of the waveguide, a rear reflector and an optical turning film and outputting light beams for passenger and driver nominal directions.

FIG. 27 is a schematic diagram illustrating a side view of a switchable backlight 20 comprising a waveguide 1, first and second light sources 15 at respective opposite input sides of the waveguide 1, a rear reflector and an optical turning film and outputting light beams for passenger 45 and driver 47 nominal directions. Features of the embodiment of FIG. 27 not discussed in further detail may be assumed to correspond to the features with equivalent reference numerals as discussed above, including any potential variations in the features.

The waveguide arrangement 11 comprises: a waveguide 1 extending across a plane, wherein the waveguide 1 is an optical waveguide, and comprising: first and second opposed light guiding surfaces 6, 8 arranged to guide light along the waveguide 1, the second light guiding surface being arranged to guide light by total internal reflection 8, and first and second input ends 2A, 2B arranged between the first and second light guiding surfaces 6, 8 and extending in a lateral direction between the first and second light guiding surfaces 6, 8; wherein the at least one first light source 15A is arranged to input light 445 into the waveguide 1 through the first input end 2A and the at least one second light source 15B is arranged to input light 447 into the waveguide 1 through the second input end 2B, and the waveguide 1 is arranged to cause light from the at least one first light source 15A and the at least one second light source 15B to exit from the waveguide 1 through one of the first and second light guiding surfaces 6, 8 by breaking total internal reflection.

It may be desirable to pupillate the output of the backlight 20 in a manner similar to the pupillation of the transmission of the polar control retarder 300.

Figure 28A:
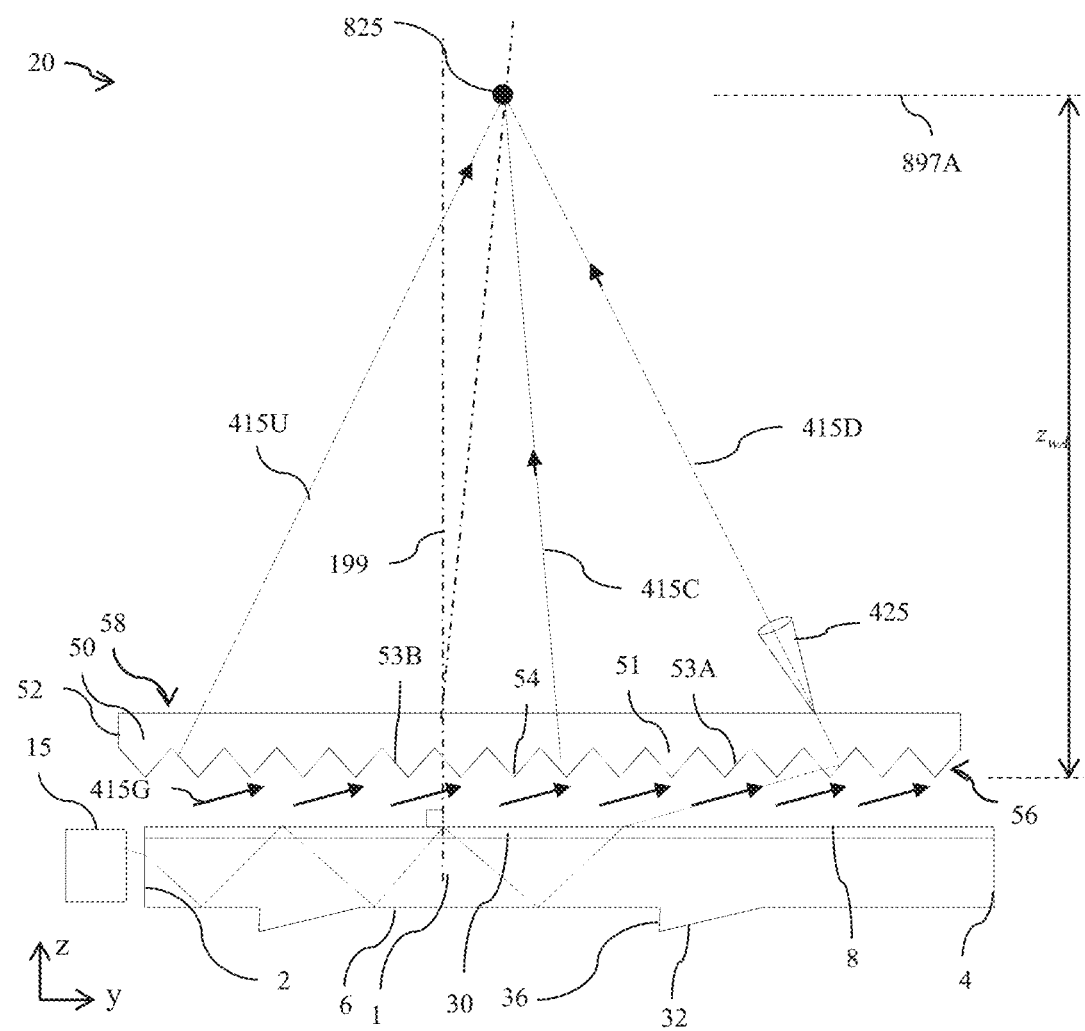
FIG. 28A is a schematic diagram illustrating in side view operation of a backlight comprising a pupillating light turning film component.
Figure 28B:
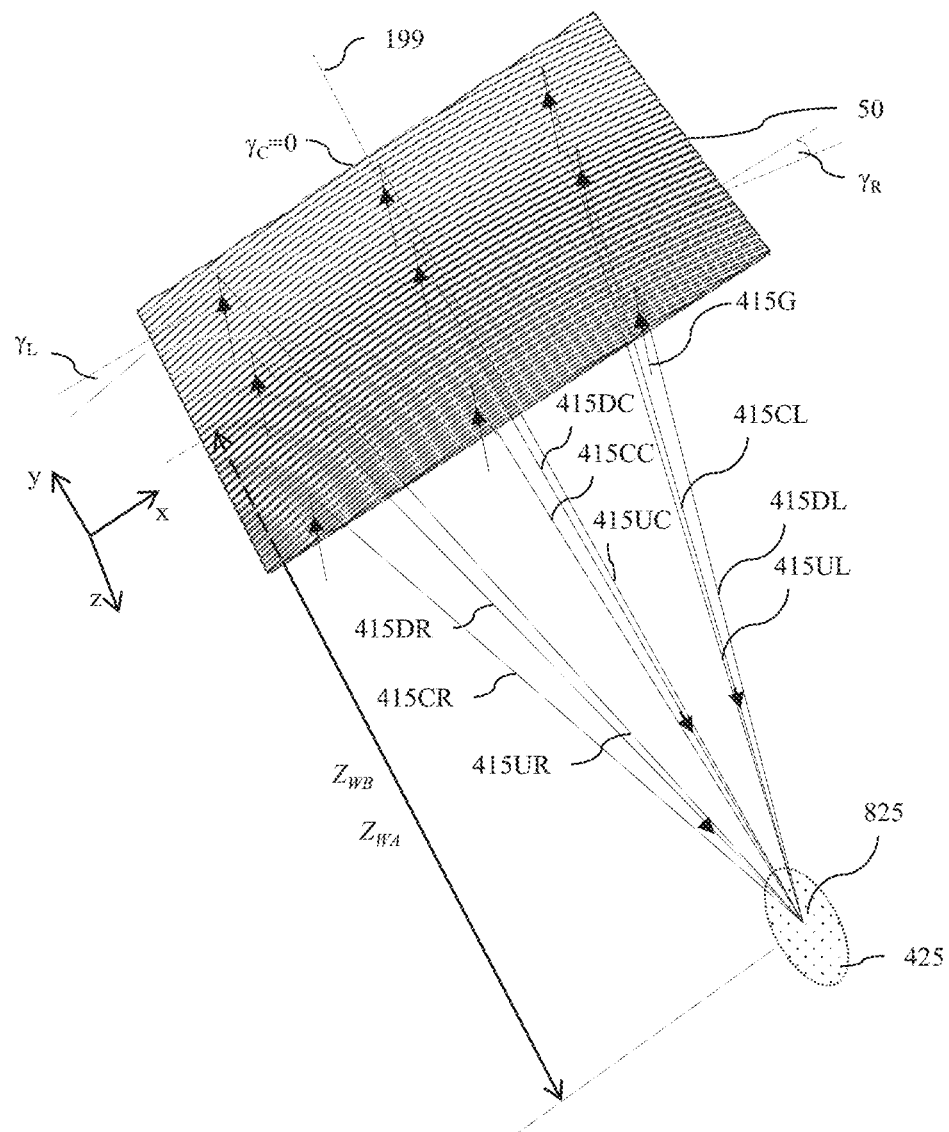
FIG. 28B is a schematic diagram illustrating in front perspective view, operation of a pupillating light turning film component.

FIG. 28A is a schematic diagram illustrating in side-view operation of a backlight 20 comprising a pupillating light turning film component 50; and FIG. 28B is a schematic diagram illustrating in front perspective view, operation of a pupillating light turning film component 50. Features of the embodiments of FIG. 28A and FIG. 28B not discussed in further detail may be assumed to correspond to the features with equivalent reference numerals as discussed above, including any potential variations in the features.

In the alternative embodiment of FIG. 28A, the tilt of the facets 53A, 53B are adjusted so that the highest luminance output from the backlight 20 from each part of the light turning component 50 is directed towards a common point 825.

In operation, FIG. 28A illustrates that light rays 415G are output from the waveguide 1 and directed onto the facets 53B, 53A of the light turning component 50. The inclination angles of the facets 53A, 53B are adjusted so that light rays 415U, 415C, 415D are directed towards a common point 825, wherein the light rays 415 have the maximum luminous intensity of the light cone 425.

FIG. 28B illustrates that the light turning film component may further have curved elongate facets with facet tangents $\gamma_L$, $\gamma_C$, $\gamma_R$ that vary along the predetermined direction. In this manner, pupillation may be provided in both x and y directions from the convergence of light rays 415DR, 415CR, 415UR, 415DC, 415CC, 415UC, 415DL, 415CL, 415UL. Advantageously increased uniformity may be provided in both lateral and vertical directions to the display user 45.

The point 825 may be arranged to be at or near the nominal viewing location of the passenger 45. Advantageously uniformity of the backlight 20 is improved for the user 45. Such improved uniformity may cooperate with the improved uniformity from the polar control retarder 300 described elsewhere herein.

Alternative arrangements of backlights 20 suitable for use in the display of FIG. 2A will now be described.

Figure 29:
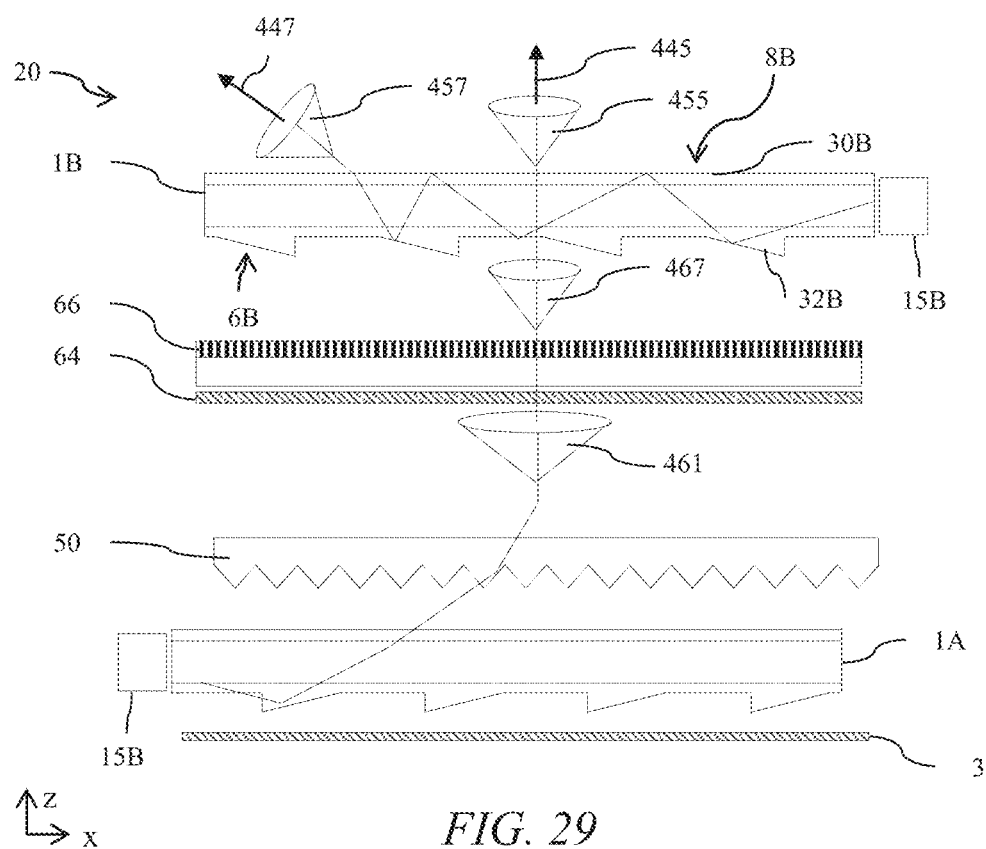
FIG. 29 is a schematic diagram illustrating a side view of a switchable backlight comprising a first waveguide, light turning film, a micro-louvre sheet and second waveguide.

FIG. 29 is a schematic diagram illustrating a side view of a switchable backlight 20 comprising a first waveguide 1A, light turning component 50, a micro-louvre film 66 and second waveguide 1B. Features of the embodiment of FIG. 29 not discussed in further detail may be assumed to correspond to the features with equivalent reference numerals as discussed above, including any potential variations in the features.

In comparison to the embodiment of FIG. 26A, the backlight 20 comprises waveguide 1A arranged between rear reflector 3 and light turning component 50, the operation of which is described hereinabove.

In a privacy mode of operation, the light sources 15A are illuminated and the waveguide 1A and optical turning film component 50 and provides light rays 445 with cone angle 461. Such cone angle 461 may be larger than desirable for viewing locations of driver 47 at angles near to angle α of FIG. 1A such that undesirable security factor may be achieved.

Reflective recirculation polariser 64 may optionally be provided to achieve light recirculation in the backlight 20. Advantageously efficiency may be increased. The reflective recirculation polariser 64 is different to the reflective polariser 302 of FIG. 25A. Reflective recirculation polariser 208 provides reflection of polarised light from the backlight 20 that has a polarisation that is orthogonal to the electric vector transmission direction of the dichroic input polariser 210 or additional polariser 318A. Reflective recirculation polariser 64 does not reflect ambient light 604 to a snooper.

Micro-louvre film 66 (such as ALCF™ from 3M Corporation) may be provided that for input light cone 461 outputs light cone 467 that has a smaller angular size for a given proportional luminance roll-off. Such light cone 467 is substantially transmitted by the waveguide 1B. Features 30B, 32B arranged on the light guiding surfaces 6B, 8B of the waveguide 1B may be arranged to minimise scatter in the predetermined direction.

In driver 47 illumination and in share mode the light sources 15B are operated and light cones 457 around light rays 447 are output from the waveguide 1B. As the illumination is predominately off-axis then a second light turning film component to redirect light rays 447 is not provided.

Advantageously a switchable backlight 20 with a narrow cone angle to user 45 may be provided. Stray light to driver 47 may be reduced in comparison to the arrangement of FIG. 26A, advantageously achieving improved security factor.

Figure 30:
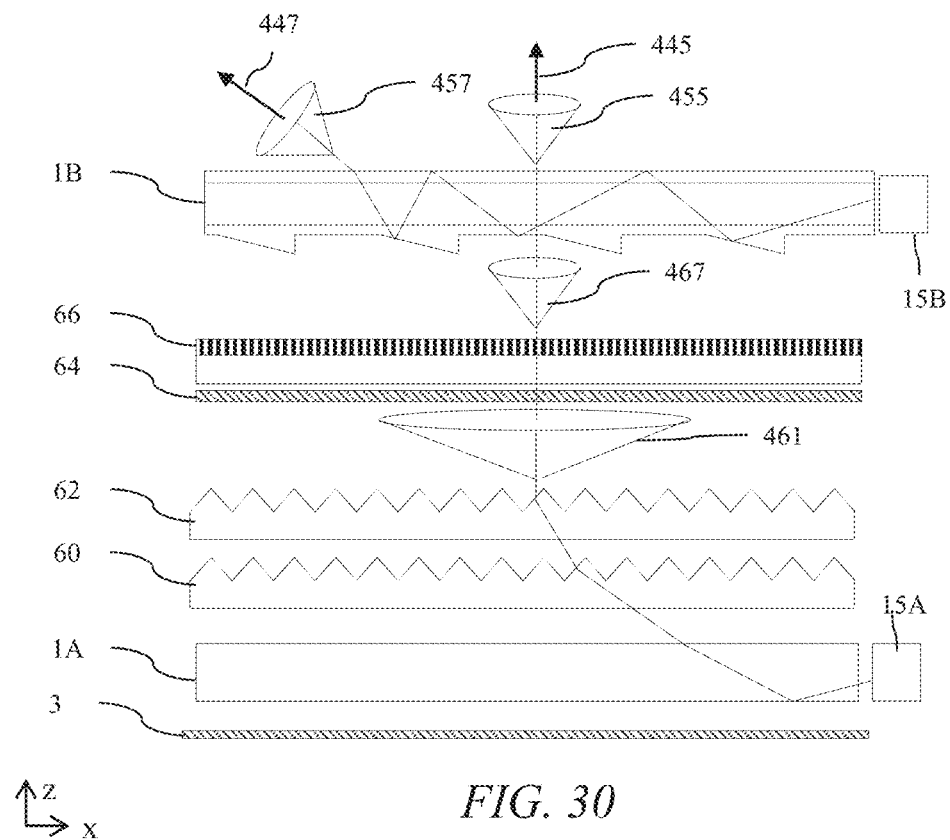
FIG. 30 is a schematic diagram illustrating a side view of a switchable backlight comprising a first waveguide, prismatic recirculation films, a micro-louvre sheet and second waveguide.

FIG. 30 is a schematic diagram illustrating a side view of a switchable backlight 20 comprising a first waveguide 1A, prismatic recirculation films 60, 62, a micro-louvre sheet 66 and second waveguide 1B. Features of the embodiment of FIG. 30 not discussed in further detail may be assumed to correspond to the features with equivalent reference numerals as discussed above, including any potential variations in the features.

In the alternative embodiment of FIG. 30, the light turning film component 50 is omitted and at least one brightness enhancement film 60, 62 provides recirculation of on-axis scattered light from the rear reflector 3. In comparison to the alternative embodiment of FIG. 29, the output cone 461 may have a larger size and so losses may increase and off-axis luminance may also increase in the region around the angle α of FIG. 1A. Advantageously cost and complexity may be reduced and uniformity may be increased.

It may be desirable to provide increased dynamic range and reduced power consumption.

Figure 31:
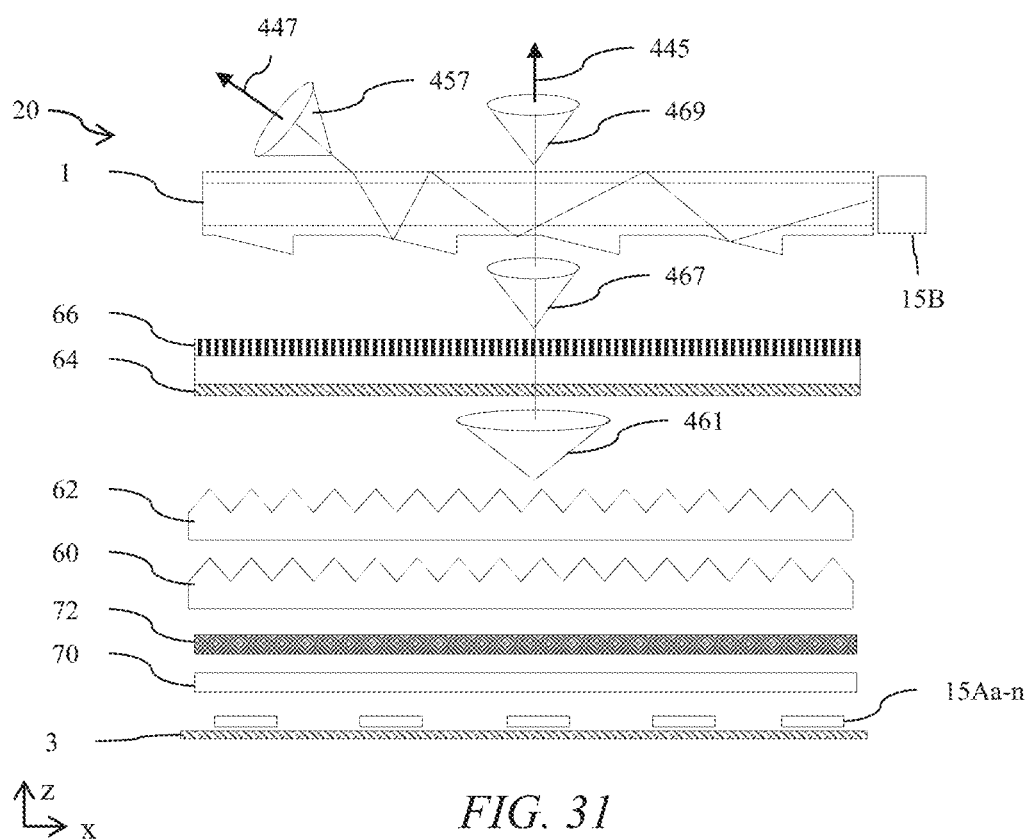
FIG. 31 is a schematic diagram illustrating a side view of a switchable backlight comprising a mini-LED array, prismatic recirculation films, a micro-louvre sheet and second waveguide.

FIG. 31 is a schematic diagram illustrating a side view of a switchable backlight 20 comprising a mini-LED array 15Aa-n, prismatic recirculation films 60, 62, a micro-louvre sheet 66, waveguide 1B and light source 15B. Features of the embodiment of FIG. 31 not discussed in further detail may be assumed to correspond to the features with equivalent reference numerals as discussed above, including any potential variations in the features.

In comparison to FIG. 30, the embodiment of FIG. 31 comprises array 15Aa-n of mini-LEDs that are distributed across the area of the backlight 20. The array 15Aa-n may provide blue output light and additional diffusers 70 and wavelength conversion sheet 72 may be provided to achieve white light output.

In operation for illumination of passenger 45, the array 15Aa-n may be modulated with image data and aligned to pixels 220, 222, 224 of the SLM 48. Advantageously image contrast may be increased.

Figure 32A:
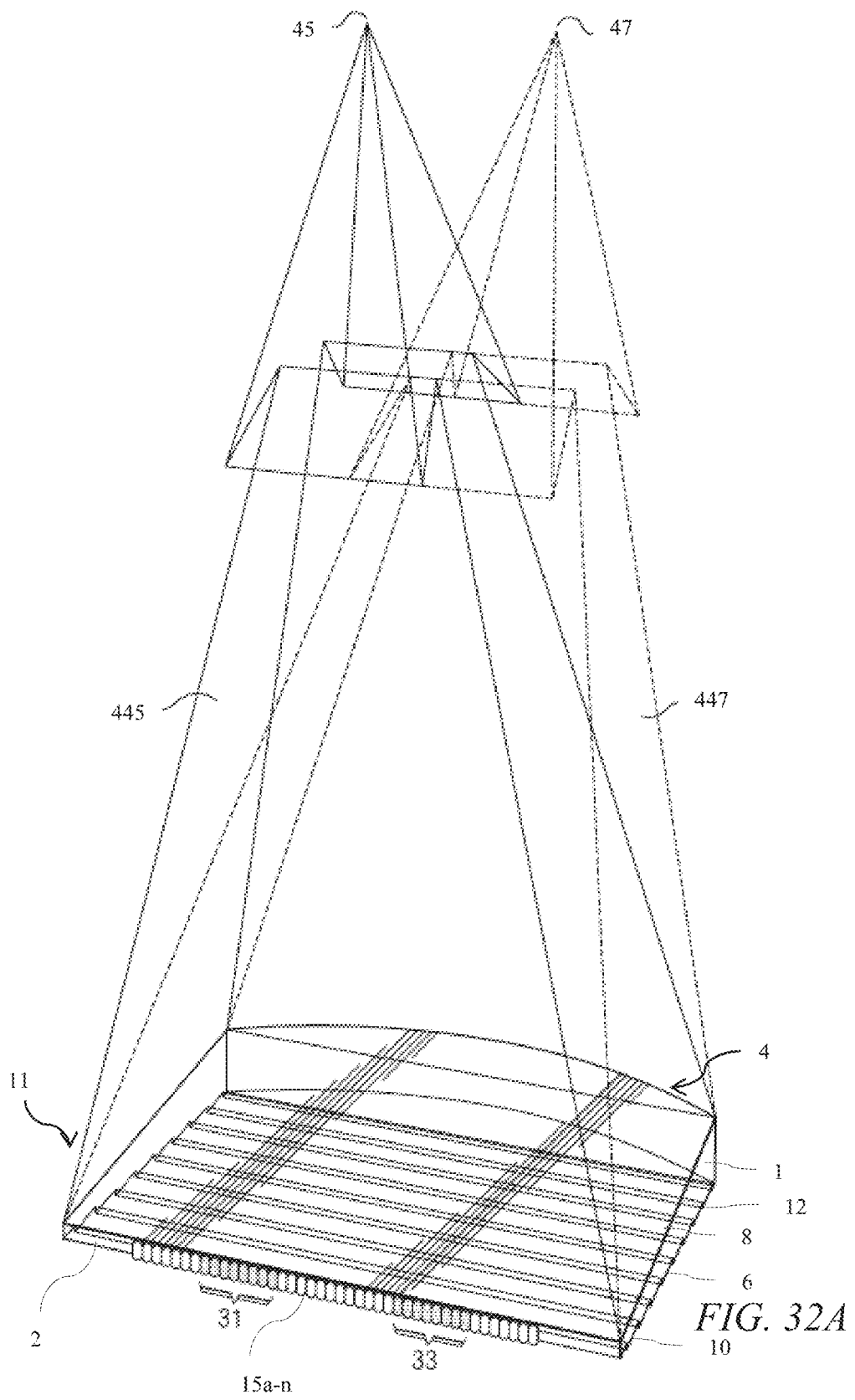
FIG. 32A is a schematic diagram illustrating a perspective side view of a steerable backlight comprising a stepped waveguide, and addressable light source array.
Figure 32B:
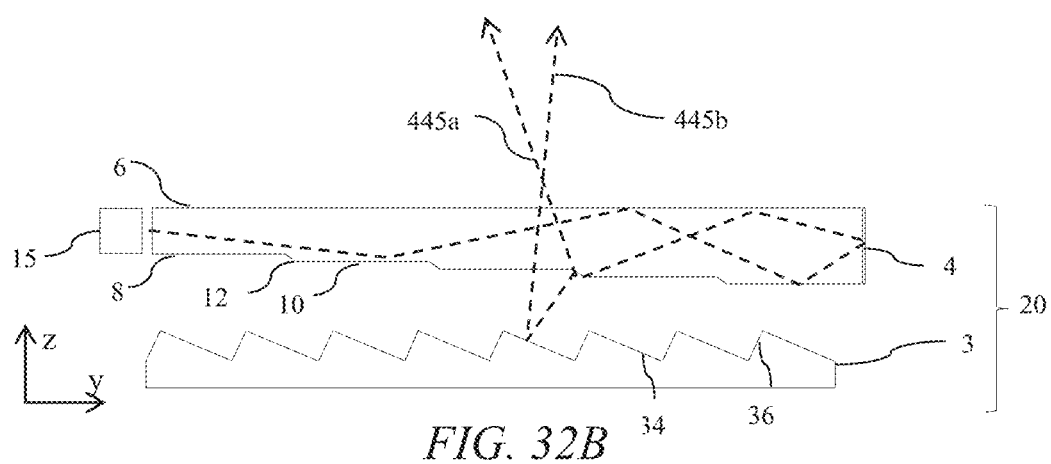
FIG. 32B is a schematic diagram illustrating a side view of a steerable backlight comprising a stepped waveguide, and addressable light source array and rear reflector.

FIG. 32A is a schematic diagram illustrating a perspective side view of a steerable backlight 20 comprising a waveguide arrangement 11 comprising a stepped waveguide 1, and addressable light source array 15a-n; and FIG. 32B is a schematic diagram illustrating a side view of a display steerable backlight 20 comprising a stepped waveguide, and addressable light source array and rear reflector. Features of the embodiment of FIGS. 32A-B not discussed in further detail may be assumed to correspond to the features with equivalent reference numerals as discussed above, including any potential variations in the features.

Such a stepped waveguide is further described in U.S. Pat. No. 9,519,153 and in U.S. Pat. No. 10,054,732, both of which are herein incorporated by reference in their entireties.

Waveguide 1 comprises an input end 2, a reflective end 4 and first and second light guiding surfaces 6, 8 arranged between the input end 2 and reflective end 4. The second light guiding surface 8 may be a planar surface and the first light guiding surface 6 may comprise a stepped structure comprising steps 12 and intermediate regions 10 that may be planar.

In operation, light from at least some of light sources 15a-n is input at the input end 2 and guided substantially without loss to the reflective end 4. Reflected light rays are guided back towards the steps 12 by means of the surface 8, 10 at which point they are extracted from the waveguide through total internal reflection or by refraction. Considering FIG. 32A, light sources 15 in region 31 are directed towards driver 47 and light sources in region 33 are directed towards the passenger 45.

Considering FIG. 32B, refracted light rays 445b are incident on rear reflector 3 comprising reflective facets 34, 36 and directed towards passenger 45, similarly refracted light rays 447b (not shown) are directed towards driver 47. Advantageously output brightness is increased.

The light extraction features 12 may be curved and optical pupils 325, 327 may be provided towards passenger 45, and driver 47. Advantageously image uniformity may be increased.

Figure 32C:
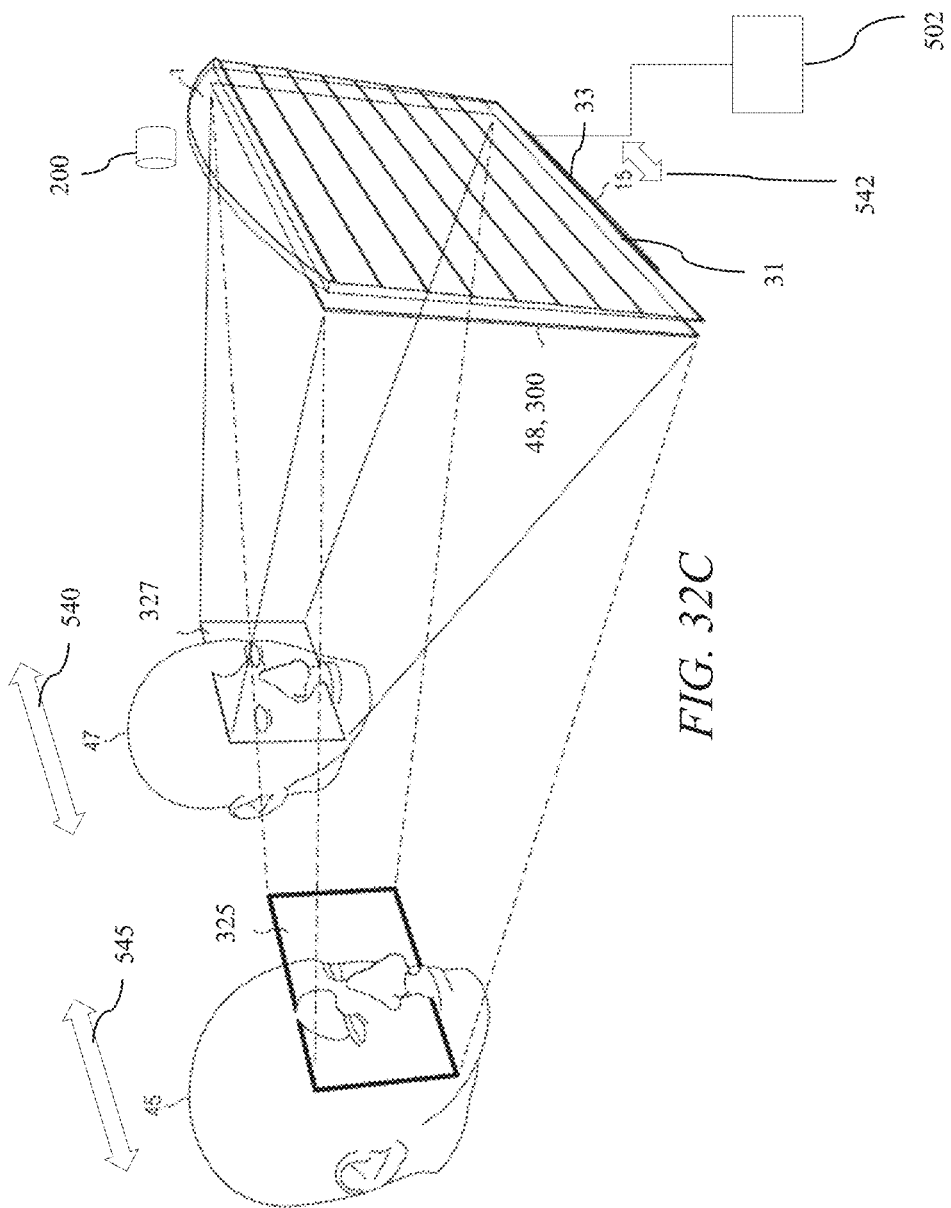
FIG. 32C is a schematic diagram illustrating a perspective rear view of a steerable backlight comprising a stepped waveguide, addressable light source array to illuminate a driver and passenger.

FIG. 32C is a schematic diagram illustrating a perspective rear view of a steerable backlight 20 comprising a stepped waveguide 1, addressable light source array 15 spatial light modulator 48 and polar control retarder 300 to illuminate a driver 47 and passenger 45. Features of the embodiment of FIG. 32C not discussed in further detail may be assumed to correspond to the features with equivalent reference numerals as discussed above, including any potential variations in the features.

In operation for a moving passenger 47 with movement of measured distance 545 from a reference location, the light sources 15a-n are controlled such that region 33 is adjusted to move location by distance 542 in correspondence to the distance of movement 540. The light sources 15 are controlled accordingly such that the input illuminated region 31 is moved by distance 542. Optical window 325 is then maintained at a location near to the passenger, and light leakage to window 327 is minimised. As described elsewhere herein, the polar control retarder 300 may similarly be controlled to achieve desirable luminance reduction at the driver 47 measured distance of movement 540 from a reference location. Advantageously luminance to passenger 45 is increased and security factor to driver 47 is increased.

In share mode operation, all of the light sources 15a-n may be operated to achieve wide angle operation, together with share mode operation of the polar control retarder 300, described elsewhere herein.

A thin and steerable backlight for a switchable privacy display with high image security may advantageously be achieved.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display apparatus comprising: a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder arranged between the display polariser and the additional polariser, wherein the at least one polar control retarder comprises a switchable liquid crystal retarder comprising a layer of liquid crystal material; two surface alignment layers disposed adjacent to the layer of liquid crystal material and on opposite sides thereof, the surface alignment layers each being arranged to provide homogenous alignment in the adjacent liquid crystal material, the liquid crystal material being provided with a twist; and first and second electrode arrangements disposed on opposite sides of the layer of liquid crystal material and arranged to provide an electric field perpendicular to the layer of liquid crystal material, wherein the display apparatus further comprises a control system arranged to control the spatial light modulator and to supply voltages to the first and second electrode arrangements for providing the electric field perpendicular to the layer of liquid crystal material, the control system being arranged to vary the voltages to the first and second electrode arrangements for controlling a direction of minimum light transmission of the view angle control arrangement, wherein the magnitude of the electric field perpendicular to the layer of liquid crystal material changes monotonically along a predetermined axis across at least part of the display device, and wherein the magnitude of the electric field changes monotonically along a predetermined axis across at least part of the display device so that directions of minimum light transmission of the view angle control arrangement from points of said at least part of the display device are directed towards a common off-axis point in front of the display device.

2. A display apparatus according to claim 1, wherein the display apparatus further comprises a viewer tracking system arranged to track the location of a viewer, wherein the control system is arranged to vary the voltages to the first and second electrode arrangements in response to the tracked location of the viewer.

3. A display apparatus according to claim 1, wherein the control system is arranged to accept user input indicating a direction of minimum light transmission of the view angle control arrangement, and the control system is arranged to vary the voltages to the first and second electrode arrangements in response to the user input.

4. A display apparatus according to claim 1, wherein components of the optical axis of the liquid crystal material in the plane of the layer of liquid crystal material have an average direction that is along the predetermined direction.

5. A display apparatus comprising: a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder arranged between the display polariser and the additional polariser, wherein the at least one polar control retarder comprises a switchable liquid crystal retarder comprising a layer of liquid crystal material; two surface alignment layers disposed adjacent to the layer of liquid crystal material and on opposite sides thereof, the surface alignment layers each being arranged to provide homogenous alignment in the adjacent liquid crystal material, the liquid crystal material being provided with a twist; and first and second electrode arrangements disposed on opposite sides of the layer of liquid crystal material and arranged to provide an electric field perpendicular to the layer of liquid crystal material, wherein the display apparatus further comprises a control system arranged to control the spatial light modulator and to supply voltages to the first and second electrode arrangements for providing the electric field perpendicular to the layer of liquid crystal material, the control system being arranged to vary the voltages to the first and second electrode arrangements for controlling a direction of minimum light transmission of the view angle control arrangement, and wherein the first electrode arrangement comprises a continuous electrode extending over the entirety of the layer of liquid crystal material, the continuous electrode having at least one contact disposed at each of opposite ends of the continuous electrode along the predetermined axis and arranged to supply respective voltages that create a voltage profile on the continuous electrode along the predetermined axis for providing the electric field perpendicular to the layer of liquid crystal material.

6. A display apparatus according to claim 5, wherein at least one of the contacts comprises a conductive bar extending perpendicular to the predetermined axis.

7. A display apparatus comprising: a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder arranged between the display polariser and the additional polariser, wherein the at least one polar control retarder comprises a switchable liquid crystal retarder comprising a layer of liquid crystal material; two surface alignment layers disposed adjacent to the layer of liquid crystal material and on opposite sides thereof, the surface alignment layers each being arranged to provide homogenous alignment in the adjacent liquid crystal material, the liquid crystal material being provided with a twist; and first and second electrode arrangements disposed on opposite sides of the layer of liquid crystal material and arranged to provide an electric field perpendicular to the layer of liquid crystal material, wherein the display apparatus further comprises a control system arranged to control the spatial light modulator and to supply voltages to the first and second electrode arrangements for providing the electric field perpendicular to the layer of liquid crystal material, the control system being arranged to vary the voltages to the first and second electrode arrangements for controlling a direction of minimum light transmission of the view angle control arrangement, wherein the magnitude of the electric field perpendicular to the layer of liquid crystal material changes monotonically along a predetermined axis across at least part of the display device, and wherein the first electrode arrangement comprises plural electrodes separated along the predetermined axis, the plural electrodes being arranged to supply different voltages that change monotonically along the predetermined axis.

8. A display apparatus according to claim 7, wherein the second electrode arrangement is arranged to supply a common voltage.

9. A display apparatus according to claim 8, wherein the second electrode arrangement comprises a continuous electrode extending over the entirety of the layer of liquid crystal material.

10. A display apparatus comprising: a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder arranged between the display polariser and the additional polariser, wherein the at least one polar control retarder comprises a switchable liquid crystal retarder comprising a layer of liquid crystal material; two surface alignment layers disposed adjacent to the layer of liquid crystal material and on opposite sides thereof, the surface alignment layers each being arranged to provide homogenous alignment in the adjacent liquid crystal material, the liquid crystal material being provided with a twist; and first and second electrode arrangements disposed on opposite sides of the layer of liquid crystal material and arranged to provide an electric field perpendicular to the layer of liquid crystal material, wherein the display apparatus further comprises a control system arranged to control the spatial light modulator and to supply voltages to the first and second electrode arrangements for providing the electric field perpendicular to the layer of liquid crystal material, the control system being arranged to vary the voltages to the first and second electrode arrangements for controlling a direction of minimum light transmission of the view angle control arrangement, wherein the magnitude of the electric field is uniform across the entirety of the display device, and wherein each of the first electrode arrangement and the second electrode arrangement comprises a continuous electrode extending over the entirety of the layer of liquid crystal material.

11. A display apparatus according to claim 1, wherein the surface alignment layers are each arranged to provide homogenous alignment in the adjacent liquid crystal material, the surface alignment layers having an in-plane component in the plane of the layer of liquid crystal material having an angle that changes monotonically along a predetermined axis across at least part of the display device.

12. A display apparatus according to claim 1, wherein the switchable liquid crystal retarder has a retardance for light of a wavelength of 550 nm in a range from 300 nm to 1500 nm, preferably in a range from 400 nm to 1200 nm.

13. A display apparatus according to claim 1, wherein the twist is in a range from 600 to 1200, preferably in a range from 700 to 90°.

14. A display apparatus according to claim 1, wherein the electric vector transmission direction of the additional polariser is oriented at a non-zero angle with respect to the electric vector transmission direction of the display polariser.

15. A display apparatus according to claim 14, wherein the non-zero angle is the same as the twist.

16. A display apparatus according to claim 1, wherein the surface alignment layer closest to the display polariser has a pretilt having a pretilt direction with a component in the plane of the layer of liquid crystal material that is parallel or perpendicular to an electric vector transmission direction of the display polarisers, andthe surface alignment layer closest to the additional polariser has a pretilt having a pretilt direction with a component in the plane of the layer of liquid crystal material that is parallel or perpendicular to an electric vector transmission direction of the additional polariser.

17. A display apparatus according to claim 1, wherein the at least one polar control retarder further comprises at least one passive retarder.

18. A display apparatus according to claim 17, wherein the at least one passive retarder is an A-plate with a retardance for light of a wavelength of 550 nm in a range of 250 nm to 300 nm.

19. A display apparatus according to claim 1, wherein the liquid crystal material has a positive dielectric anisotropy.

20. A display apparatus according to claim 1, wherein the display device is curved with a concave curvature as viewed from the output side.

21. A display apparatus according to claim 1, wherein said display polariser is an output display polariser arranged on the output side of the spatial light modulator.

22. A display apparatus according to claim 21, wherein there is not a reflective polariser arranged between the output display polariser and the at least one polar control retarder.

23. A display apparatus according to claim 21, further comprising a reflective polariser arranged between the output polariser and the at least one polar control retarder, the reflective polariser being a linear polariser arranged to pass the same linearly polarised polarisation component as the output polariser.

24. A display apparatus according to claim 21, wherein the spatial light modulator comprises an emissive spatial light modulator arranged to emit the spatially modulated light.

25. A display apparatus according to claim 21, wherein the spatial light modulator comprises a transmissive spatial light modulator and the display device further comprises a backlight arranged to illuminate the spatial light modulator.

26. A display apparatus according to claim 1, wherein the spatial light modulator comprises a transmissive spatial light modulator, the display device further comprises a backlight arranged to illuminate the spatial light modulator, and said display polariser is an input display polariser arranged on the input side of the spatial light modulator.

27. A display apparatus according to claim 26, further comprising:an output display polariser arranged on the output side of the spatial light modulator; a further additional polariser arranged on the output side of the spatial light modulator, the further additional polariser being a linear polariser; and at least one further polar control retarder arranged between the further additional polariser and the output display polariser.

28. A display apparatus according to claim 27, wherein the at least one further polar control retarder comprises a switchable liquid crystal retarder comprising a layer of liquid crystal material, andthe display device further comprises first and second electrode arrangements disposed on opposite sides of the layer of liquid crystal material, wherein the first and second -electrode arrangements are arranged to provide an electric field perpendicular to the layer of liquid crystal material, wherein the magnitude of the electric field changes monotonically along a predetermined axis across at least part of the display device.

29. A display apparatus according to claim 1, further comprising:a further additional polariser arranged on the same side of the spatial light modulator as the additional polariser outside the additional polariser, the further additional polariser being a linear polariser;

and at least one further polar control retarder arranged between the additional polariser and the further additional polariser.

30. A display apparatus according to claim 29, wherein the at least one further polar control retarder comprises a switchable liquid crystal retarder comprising a layer of liquid crystal material, andthe display device further comprises first and second electrode arrangements disposed on opposite sides of the layer of liquid crystal material, wherein the first and second electrode arrangements are arranged to provide an electric field perpendicular to the layer of liquid crystal material, wherein the magnitude of the electric field changes monotonically along a predetermined axis across at least part of the display device.

31. A display apparatus according to claim 1, wherein the backlight comprises:at least one first light source arranged to provide input light; at least one second light source arranged to provide input light in an opposite direction from the at least one first light source; a waveguide arrangement comprising at least one waveguide, the waveguide arrangement being arranged to receive the input light from the at least one first light source and the at least one second light source and to cause light from the at least one first light source and the at least one second light source to exit from the waveguide arrangement by breaking total internal reflection; and an optical turning film component comprising:an input surface arranged to receive the light exiting from a waveguide through a light guiding surface of the waveguide by breaking total internal reflection, the input surface extending across the plane; and an output surface facing the input surface, wherein the input surface comprises an array of prismatic elements.

32. A display apparatus according to claim 31, wherein the waveguide arrangement comprises:a waveguide extending across a plane and comprising: first and second opposed light guiding surfaces arranged to guide light along the optical waveguide, the second light guiding surface being arranged to guide light by total internal reflection, and first and second input ends arranged between the first and second light guiding surfaces and extending in a lateral direction between the first and second light guiding surfaces; wherein the at least one first light source is arranged to input light into the waveguide through the first input end and the at least one second light source is arranged to input light into the waveguide through the second input end, and the waveguide is arranged to cause light from the at least one first light source and the at least one second light source to exit from the waveguide through one of the first and second light guiding surfaces by breaking total internal reflection.

33. A display apparatus according to claim 31, wherein the waveguide arrangement comprises:a first waveguide extending across a plane and comprising first and second opposed light guiding surfaces arranged to guide light along the lOoptical waveguide, the second light guiding surface being arranged to guide light by total internal reflection; anda first input end arranged between the first and second light guiding surfaces and extending in a lateral direction between the first and second light guiding surfaces; wherein the at least one first light source is arranged to input light into the first waveguide through the first input end, and the first waveguide is arranged to cause light from the at least one first light source to exit from the first waveguide through one of the first and second light guiding surface by breaking total internal reflection; a second waveguide extending across the plane arranged in series with the first waveguide and comprising first and second opposed light guiding surfaces arranged to guide light along the optical waveguide, the second light guiding surface being arranged to guide light by total internal reflection, anda second input end arranged between the first and second light guiding surfaces and extending in a lateral direction between the first and second light guiding surfaces; wherein the at least one second light source is arranged to input light into the second waveguide through the second input end, and the second waveguide is arranged to cause light from the at least one second light source to exit from the second waveguide through one of the first and second light guiding surfaces by breaking total internal reflection, and wherein the first and second waveguides are oriented so that at least one first light source and at least one second light source input light into the first and second waveguides in opposite directions.

34. A display apparatus according to claim 1, comprising plural, tiled display devices.

35. A display apparatus comprising: a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder arranged between the display polariser and the additional polariser, wherein the at least one polar control retarder comprises a switchable liquid crystal retarder comprising a layer of liquid crystal material; two surface alignment layers disposed adjacent to the layer of liquid crystal material and on opposite sides thereof, the surface alignment layers each being arranged to provide homogenous alignment in the adjacent liquid crystal material, the liquid crystal material being provided with a twist; and first and second electrode arrangements disposed on opposite sides of the layer of liquid crystal material and arranged to provide an electric field perpendicular to the layer of liquid crystal material, wherein the display apparatus further comprises a control system arranged to control the spatial light modulator and to supply voltages to the first and second electrode arrangements for providing the electric field perpendicular to the layer of liquid crystal material, the control system being arranged to vary the voltages to the first and second electrode arrangements for controlling a direction of minimum light transmission of the view angle control arrangement, and the display apparatus further comprising plural, tiled display devices, wherein the magnitude of the electric field across at least part of the display device is different in different display devices.

36. A display apparatus according to claim 35, wherein the profile of the change in the magnitude of the electric field monotonically along a predetermined axis across at least part of the display device is different in different display devices.

37. A display apparatus according to claim 36, wherein the directions of minimum light transmission of the view angle control arrangement from points of said at least part of each of the display devices are directed towards a common off-axis point in front of the display apparatus.

38. A display apparatus according to claim 5, wherein the display apparatus further comprises a viewer tracking system arranged to track the location of aviewer, wherein the control system is arranged to vary the voltages to the first and second electrode arrangements in response to the tracked location of the viewer.

39. A display apparatus according to claim 5, wherein the control system is arranged to accept user input indicating a direction of minimum light transmission of the view angle control arrangement, and the control system is arranged to vary the voltages to the first and second electrode arrangements in response to the user input.

40. A display apparatus according to claim 5, wherein components of the optical axis of the liquid crystal material in the plane of the layer of liquid crystal material have an average direction that is along the predetermined direction.

41. A display apparatus according to claim 7, wherein the display apparatus further comprises a viewer tracking system arranged to track the location of a viewer, wherein the control system is arranged to vary the voltages to the first and second electrode arrangements in response to the tracked location of the viewer.

42. A display apparatus according to claim 7, wherein the control system is arranged to accept user input indicating a direction of minimum light transmission of the view angle control arrangement, and the control system is arranged to vary the voltages to the first and second electrode arrangements in response to the user input.

43. A display apparatus according to claim 7, wherein components of the optical axis of the liquid crystal material in the plane of the layer of liquid crystal material have an average direction that is along the predetermined direction.

44. A display apparatus according to claim 10, wherein the display apparatus further comprises a viewer tracking system arranged to track the location of a viewer, wherein the control system is arranged to vary the voltages to the first and second electrode arrangements in response to the tracked location of the viewer.

45. A display apparatus according to claim 10, wherein thecontrol system is arranged to accept user input indicating a direction of minimum light transmission of the view angle control arrangement, and the control system is arranged to vary the voltages to the first and second electrode arrangements in response to the user input.

46. A display apparatus according to claim 35, wherein the display apparatus further comprises a viewer tracking system arranged to track the location of a viewer, wherein the control system is arranged to vary the voltages to the first and second electrode arrangements in response to the tracked location of the viewer.

47. A display apparatus according to claim 35, wherein the control system is arranged to accept user input indicating a direction of minimum light transmission of the view angle control arrangement, and the control system is arranged to vary the voltages to the first and second electrode arrangements in response to the user input.

48. A display apparatus according to claim 35, wherein components of the optical axis of the liquid crystal material in the plane of the layer of liquid crystal material have an average direction that is along the predetermined direction.

49. A display apparatus according to claim 5, wherein the magnitude of the electric field perpendicular to the layer of liquid crystal material changes monotonically along a predetermined axis across at least part of the display device.

50. A display apparatus according to claim 35, wherein the magnitude of the electric field is uniform across the entirety of the display device.

51. A display apparatus according to claim 49, wherein the magnitude of the electric field changes monotonically along a predetermined axis across at least part of the display device so that directions of minimum light transmission of the view angle control arrangement from points of said at least part of the display device are directed towards a common off-axis point in front of the display device.

* * * * *